United States Patent
Jung et al.

(10) Patent No.: US 10,756,963 B2
(45) Date of Patent: Aug. 25, 2020

(54) SYSTEM AND METHOD FOR DEVELOPING RUN TIME SELF-MODIFYING INTERACTION SOLUTION THROUGH CONFIGURATION

(71) Applicant: Pulzze Systems, Inc, Saratoga, CA (US)

(72) Inventors: Sang Duck Jung, Saratoga, CA (US); Kausik Sridharabalan, San Jose, CA (US); Peter Sang Diuk Jung, Saratoga, CA (US); Jason Alexander Monroe, Santa Clara, CA (US)

(73) Assignee: PULZZE SYSTEMS, INC., Saratoga, CA (US)

( * ) Notice: Subject to any disclaimer, the term of this patent is extended or adjusted under 35 U.S.C. 154(b) by 0 days.

(21) Appl. No.: 15/980,474

(22) Filed: May 15, 2018

(65) Prior Publication Data
US 2018/0262391 A1   Sep. 13, 2018

Related U.S. Application Data

(63) Continuation-in-part of application No. 15/071,841, filed on Mar. 16, 2016, now Pat. No. 10,079,874.
(Continued)

(51) Int. Cl.
*H04L 12/24* (2006.01)
*H04L 29/08* (2006.01)
(Continued)

(52) U.S. Cl.
CPC .......... *H04L 41/0803* (2013.01); *G06F 15/76* (2013.01); *G06N 20/00* (2019.01);
(Continued)

(58) Field of Classification Search
CPC ............. H04L 41/0803; H04L 41/0806; H04L 41/5006; H04L 47/10; H04L 67/02;
(Continued)

(56) References Cited

U.S. PATENT DOCUMENTS 6,704,873 B1 * 3/2004 Underwood ............ H04L 63/02
709/223
8,635,373 B1 * 1/2014 Supramaniam ......... H04L 67/42
709/248

(Continued)

*Primary Examiner* — Kristie D Shingles
(74) *Attorney, Agent, or Firm* — Novick, Kim & Lee, PLLC; Sang Ho Lee

(57) ABSTRACT

A system is provided. The system includes a processor, a memory, and an I/O device, an interaction engine unit stored in the memory and including a plurality of reusable software components. The plurality of the reusable software components is configured by a user, through a configuration process, to create at least one control flow and at least one service component representing at least one service. The at least one control flow executes a configured logic upon receipt of at least one event. The at least one control flow controls interactions among the at least one services or the at least one service to the at least one event. And, the interaction engine unit dynamically reconfigures the system configuration at run time based on at least one environmental condition.

18 Claims, 34 Drawing Sheets

Related U.S. Application Data

(60) Provisional application No. 62/170,336, filed on Jun. 3, 2015, provisional application No. 62/134,483, filed on Mar. 17, 2015, provisional application No. 62/506,595, filed on May 15, 2017.

(51) Int. Cl.
| | |
|---|---|
| *H04L 12/66* | (2006.01) |
| *H04L 12/801* | (2013.01) |
| *H04W 4/70* | (2018.01) |
| *G06N 20/00* | (2019.01) |
| *H04W 4/50* | (2018.01) |
| *G06F 15/76* | (2006.01) |
| *H04W 8/00* | (2009.01) |

(52) U.S. Cl.
CPC .......... *H04L 12/66* (2013.01); *H04L 41/0806* (2013.01); *H04L 47/10* (2013.01); *H04L 67/02* (2013.01); *H04W 4/50* (2018.02); *H04W 4/70* (2018.02); *H04L 41/5006* (2013.01); *H04L 67/10* (2013.01); *H04W 8/005* (2013.01)

(58) Field of Classification Search
CPC .......... H04L 67/10; H04L 12/66; H04W 4/70; H04W 4/50; H04W 8/005; G06F 15/76; G06N 20/00
USPC .......................................................... 709/223
See application file for complete search history.

(56) References Cited

U.S. PATENT DOCUMENTS

| | | | |
|---|---|---|---|
| 2005/0083907 A1* | 4/2005 | Fishler | H04L 1/1671 370/352 |
| 2005/0091336 A1* | 4/2005 | DeHamer | H04L 67/02 709/217 |
| 2007/0266414 A1* | 11/2007 | Kahn | H04N 7/162 725/113 |
| 2014/0241354 A1 | 8/2014 | Shuman et al. | |
| 2015/0019553 A1 | 1/2015 | Shaashua et al. | |
| 2016/0095017 A1* | 3/2016 | Ely | H04W 4/027 455/454 |

* cited by examiner

SYSTEM AND METHOD FOR DEVELOPING RUN TIME SELF-MODIFYING INTERACTION SOLUTION THROUGH CONFIGURATION

CROSS-REFERENCE TO RELATED APPLICATIONS

The present application for patent claims the benefit of Provisional Application Ser. No. 62/506,595 entitled "RUN TIME LOGIC CONFIGURATION AND EXECUTION ENGINE ON TOP OF AN INTERACTION FRAMEWORK" filed on May 15, 2017, the disclosures of which are hereby expressly incorporated by reference in its entirety, and is a continuation-in-part application of U.S. application Ser. No. 15/071,841, which was filed on Mar. 16, 2016 and claims the benefit of Provisional Patent Application No. 62/134,483 entitled "METHOD AND APPARATUS FOR ENABLING ENTERACTION AMONG CONNECTED THINGS" filed on Mar. 17, 2015, and further to Provisional Patent Application No. 62/170,336 entitled "METHOD AND APPARATUS FOR ENABLING DYNAMIC MAPPING OF INTERACTIONS THROUGH SERVICE ELEMENTS" filed on Jun. 3, 2015. Each of the aforementioned disclosures is hereby expressly incorporated by reference in its entirety.

FIELD OF THE DISCLOSURE

Various embodiments described herein are generally directed to a system, a non-transitory computer readable medium storing a computer readable program for executing a method for an interaction logic with run time re-configuration via the system, and an Internet of Things (IoT) interaction framework.

BACKGROUND OF THE DISCLOSURE

The Internet of Things (IoT) is the network of physical objects and their virtual representations-devices, vehicles, buildings and other items embedded with electronics, software, sensors, and network connectivity which enable these objects to collect and exchange data. The IoT is networked via wireless radio frequency, optical cables, or twisted copper cables using protocols such as ZigBee® (an IEEE 802.15.4-based specification for a suite of high-level communication protocol), wireless technology, Bluetooth®, Ethernet, and Internet Protocol (IP). Examples of such connections are sensor devices connected to a networked device over Bluetooth®, smart lights connected to their control device over ZigBee® and network devices connected over IP.

While IoT technology solutions tend to be a single product or service, IoT technology solutions are increasingly becoming a combination of products and services as smart devices become increasingly connected. As IoT solutions move from being a single product or service solution to a solution that involve a combination of multiple IoT products and services, IoT applications are created to integrate the IoT products and services together. IoT applications generally are comprised of service logic and interaction logic. Service logic defines a specific function, the access to which is made available to others. Interaction logic defines how various services interact with each other.

The IoT technology industry has relied on creating solutions by developing IoT applications to stitch together various IoT devices and services. Previously, when the number of IoT products and services participating in a solution was manageable and the solution was mostly involved in a fixed set of IoT products and services, an IoT application was feasible. In that case, an IoT application can be built having both IoT service and interaction logic hard-coded.

However, due to the recent developments of IoT applications, the ability to create solutions is becoming an increasingly challenging effort. This is because a number of products and services participating in an IoT solution increases, and the set of products and services participating in the solution may no longer be fixed. As a result, IoT solution programmers need to expend energy and resources creating increasingly large interaction logic. Consequently, IoT applications tend to take longer to develop, have a higher cost, are more complex with increased dependency, and need higher skilled resources.

There has been great progress in improving device intelligence, connectivity, analytical services, and integration platforms. However, creating and deploying an IoT solution has been, and still is, a difficult process. It is a software integration and development exercise where engineers with specific skill sets are required to spend large amounts of effort. One of the main barriers for creating a solution is the complexity of interacting with many IoT devices and services. Even with the help of improved platforms and messaging services, most of the interaction relies on developers' coding skills and efforts.

Networking Industries grew rapidly when appliances such as bridges, switches, and routers allowed the industry to deploy networks by configuration rather than software development. Some change is needed in creating IoT technology solutions, where interactions are no longer coded by developers into an application, but instead configured into a product that abstracts out the interaction logic from applications. Solving such a challenge should not be executed through forms of heavy application when the IoT application is created with a large interaction stack. Rather the approach should be centered around creating a product that can configure and execute on interaction logic's basic elements.

It has been needed a solution to link two different entities directly together, followed by creating hubs to link many different entities, and finally moving towards infrastructure products. Infrastructure products have played an important role in massively scaling industries. Table1 shows examples of such infrastructure products including phone switches for PSTN (public switched telephone network), routers for Internetworking, and distribution centers for logistics. Infrastructure products have flourished in connectivity focused industries such as the ones mentioned above.

TABLE 1

| Industry | Point-to-Point | Hub | Infra-structure | Infra Business |
|---|---|---|---|---|
| Delivery | Hand Delivery | Warehouse | Distribution Center | UPS, FEDEX |
| Communication | Meeting | PBX | PSTN | Verizon, AT&T, Twillio |
| Data | Direct Cable | Switch, Bridge | Router | AT&T, Comcast |
| IoT | Interface Coding | Platform, Middleware | To be developed | To be developed |

Therefore, for the reason that it is not a scalable solution trying to link every entity using a single point solution, an infrastructure solution is needed for solution development of linking different entities in an easy and flexible way rather than hard-coding to reduce the time and cost of developing IoT solution systems. Another problem is related to the cost of maintenance and re-development of IoT solution systems. Each time the application environmental conditions have changed, the IoT solution systems need to be adjusted or re-developed accordingly based on the environmental condition changes. Such adjustment or re-development may involve human effort and increases the cost for maintenance of IoT solution system for the applications having variable environmental conditions. Therefore, a self-modifying system, which can reconfigure the system at run time, is needed so that the IoT solution systems can be self-adaptive to the changes of the application environmental conditions without involvement of human developers and can reduce the cost related to maintenance and re-development of the IoT solution systems.

SUMMARY OF THE DISCLOSURE

An Internet of Things (IoT) interaction system is provided. In one very specific embodiment, an IoT interaction system includes a processor, a memory, an I/O device and an interaction engine unit stored in the memory. The interaction engine unit includes a plurality of reusable software components. And, the plurality of the reusable software components is configured by a user to create at least one control flow and at least one service component representing at least one service, through a configuration process. The at least one control flow executes a configured logic upon receipt of at least one event. The at least one control flow controls interactions among the at least one service or the at least one service to the at least one event. The interaction engine unit dynamically reconfigures the system configuration at run time based on at least one environmental condition.

The interaction engine unit includes a configuration unit and an execution unit, wherein the configuration unit stores configuration information from the user and the execution unit executes the at least one control flow.

The configuration unit includes an entity module storing at least one entity component representing at least one networked entity, an entity type module storing an entity type of the at least one networked entity, a service module storing the at least one service component representing the at least one service provided by the at least one networked entity, and a flow module storing the at least one control flow.

The at least one service includes at least one source service and at least one target service using different interaction protocols, wherein the execution unit breaks down output data from the at least one source service, and parses, maps, or transforms the output data readable to the at least one target service in accordance with a predetermined setting.

The execution unit includes a self-commanding logic which dynamically issues a command to the self-commanding logic itself during execution and reconfigures the system at run time.

The interaction engine unit further includes at least one configuration variable and the self-commanding logic reconfigures the system by modifying the at least one configuration variable at run time.

The interaction engine unit further includes at least one logic driven variable comprising a logic or a logic block, wherein the logic driven variable is initialized with the logic or the logic block and dynamically obtains a new value when the logic or the logic block executes under different environmental conditions.

The at least one environmental condition may be at least one parameter related to an internal state of the system.

The at least one environmental condition may be at least one parameter inputted from an external networked entity.

The system further includes a cloud application logic and a machine learning module as an artificial intelligence (AI) solution used to be implemented on a cloud or a server.

The at least one control flow includes at least one Do Logic, wherein the at least one control flow is implemented granularly based on the at least one Do Logic.

The system further includes a networking device storing the interaction engine unit, wherein the networking device sends a data to a cloud application comprising a machine learning library, wherein the interaction engine unit reconfigures the system upon receipt of a processing result from the machine learning library in the cloud application.

The networking device further stores an operating system and a configuration variable of the system. The at least one service component includes a first server component corresponding to a first networked entity, a second server component corresponding to a second networked entity, and a first client component corresponding to the cloud application comprising the machine learning library. The networking device communicates with the first networked entity through the first server component and communicates with the second networked entity through the second server component. The networking device communicates with the cloud application and the machine learning library through the first client component. The operating system directly communicates with a fourth networked entity. The networking device receives the data from the first networked entity through the first server component and compares the data with the configuration variable of the system and performs a corresponding action on the fourth networked entity through the operating system if the data meets a predetermined condition. The networking device sends the data to the cloud application and the machine learning library through the first client component. The machine learning library processes the data and returns the response to the cloud application and the networking device. The networking device, upon receipt of the response, analyses the response and modifies the configuration variable of the system. The configuration variable of the system obtains a new value, and the new value is used by the networking device for comparing with a new data received from the first networked entity through the first sever component.

The at least one event and the at least one service are configured to share a data block during execution.

The at least one event is executed within a scope and the data block that exists within the scope is shared with the at least one event.

The at least one service is executed outside a scope and the data block exists within the scope to be shared with the at least one service is passed as a list of arguments to the at least one service.

The at least one event and the at least one service have a last logic. The last logic has a return value, and wherein the return value is returned as a final return value of the at least one event and the at least one service.

The at least one control flow further includes an execution-scheduled logic, wherein the execution-scheduled logic is scheduled on a specific date and time and executes on the specific date and time as scheduled.

A non-transitory computer readable medium storing a computer readable program for executing a method for an interaction engine unit via a system, the method includes the steps of: receiving a configuration information at the interaction engine unit from a user through a configuration process; creating at least one control flow and at least one service component representing at least one service based on the reusable software components of the interaction engine unit and the configuration information; upon receipt of at least one event, executing a configured logic of the least one control flow controlling interactions among the at least one service or the at least one service to the at least one event; and dynamically reconfiguring a system configuration at run time based on at least one environmental condition.

The interaction unit includes a configuration unit and an execution unit, wherein the method further includes the steps of: storing the configuration information from the user at the configuration unit; and executing the at least one control flow at the execution unit.

The configuration unit includes an entity module, an entity type module, a service module, and a flow module, wherein the method further includes the steps of: registering at least one entity component representing at least one networked entity at the entity module; inputting an entity type of the at least one networked entity at the entity type module; registering the at least one service component representing the at least one service provided by the at least one networked entity; and creating the at least one control flow at the flow module.

The at least one service includes at least one source service and at least one target service using different interaction protocols, wherein the method further includes the steps of: breaking down output data from the at least one source service; and parsing, mapping, or transforming the output data readable to the at least one target service in accordance with a predetermined setting.

The system further includes a networking device, wherein the method further includes the steps of: storing the interaction engine unit at the networked device; sending a data from the networking device to a cloud application comprising a machine learning library; and reconfiguring the system upon receipt of a processing result from the machine learning library in the cloud application.

The networking device further includes an operating system and a configuration variable of the system, wherein the at least one entity component includes a first server component corresponding to a first networked entity, a second server component corresponding to a second networked entity, and a first client component corresponding to the cloud application comprising the machine learning library, wherein the networking device communicates with the first networked entity through the first server component and communicates with the second networked entity through the second server component, wherein the networking devices communicates with the cloud application and the machine learning library through the first client component, wherein the operating system directly communicates with a fourth networked entity, wherein the method further includes the steps of: receiving the data through the first server component from the first networked entity at the networking device; comparing the data with the configuration variable of the system stored in the networking device; if the data meets a predetermined condition, performing a corresponding action on the fourth networked entity through the operating system; sending the data to the cloud application and the machine learning library through the first client component; processing the data at the machine learning library; returning the response from the machine learning library to the cloud application and the networking device; upon receipt of the response, analyzing the response and modifying the configuration variable of the system at the networking device; obtaining a new value for the configuration variable of the system; and comparing a new data received from the first networked entity through the first server component with the new value of the configuration variable at the networking device.

The at least one event and the at least one service are configured to share a data block during execution, where in the method further includes the steps of: sharing the data block in a scope where the at least one event is executed to the at least one event; passing the data block in the scope where the at least one service is executed beyond to the at least one service as a list of arguments; and returning a return value from a last logic of the at least one service and the at least one event as a final return value of the at least one service and the at least one event.

The at least one control flow further includes an execution-scheduled logic, wherein the method further includes the step of executing the execution-scheduled logic on a specific date and time as scheduled.

An IoT interaction system includes a processor, a memory, and an I/O device, and an interaction engine unit stored on the memory. The interaction engine unit includes an entity module storing at least one server component and at least one client component. The at least one client component represents at least one networked entity. The interaction engine unit includes an entity type module storing an entity type of the at least one server component and the at least one client component, a service module storing at least one source service and at least one target service using different interaction protocols, and a flow module storing an interaction logic having a predetermined condition. The interaction logic executes based on at least one event and reconfigures the IoT interaction system at run time based on at least one environmental condition. The interaction engine unit includes an execution module, which, upon receipt of a first data from the at least one source service, executes the interaction logic of parsing, mapping, or transforming the first data to a second data, and transmits the second data to the at least one target service.

DETAILED DESCRIPTION OF THE EMBODIMENT

Figure 1A:
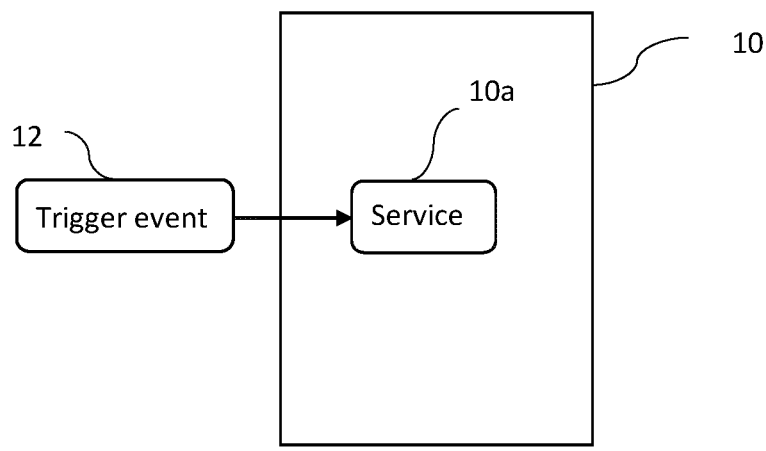
FIG. 1A is a schematic diagram illustrating a configuration in which a first IoT interaction system has a service interacting with a trigger event according to one embodiment of the present disclosure.

Reference will now be made in detail to the several embodiments, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like, may be used to describe various elements, but do not limit such elements. Such terms are only used to distinguish one element from another.

Further, many aspects are described in terms of possible sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of herein as, for example, "logic configured to" perform the described action.

The term "Internet of Things (IoT) device," "networked entity," or "networked device" are used interchangeably. The term "Internet of Things (IoT) device" or "networked entity" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. The term "Internet of Things (IoT)" herein has broader meaning to include, e.g., software-defined networking (SDN), Web services, enterprise solutions, etc.

The term "unit" or "module" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function.

The networked entity may include one or more of the following components: sensor; radio frequency identification (RFID) technology; global positioning system technology; mechanisms for real-time acquisition of data; passive or interactive interfaces; and mechanisms of outputting and/or inputting sound, light, heat, electricity, mechanical force, chemical presence, biological presence, location, time, identity, other information, or any combination thereof. The networked entity may have a passive communication interface, such as a quick response (QR) code, a radio-frequency identification (RFID) tag, an NFC tag, or the like, or an active communication interface, such as a modem, a transceiver, a transmitter-receiver, or the like. The networked device can have a particular set of attributes (e.g., a device state or status, such as whether the networked device is on or off, open or closed, idle or active, available for task execution or busy, and so on, a cooling or heating function, an environmental monitoring or recording function, a light-emitting function, a sound-emitting function) that can be embedded in and/or controlled/monitored by a central processing unit (CPU), microprocessor, ASIC, or the like.

The networked entities may include, for instance, but are not limited to, smart phones, smart watches, smart sensors, refrigerators, toasters, ovens, microwaves, freezers, dishwashers, dishes, hand tools, clothes washers, clothes dryers, furnaces, air conditioners, thermostats, light fixtures, vacuum cleaners, sprinklers, electricity meters, gas meters, desktop computers, laptop computers, tablet computers, personal digital assistants (PDAs), networked lighting system, communication devices, networked vehicle accessories, smart accessories, tablets, smart TV, smart security system, smart home system, devices for monitoring or interacting with or for people and/or places, electric car, networked appliances, networked peripheral devices or any combination thereof, so long as the networked devices are equipped with an addressable communications interface for communicating with other networked entity. Accordingly, the networked entity may be comprised of a combination of typical internet-accessible devices (e.g., laptop or desktop computers, cell phones, etc.) in addition to devices that do not typically have internet-connectivity (e.g., dishwashers, etc.).

The present disclosure is related to a method and IoT interaction system for enabling interactions between connected networked devices. The IoT interaction system enables interaction between connected entities. Interaction may be between some events and services provided by some networked entities.

As the number of IoT devices in an IoT solution increases, it is likely that networked devices using different communication protocols will be very difficult to communicate with each other. In this case, IoT solution programmers will need to spend more time developing the interaction logic of each of the devices individually in order to enable more efficient communication among the networked devices. However, this will cause potential problems because such program development requires highly skilled programmers and an extended time. Furthermore, as the number of networked devices increases, interaction logic will become more complex. To solve this problem, according to one embodiment of the present disclosure, instead of hard-coding the interaction layer of an application, the process can be configured such that a user can simply change or adjust the settings with ease through various interfaces, e.g., a user interface (UI) or command line interface (CLI).

For the exemplary purpose of explanation only, the term "IoT interaction system" has been used in this specification but its usage and meaning are not limited thereto. For instance, the term "IoT interaction system" can refer to a specific computer program that runs on a computing device, a cloud, a circuit, or a web-based software connected to a network. The "IoT interaction system" can refer to any device having such IoT interaction system thereon. The term "IoT interaction systems" can refer to all the embodiments of the IoT interaction systems in general. The term "IoT solution system" is used in this specification to describe an application system developed as an IoT solution using one embodiment of the IoT interaction systems. The "IoT solution system" may include other external networked entities connected to the IoT interaction systems.

Interaction can be between some events and services provided by some networked entities and the IoT interaction systems execute based on different events. The IoT interaction systems can be self-modifying by reconfiguring the system configuration at run time according to certain environmental conditions. The self-configuration can be implemented by a self-commanding logic which issues a command to modify the system configuration when the environmental conditions change. The self-configuration can be implemented by a logic driven variable which include variable value and a logic assigned to the logic driven variable. The system is reconfigured by executing the logic of the logic driven variable to modify the variable value based on changes of environmental conditions. The environmental conditions can be internal state related parameters of the IoT interaction systems or external input parameters from other networked entities, such as, a cloud application and a machine learning library. The IoT interaction systems may include the cloud application logic and artificial intelligence analytical program to run as a standalone device even when internet goes down. The interaction logic may be implemented granularly based on Do Logic. The events and services may be configured to share data both within or cross the scope in which the events and services are defined. The interaction logic can be scheduled and execute based on the scheduled date and time. There are many advantages for the IoT interaction systems. For example, the self-modifying system according to the change of environmental conditions eliminates the needs for adjustment or re-development for the IoT solution system and reduce the cost related to maintaining the IoT solution system in applications. The cloud application logic and artificial intelligence program integrated in the IoT interaction systems can provide artificial intelligence analytical functionality even then internet connection goes down. Each advantage is for specific embodiment of the IoT interaction systems. Each specific embodiment of the IoT interaction systems does not need to have each and every advantage as discussed above. The advantages are for exemplary purposes only and the IoT interaction systems are not limited thereto.

FIGS. 1A, 1B, 1C, and 1D illustrate the different embodiments of the present disclosure having different configurations for different services and events interacting with each other. FIG. 1A is a schematic diagram illustrating a configuration in which a first IoT interaction system 10 has a service 10a interacting with a trigger event 12 according to one embodiment of the present disclosure. The first IoT interaction system 10 has at least one entity component which is a service 10a interacting with a trigger event 12. The service 10a can be implemented as a standalone service with specific logic defined in the software program of the first IoT interaction system 10. The service 10a can represent a virtual entity defined within the first IoT interaction system 10 or represents the first IoT interaction system 10 itself. An explanatory application example of this embodiment includes the first IoT interaction system 10 which defines the service 10a within the software program of the first IoT interaction system 10 and the service 10a is to log a system data (not shown) upon receipt of the trigger event 12. Each time the service 10a receives the trigger event 12, the service 10a executes the specific logic define within the service 10a to log the system data. The example is for explanatory purpose only and the embodiment is not limited thereto. For example, the first IoT interaction system 10 may have more than services (not shown) defined with the software program of the first IoT interaction system 10 and each of the services may respond to a plurality of trigger events (not shown) to execute the corresponding logic defined within the services. The service 10a is not limited to be the receiver of the trigger event 12. The interaction between the trigger even 12 and the service 10a can be bidirectional. The service 10a may also generate the trigger event 12 based on the specific logic define within the services 10a and output the trigger event 12 to other connected systems (not shown) or networked entities.

Figure 1B:
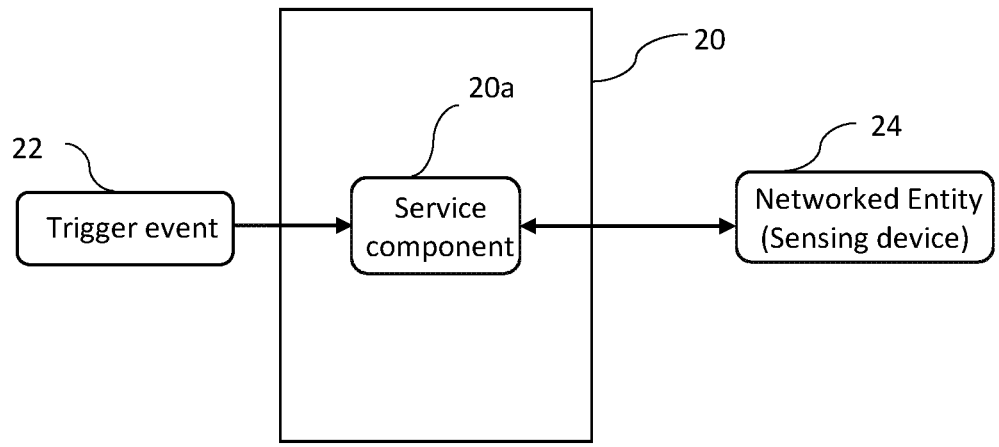
FIG. 1B is a schematic diagram illustrating a configuration in which a second IoT interaction system has a service component corresponding to a service provided by a networked entity and the service component interacting with a trigger event according to another embodiment of the present disclosure.

FIG. 1B is a schematic diagram illustrating a configuration in which a second IoT interaction system 20 has a service component 20a corresponding to a service provided by a networked entity 24 and the service component 20a interacting with a trigger event 22 according to another embodiment of the present disclosure. The second IoT interaction system 20 has a service component 20a which is corresponding to the service provided by the networked entity 24. The service component 20a responds to a trigger event 22 and interacts with the networked entity 24 upon receipt of the trigger event 22. An exemplary IoT solution system (not shown) includes the second IoT interaction system 20 which has the service component 20a for the networked entity 24. The networked entities which is identified as a sensing device (not shown) providing a sensing and data output service. The service component 20a stores the interfacing information of the sensing device (not shown). The second IoT interaction system 20 interacts with the sensing device (not shown) through the service component 20a. Each time the second IoT interaction system 20 receives the trigger event 22, the second IOT interaction system 20 reads data from the sensing device (not shown) through the service component 20a and stores the data within the second IoT interaction system 20. Herein, the sensing device (not shown) is an example of the networked entity 24 and the networked entity 24 is not limited thereto. Any entity can be accessed through network should or could be known to one ordinary skilled in the art could be included. The second IoT interaction system 20 may have a plurality of service components (not shown) corresponding to a plurality of networked entities (not shown) and interacts with more than one trigger events (not shown). For the explanatory purpose, the term "service component" is used to describe the software component implemented in the software of the IoT interaction systems to represent a service provided by the networked entities. For example, the service component 20a may represent the sensing and data output service of the sensing device (not shown). The service component 20a has the interface information and other information of the networked entity 24 to allow the networked entity 24 to be accessed by the second IoT interaction system 20. The terms "service component" and "service" are interchangeable when the represented service is defined and performed in software.

Figure 1C:
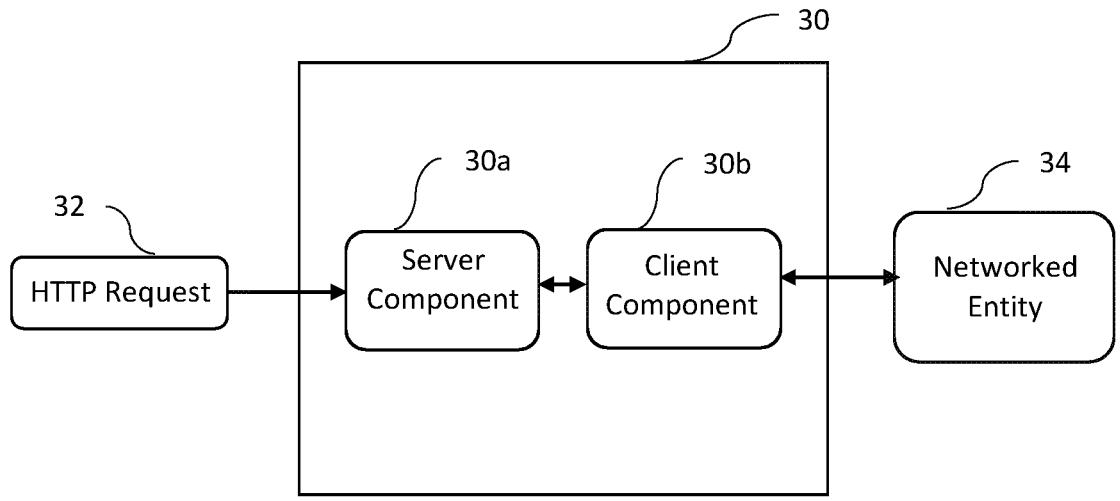
FIG. 1C is a schematic diagram illustrating a configuration in which a third IoT interaction system has a server component interacting with a HTTP request and a client component corresponding to the service provided by a networked entity according to another embodiment of the present disclosure.

FIG. 1C is a schematic diagram illustrating a configuration in which a third IoT interaction system 30 has a server component 30a interacting with a HTTP request 32 and a client component 30b corresponding to the service provided by a networked entity 34 according to another embodiment of the present disclosure. The third IoT interaction system 30 has a service component 30a and a client component 30b. The server component 30a handles the HTTP request 32 and executes corresponding logic upon receipt of the HTTP request 32. The client component 30b represents a networked entity 34 and includes software components for all the services provided by the networked entity 34. The third IoT interaction system 30 interacts with the networked entity 34 through the client component 30b. The server component 30a interacts with the client component 30b upon receipt of the HTTP request 32. In an exemplary application of this embodiment, the networked entity 34 can be a camera (not shown) and the HTTP request 32 is through an internet connection. The server component 30a is an HTTP Rest server, which stands for the widely used "Representational State Transfer Server," to handle the HTTP request 32. Upon receipt of the HTTP request 32, the server component 30a, which is the HTTP Rest server, issues a command to the networked entity 34 through the client component 30b to take a picture on the camera (not shown). Herein, for the exemplary purpose only, the networked entity 34 is described as the camera (not shown); however, the example of the networked entity 34 is not limited thereto. The networked entity 34 can be any entity accessible through network which is known or could have been known to one ordinary skilled in the art. For the exemplary purpose, the third IoT interaction system 30 can be implemented based on the REST client-server's architecture which allows the server component and the client component to evolve separately without affecting each other. For the exemplary purpose, the IoT interaction system 30 is not limited to be receiver of the HTTP request 32. The third IoT interaction system 30 can be a source of the HTTP request 32 sending to other systems (not shown) based on the execution of specific logic in the server component 30a. The interaction between the other systems (not shown) and the third IoT interaction system 30 can be bidirectional.

Figure 1D:
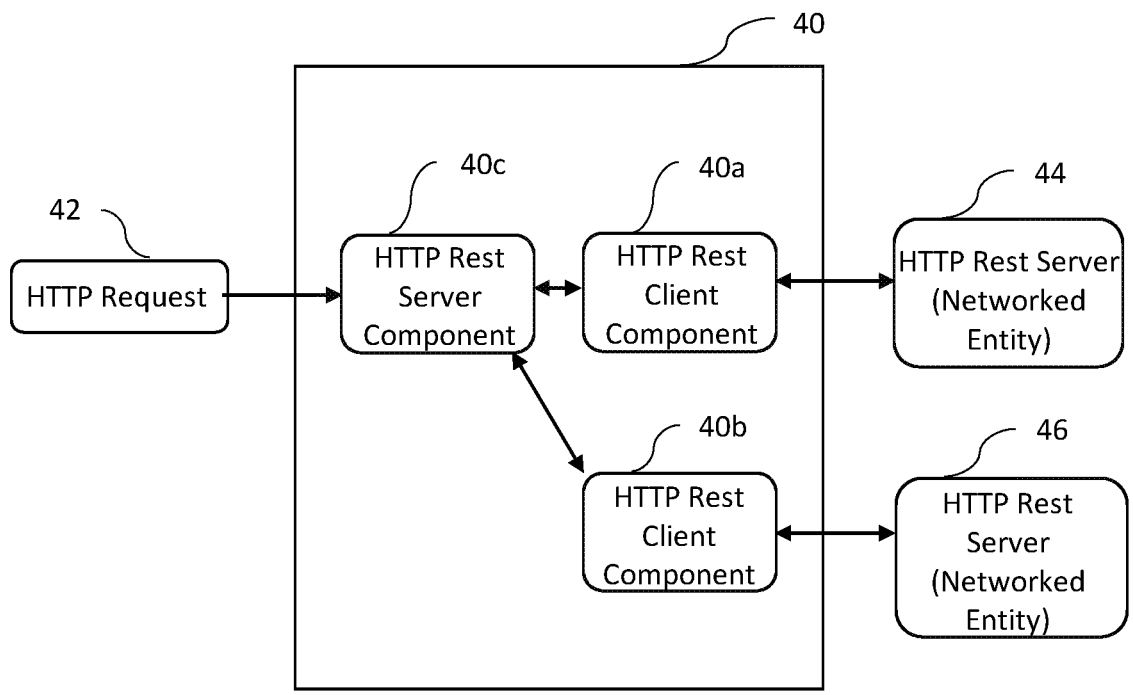
FIG. 1D is a schematic diagram illustrating a configuration in which a first networked entity interacts with a second networked entity and a user request via the client components and server component in a fourth IoT interaction system according to another embodiment of the present disclosure.
Figure 2:
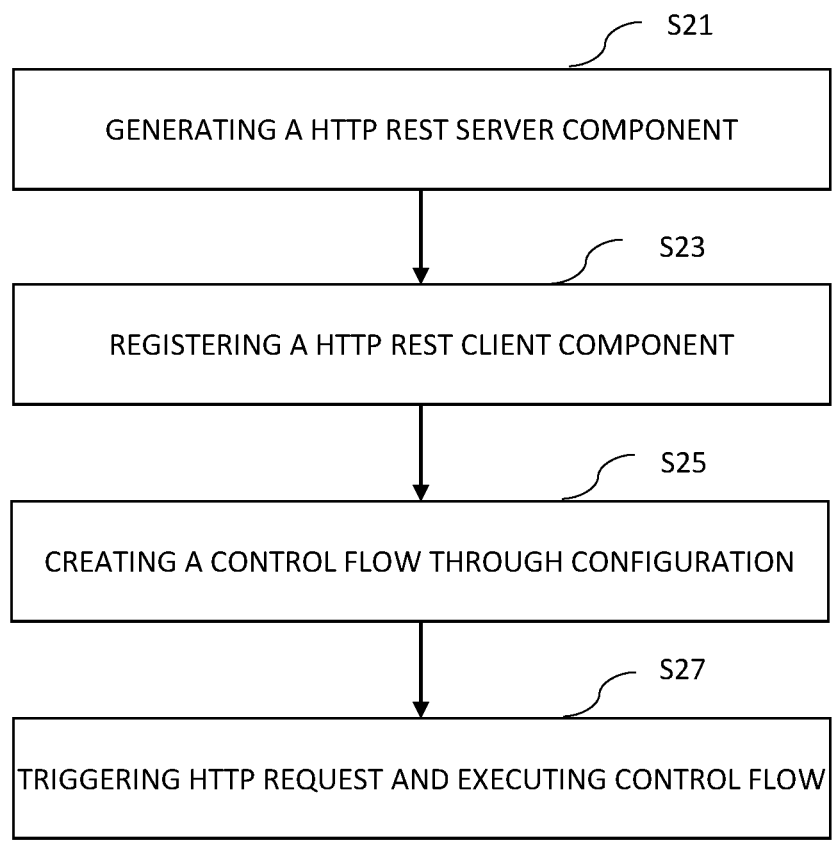
FIG. 2 is an example of a flowchart where the first and second networked device interact therebetween according to the embodiment of the present disclosure as illustrated in FIG. 1D.

FIG. 1D is a schematic diagram illustrating a configuration in which a first networked entity 44 interacts with a second networked entity 46 and a HTTP request 42 via the client components 40a and 40b and a server component 40c in a fourth IoT interaction system 40 according to another embodiment of the present disclosure. First and second networked entities 44 and 46 are identified and labelled REST Server, which stands for the widely used "Representational State Transfer Server." FIG. 2 shows an example of a flowchart that configures the interaction logic which allows the first and second networked entities 44 and 46 to interact therebetween.

The first networked entity 44 can use an interaction protocol different from the second networked entity 46. For instance, the first networked entity 44 uses one of the following interaction protocols: MQTT (ISO/IEC PRF 20922), constrained application protocol (CoAP), unified application programming interface (API), unified software development kit (SDK), unified protocols(s) and/or interoperability interfaces. The second networked entity 46, for instance, can use one of any the remaining interaction protocols not employed by the first networked entity 44. The fourth IoT interaction system 40 can facilitate an interaction between the first and second networked entities 44 and 46 regardless whether the first and second networked entities 44 and 46 are using same or different interaction protocols.

In the absence of the fourth IoT interaction system 40, for instance, the first networked entity 44 would need to directly communicate with the HTTP request 42, e.g. a computer or a mobile app. For instance, if the first networked entity 44 is a smart light bulb having an internet-like-structure, a user can use HTTP request 42, e.g., a user's mobile application, to directly control the smart light bulb. However, if there is a plurality of networked entities (not shown) using different protocols, one single HTTP request 42 may not have the capacity to manage the plurality of the networked entities (not shown).

According to one embodiment of the present disclosure, when the user needs to make at least one interaction between the first networked entity 44 and a plurality of networked entities (not shown) using different protocols, the user can connect the first networked entity 44 and the plurality of networked entities with the fourth IoT interaction system 40, respectively. In this embodiment of the present disclosure, for the exemplary purpose, the fourth IoT interaction system 40 can be implemented based on the REST client-server's architecture. The fourth IoT interaction system 40 can generate the REST server and a plurality of REST clients. The REST server can communicate with the HTTP request 42. The plurality of REST clients represent the plurality of networked entities in the IoT interaction system and can interact with the plurality of networked entities. At least one interaction can be created by a user between the REST server and the plurality of REST clients in the IoT interaction system.

Referring to FIG. 1D, a first REST client component 40a, a second REST client component 40b, and a REST server component 40c can be registered on the fourth IoT interaction system 40 either by automatic or manual means. At least one interaction can be defined among the first REST client component 40a, the second REST client component 40b, and the REST server component 42c. The first REST client component 40a represents the first networked entity 44 connected to the fourth IoT interaction system 40. The second REST client component 40b represents the second networked entity 46. REST server component 40c can be automatically registered. However, it is not limited thereto and the REST server component 40c can be manually registered by the user. In the IoT interaction system 40, the REST server component 40c can be coupled to the first REST client component 40a and the second REST client component 40b, respectively to create at least one interaction. Here, the terms "interaction," "control flow," or "flow" are interchangeably used. For the exemplary purpose, the IoT interaction system 40 can be performed on HTTPprotocol.

IoT applications generally are comprised of service logic and interaction logic. For example, as illustrated in FIG. 1C, the third IoT interaction system 30 has the client component 30b which include the service logic for the networked entity 34. The third IoT interaction system 30 also has interaction logic controlling the interaction between the service component 30a and the client component 30b. Service logic defines a specific function, the access to which is made available to others. It is characterized by a set of inputs and outputs, along with the actions it takes. For example, the service logic in the client component 30b can include any possible services provided by the networked entity 34. The examples for possible services include, but are not limited to, the sensor data published by a sensor, a data analytics service provided by a company, device access services provided by a platform, or the information services from a process running on a device. Service defines the nature of interaction such as how to send data, receive data, response to data, method used, and what interface to use. For example, the service logic in the client component 30b defines how the networked entity 34 sends and receives data, what method is used and what interface is used between the networked entity 34 and the third IoT interaction system 30, as illustrated in FIG. 1C. Service also defines how an entity interacts with other entities, what interactions are involved, and how the interactions can be executed. Interaction logic defines how various services interact with each other. For example, FIG. 1D illustrates the fourth IoT interaction system 40 has two client components 40a and 40b, which have service logic defined within the two component 40a and 40b respectively. The service logic in the first client component 40a and the second client component define how the first networked entity 44 interacts with the second networked entity 46 through the fourth IoT interaction system 40. The interaction logic between the first and second client component 40a and 40b defines how the service defined within the two client components 40a and 40b interact with each other. The service logic and interaction logic illustrated in FIGS. 1C and 1D are for exemplary purpose only and are not limited thereto.

Event can be a block of logic that gets executed when triggered by a given event. Special events include, but are not limited to: receipt of an event, a response, and a trigger on corresponding event within an interface or service. For example, in FIG. 1D, the receipt of the HTTP request 42 is an event to trigger the interaction among the server component 40c, the first client component 40a, and the second client component 40b. Custom events can be created and referenced by logic within other event logic blocks. For example, in FIG. 1D, the HTTP request 42 can service as a switching event to the fourth IoT interaction system 40, which, upon receipt of the HTTP 42, starts to monitor another data input event from the first networked entity 44. Once the fourth IoT interaction system 40 received the data input event from the first networked entity 44, the fourth IoT interaction system 40 transfers the received data to the second networked entity 46. Herein, the data input event from the first networked entity 44 has referenced the HTTP request 42 within the logic of the data input event. Event can also be a state or a result of executing specific logic and services as a trigger event to logic execution thereafter and forms a chain of event triggering. For example, the server component 40c in the fourth IoT interaction system 40 can define and execute a specific logic to monitor the system time and generate a trigger event (not shown) to trigger the interaction of the first client component 40a and the second client component 40b periodically. Herein, the trigger event generated by the server component 40c is a state or a result of executing specific logic, which is the system time in this example. The events and the interactions between the events and other logic in above examples are for exemplary purpose only and are not limited thereto.

Referring to FIG. 2, there are briefly described four (4) steps of how to configure an interaction between the first networked entity 44 and the second networked entity 46 in the fourth IoT interaction system 40. Next, each step is then described in more detail. The REST server component 40c can be generated in fourth the IoT interaction system 40 (S21). All interactions (control flow) can start with the REST server component 40c. REST server component 40c can be, for example, pre-programmed within the fourth IoT interaction system 40 as an initial triggering entity. The user can set an "entity type" and a "REST service" to associate with the REST server component 40c. Then, the user can register first REST client component 40a and second REST client component 40b (S23). For an exemplary purpose, although only two (2) REST clients are registered here, the number is not limited thereto. If the first and second networked entities 44 and 46 are within same network, e.g., a WiFi, Bluetooth®, intranet or any type of local network, the first and second networked entities 44 and 46 can be detected by the IoT interaction system 40 and registered either by automatic or manual means. The user can create a plurality of REST clients (not shown) as needed. Once the first and second networked entities 44 and 46 are registered, the user can create a control flow in the IoT interaction system (S25). Upon receipt of an input of the first service in the first networked entity 44, a second service in the second networked entity 46 can be triggered (S27).

The IoT interaction systems service as the backend infrastructure and framework for developing IoT solutions for both simple applications such as a website, and complex applications, for example, the IoT solution systems as illustrated in FIGS. 1A-1D. The server-side software components in IoT solutions are used to be implemented by hard-coding which takes great effort for both implementation and maintenance. The IoT interaction systems abstract out the repeatable severs-side components of software and simplifies the repeatable servers-side software components into re-usable configurations. For example, the server component 30a and the client components 30b in the third IoT interaction system 30 can be created by configuration instead of hardcoding. When the application requirements have changed, for example, another networked entity is connected, users can re-configure the software component to have the HTTP Rest server component 40c, the first HTTP Rest client component 40a, and the second HTTP Rest client 40b, as in the fourth IoT interaction system 40 in FIG. 1D. The server and client components 30a and 30b, the HTTP Rest server component 40c, and the first and second HTTP Rest client component 40a and 40b are examples of the re-suable software components abstracted out from the application stack. In the IoT interaction systems, the interaction logic, in the form of a computer-readable storage medium having computer usable program code for instructions, defines how different services connect, talk, understand, and decide to act upon request from each other. Using the IoT interaction systems, the interaction logic in the form of computer readable code for instructions can be implemented using configuration instead of hard-coding. It reduces the time it takes to build the solutions and reduces the effort required to maintain the solutions. The IoT interaction systems focus on visibility and simplicity and are built with good separation of concerns and balanced distribution of run-time responsibilities. By abstracting interaction logic out of the application stack, the IoT interaction systems provide a novel and easy way of creating IoT solutions.

The IoT interaction systems are designed to execute based on different events. For exemplary purpose, the events can be data being received, connection being made, or scheduled events but are not limited thereto. For example, the event can be the trigger event 12 which triggers corresponding logic in the service component 10a to be performed, as illustrated in FIG. 1A. When the trigger event 12 occurs in the first IoT interaction system 10, the first IoT interaction system executes the corresponding logic that has been configured. The IoT interaction systems allow users to configure the logic according to their need on how to handle each event. For example, users can configure the logic to perform data filtering, data routing, or data transformation. The performance that user can configure the logic to perform are for exemplary purpose and are not limited thereto. All the interaction logic is implemented using configuration instead of hard-coding. Herein, the term "logic" or "interaction logic" can be in the form of a computer-readable storage medium having computer usable program code for instructions.

Entities and services can be registered in the IoT interaction systems either through an automatic discovery or a manual on-boarding process. Registration of the entities and services requires a set of information, which includes but is not limited to, the following parameters: 1) entity type, 2) services, 3) entity identifier, 4) connectivity, 5) interaction (control flow), and 6) scope.

The aforementioned six (6) parameters will be explained below. In particular, entity type and services will be described in further detail with reference to FIGS. 3A, 3B, 3C, 4A, and 4B.

Every object in a network can be an entity. An entity can be a user, a device, a module within a device, a platform, a service provider, or even a process running on a device. Routers, switches, sensors, servers, gas valves, bulb, cooking utensils, and thermostat, and any other objects that are, or can be, connected with the IoT interaction systems are entities. Each of these entities provides a set of services, and the services can be the sensor data that the device publishes out, data analytics service one company provides, the set of device access services provided by a platform, or the information services from a process running on a device. Entities include virtual entities and the IoT interaction systems are entities. Virtual entities can be created. Virtual entities are just another entity within the IoT interaction systems that does not represent any physical entity. Example of such virtual entity are the user and the entity group.

Each entity behaves differently depending on what type of entity it is, and the Entity Type defines what the entity is. For example, it can define whether an entity is a user, a smartphone device, a smart lighting bulb, or a process within one of the devices. It allows the IoT interaction systems to determine what interactions are possible within the entity. An entity could have multiple entity types associated with it. Entity type can be defined, edited, and removed from the IoT interaction systems. The process of associating entities with entity types is described in greater detail below. Such association allows the entities to be grouped and the services configured for an entity type.

Service defines how an entity interacts with other entities. It defines what interactions are involved and how the interactions can be executed. For example, API based services will include information such as API name, information to be passed along, and what information to expect. Push services published on a pub-sub server would include a topic name and what information to expect from the topic. Multiple services can be defined for a single entity. Services can also be created and associated with a specific entity type. Services in the IoT interaction systems can be removed or edited.

Entity Identifier uniquely classifies the entity. A local, global, or custom scoped unique identifier is generated using any method that can guarantee uniqueness. Examples of such method are 1) DB unique ID, 2) Incrementing counter, 3) Combination of scope ID and its unique number such as serial number or UUID (universally unique identifier). This unique identifier does not depend on access method, or relationship. It needs to remain unique even through changes in access methods, relationships, and entity type occur. Multiple identifiers can be assigned to one single entity.

Connectivity defines how the entity can be accessed. For example, connectivity can include method, address, authentication, and entity identifier associated with this connectivity. One single entity can have multiple methods of connectivity.

Relationship defines how the entity is associated with other entities. Examples of such relationships are ownership of a device by a user or containment of a sensor within a platform. Multiple relationships can be defined for a given entity.

Interactions are defined as being between services. In the interaction, one service acts as a source and the other as a target. For example, an interaction is where data from an outside temperature data service of a first device (not shown)

is transmitted to an indoor temperature control service of a second device (not shown). Here, the outside temperature data service acts as a source and the indoor temperature control service acts as a target. Another example of an interaction is a scenario where a timer service of a third device (not shown) interacts with alight bulb on/off service of a fourth device (not shown). Interactions can have a singular relationship or many-to-many relationship between services and recursive/iterative interactions. The interaction may be implemented through communication and/or control integration, including a unified application programming interface (API), unified software development kit (SDK), unified protocol(s), and/or interoperability interfaces between different connected devices.

Scope is used to create separation between entity, connectivity, and interaction. For example, while a plurality of entities are connected to the same set of IoT interaction systems, a subset of the plurality of entities can have visibility to one another because only the subset falls in the same scope. Unique IDs can be created for each scope, and scope specific IDs are used for any interaction. Unique IDs enable tracking a flow of interactions between networked entities, data access, data correlation, security, permission, and authorization etc. For example, with respect to the examples for the interactions above, the first, second, third, and fourth devices can be connected to one single IoT interaction system via a network. However, only the first device and second device can be in a first scope and are visible to one another. Unique IDs can be generated for the first device and the second device in the first scope. In the same manner, the third device and the fourth device can fall in a second scope and be visible one another. A repetition of the plurality of scopes is allowed. For instance, the first device and the third device can fall in a third scope while the first device has the first scope and the third device has the second scope.

Figure 3A:
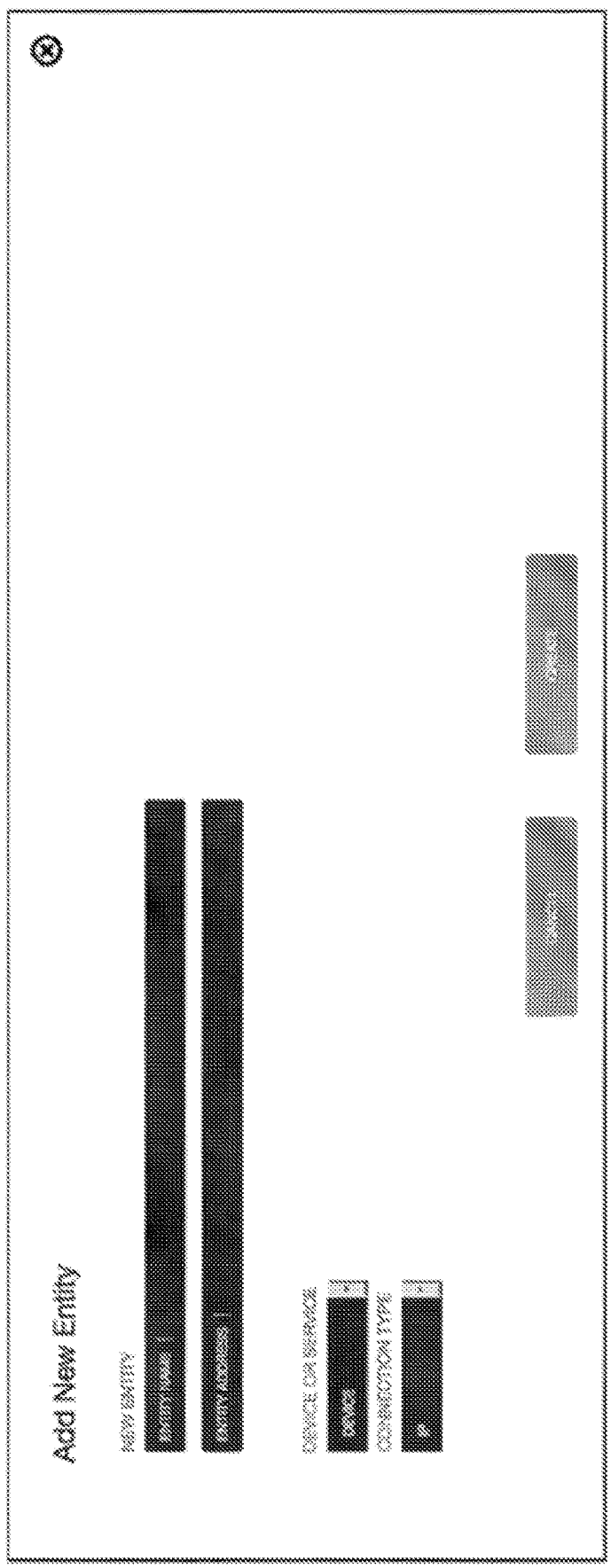
FIG. 3A illustrates a screenshot of the IoT interaction system that depicts a new entity addition according to the embodiments of the present disclosure.

FIG. 3A illustrates a screenshot of the IoT interaction systems that depicts a New Entity screen by which a new entity addition can be made. The Entity name and Entity address are supplied to the first two lines, and the Device or Service and the connection type (e.g. IP) are added to the second two lines. Two action boxes are located in a row at the bottom of the screen to "cancel" or "create" the new Entity. A plurality of entities can be created and added by the user as needed.

Figure 3B:
FIG. 3B illustrates a screenshot of the IoT interaction system that depicts a management of entities according to the embodiments of the present disclosure.

FIG. 3B illustrates a screenshot entitled "AVAILABLE DEVICES AND SERVICES" and "MANAGE ENTITIES". The screenshot is of the IoT interaction systems that depicts a management of entities. Upon clicking "ADD NEW ENTITY" button 33, the user can create a new entity. With "ADD ENTITY TYPE" button 31, a particular entity type can be selected. FIG. 3B also depicts a plurality of registered entities in a left side column: PULZZE_SERVER 65 refers to the REST server 40c and is, for example, prebuilt in the IoT interaction systems as an initial triggering entity. The other entity types listed in the left side column are: PhillipsHueController3 (192.168.102.70,80); GoogleEntity (https//www.googleaps.com; GoogleSystemEntity (location 8020); SamsungCamera (localhost 8021); LocalDataStore (localhost 8025); and Test (test). A column on the right side has respective selections buttons for each entity type, most of which are "UNREGISTER" "SELECT" and "ADD ENTITY TYPE." However, the entities GoogleEntity and Test include an additional button "Add Auth." A horizontal bar divides the screen into the foregoing and a button "Scan IP Devices." The bar is entitled "DISCOVER NEW ENTITIES."

The user can set an "entity type" and a "REST service" to associate with PULZZE_SERVER 65 and with the other entities.

Figure 4A:
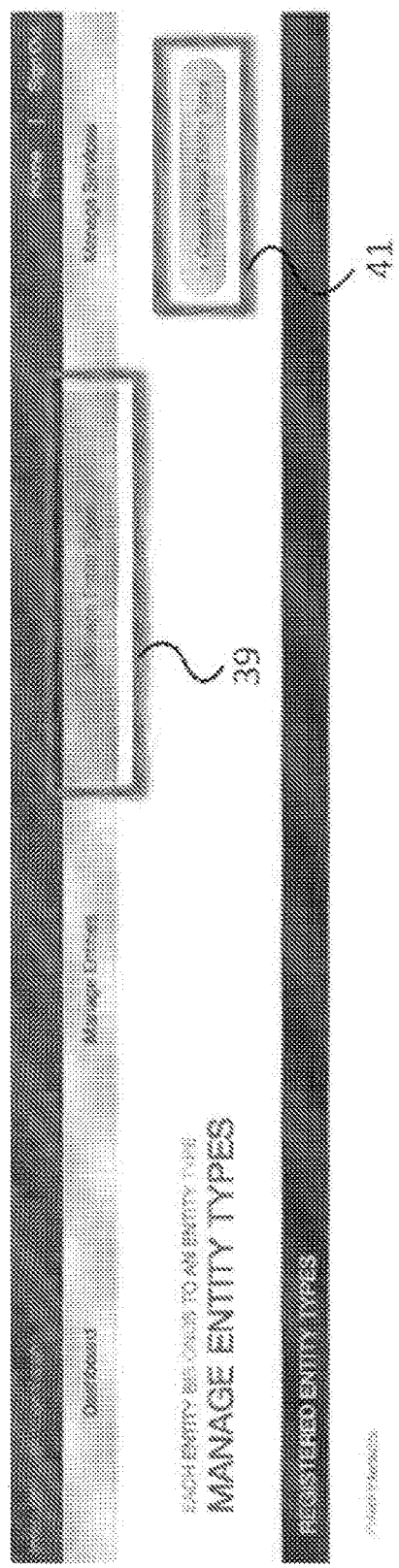
FIGS. 4A-4C illustrate screenshots of the IoT interaction system depicting the creation of the entity type REST server according to the embodiments of the present disclosure.
Figure 4B:
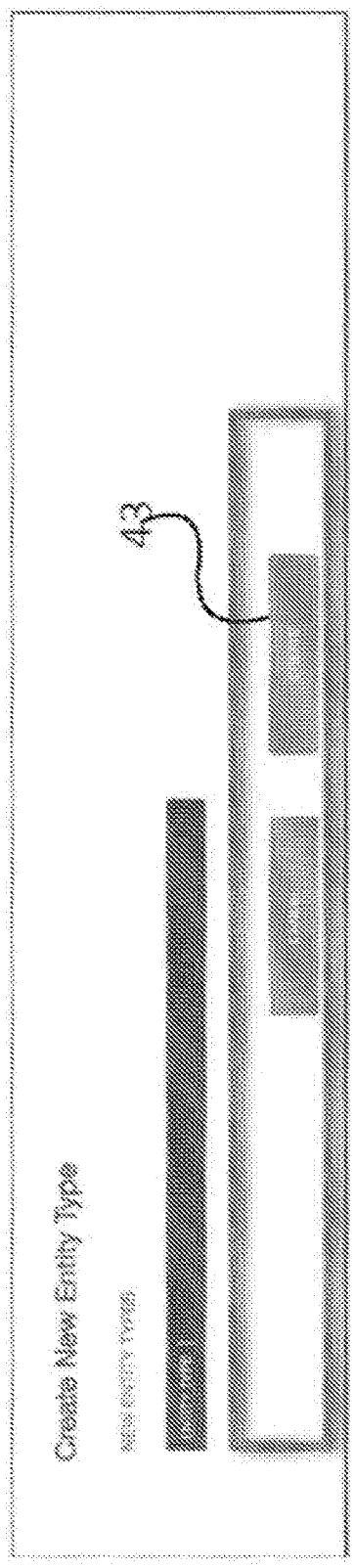
Figure 4C:
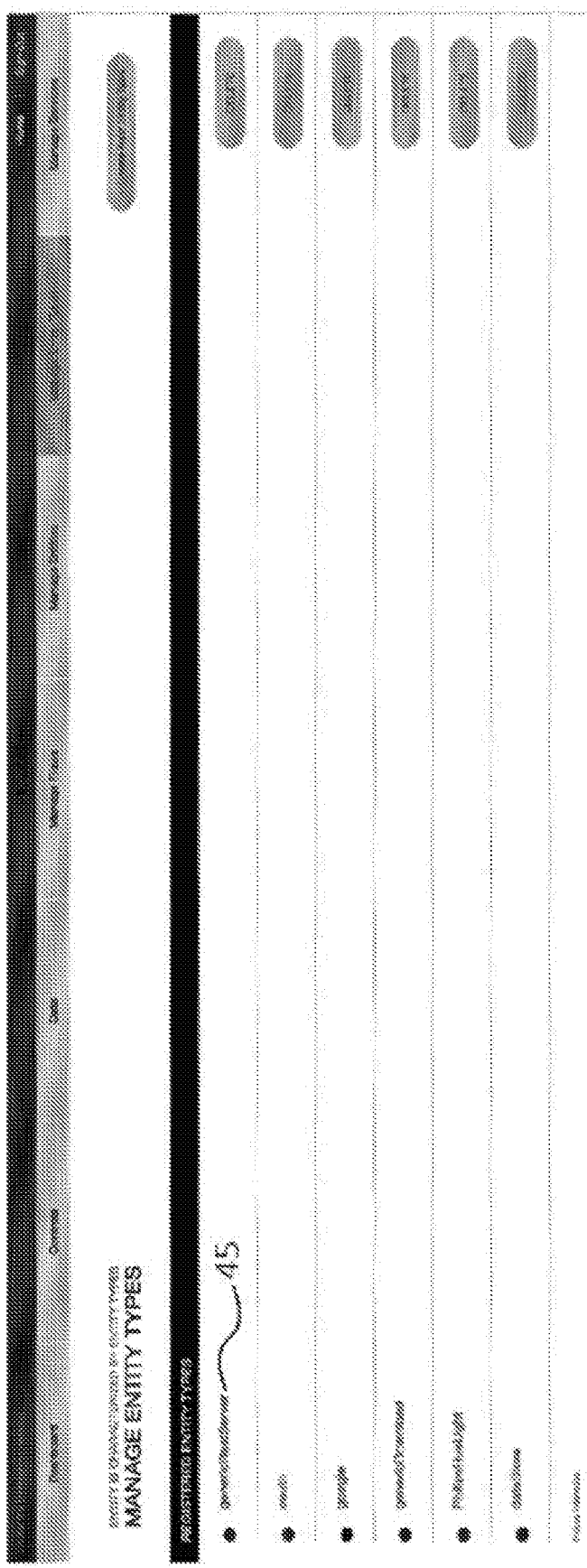

FIGS. 4A-4C illustrate screenshots of the IoT interaction systems that depict how to create the entity type REST server 40c. As shown in FIG. 4A, a user can click on "Manage Entity Type" tab 39 at the top of the navigation bar and click on "Create New Entity Type" button 41 on the right. An example Registered Entity Types is listed as "Pultze Interactor."

As shown in FIG. 4B, the user can enter a name of the entity type in the horizontal bar, and then click on the "Create" button 43. In FIG. 4C, for instance, the user entered a name "genericRestServer," and upon clicking the IoT Create button 43, interaction systems can create and store the "genericRestServer" 45 entity type.

Figure 5A:
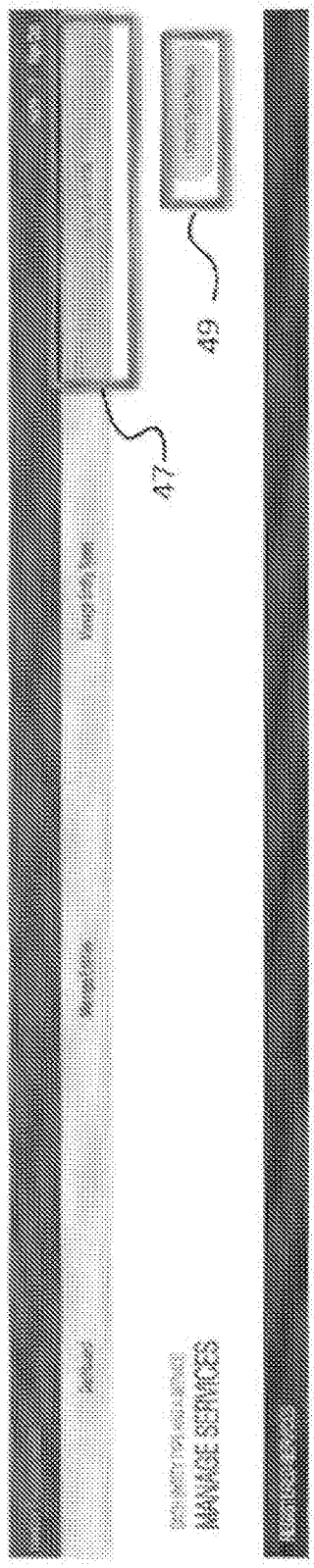
FIGS. 5A-5C illustrate screen-shots of the IoT interaction system depicting a manner of defining a service for the entity type REST server according to the embodiments of the present disclosure.
Figure 5B:
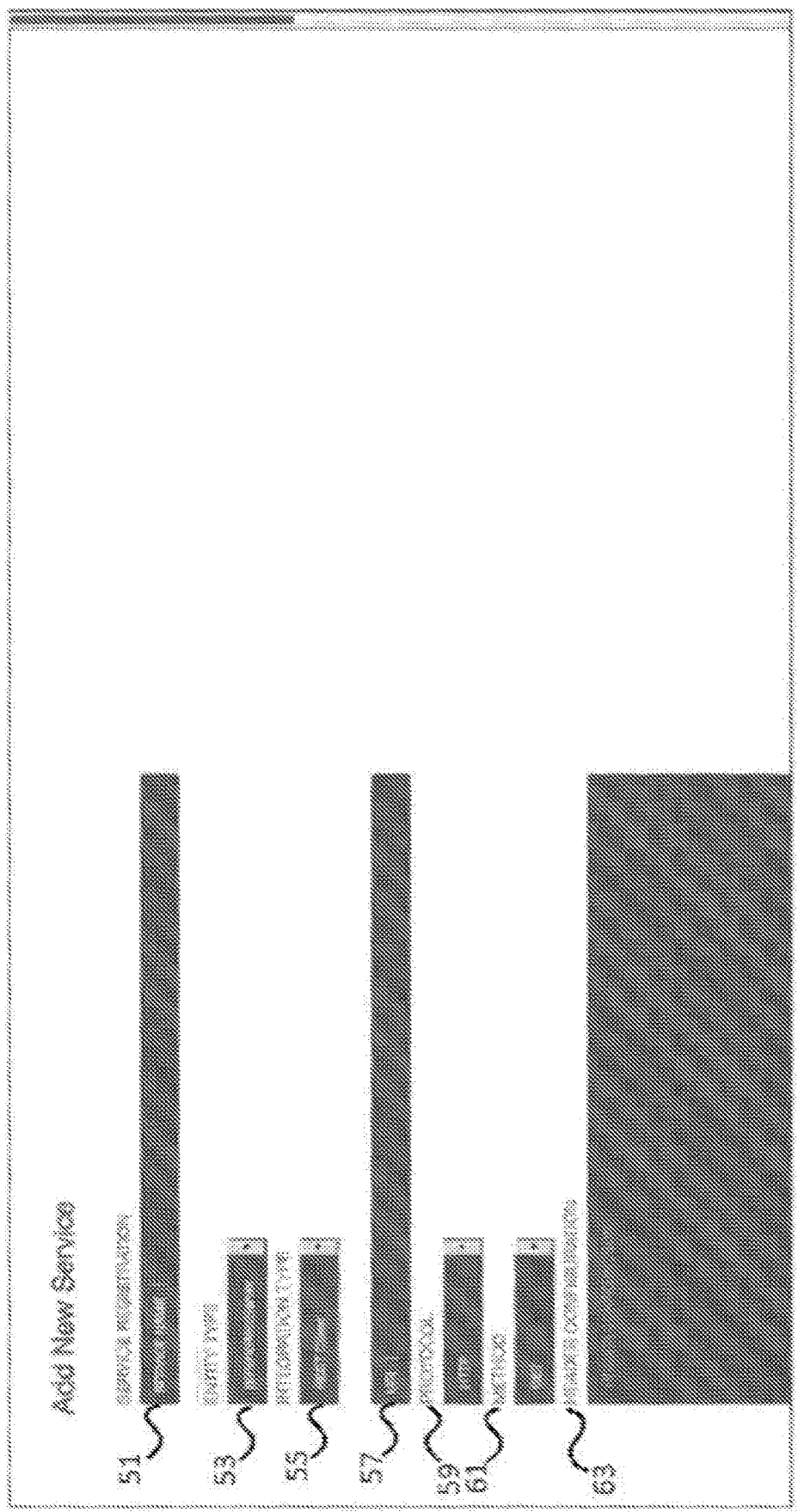
Figure 5C:

FIGS. 5A-5C illustrate screenshots of the IoT interaction systems hat depict how to define a service for the entity type REST server 40c. As shown in FIG. 5A, entitled "Add New Service", a user can click on "Manage Services" tab 47 on top of the Navigation bar and click on "Create Service" button 49 to define the service. As shown in FIG. 5B, the user can create a service name 51, in this instance, "genericRestService." Entity type 53 of this service is already explained with respect to "genericRestServer." The user can select an interaction type 55 according to how this service will be integrated, for instance, either "REST Server" or "REST client." The user can decide to use URI 57 or API as the entity that will be invoked, which in this instance is "genericRestService." A protocol 59 can be selected. The user can set method 61 that can be used to invoke this service—in this case it is "GET." Servers can make resources available under a URL or API and clients can access these resources using one of the methods such as GET, PUT, POST, and DELETE. If the entity invokes a request, the format needs to be selected. The supported formats are, for instance, JSON and TEXT. The user can select the appropriate format, and then enter the selected format, and format the content as expected. In a header configuration 63, an example format line can be provided. For instance, the following line can be provided to define a format. {"api": "genericRestService", "flowName": "someFlow Name"}

The names "api" and "flowName" can be fixed values in the key pairs and the API value "genericRestService" is provided by the user. The value for "flowName" can be any value.

Figure 6A:
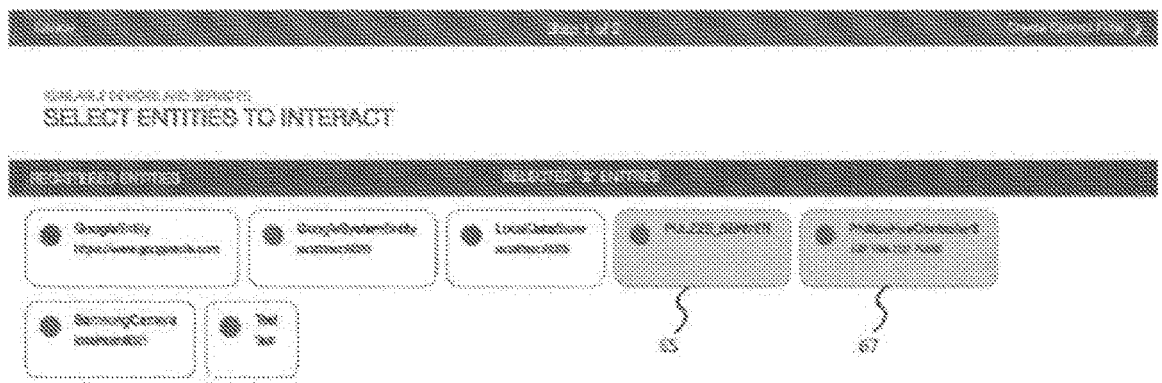
FIG. 6A illustrates a screenshot of the IoT interaction system depicting two entities being selected according to the embodiments of the present disclosure.

Referring to FIGS. 6A-6F, control flow settings are described. FIG. 6A illustrates a screenshot of the IoT interaction systems that depicts two registered entities being selected, PULZZE_SERVER 65 and PhillipsHueController3 67, by a user. The other possible choices are listed above with respect to FIG. 3B.

Figure 6B:
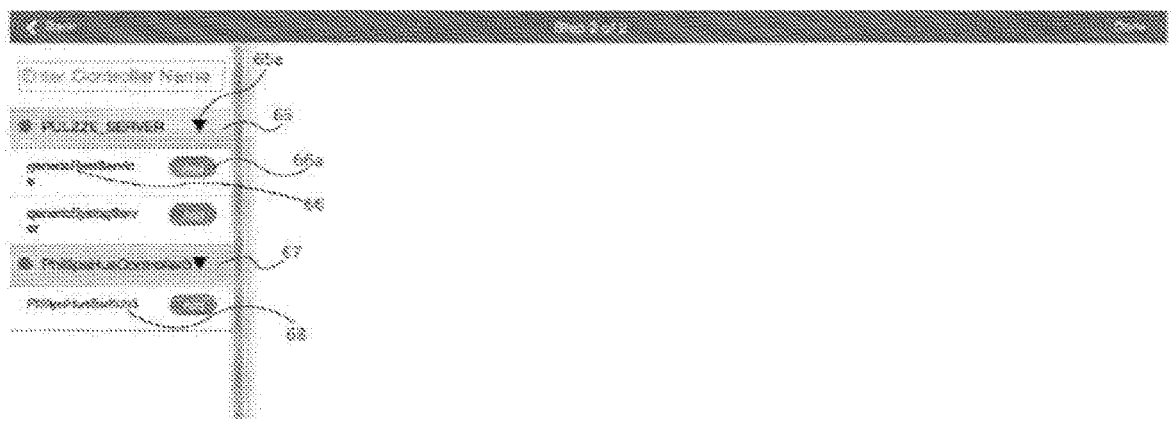
FIG. 6B illustrates a screenshot of the IoT interaction system depicting two entities and their services, respectively, according to the embodiments of the present disclosure.

FIG. 6B illustrates a screen-shot of the IoT interaction systems that depicts two entities and their services, respectively. Each entity can have at least one service. When the user clicks on the down arrow 65a for PULZZE_SERVER 65, IoT interaction systems display any associated services thereof, which in this example are "genericRestService 66" and "generic SyslogServor". PhillipsHueController3 67 has a service of a PhilipsHueSwitch3 68. If the user desires to make an interaction between the genericRestService 66 and the PhilipsHueSwitch3 68, for instance, the user can click on an add button 66a and add genericRestService 66 into the interaction. In a similar manner, the user can add the PhilipsHueSwitch3 68.

Figure 6C:
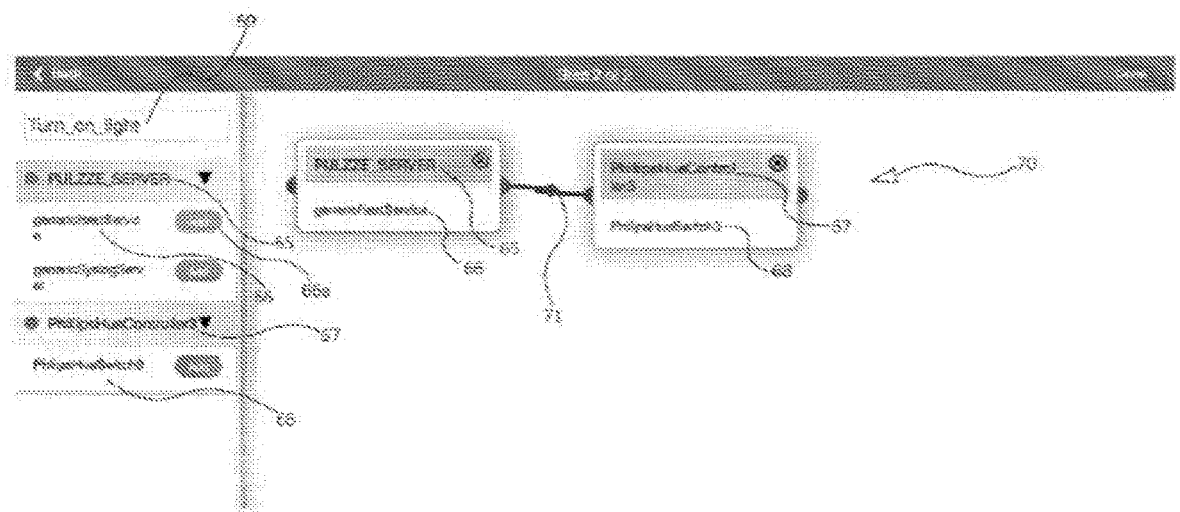
FIG. 6C illustrates a screenshot of the IoT interaction system depicting two entities in a workbox according to the embodiments of the present disclosure.

FIG. 6C illustrates a screenshot of the IoT interaction systems that depicts in a workbox 70 with two entities, PULZZE_SERVER 65 and PhillipsHueControlller3 67, together with their services, genericRestService, a source service, and PhilipsHueSwitch3. In an insert box 69, the name "Turn_on_light" has been inserted by the user. GenericRestService 66 is the source service, the output of which needs to be consumed by another entity to complete the interaction. PhilipsHueSwitch3 68 can be selected as a target entity and relevant service thereof can be displayed in the workbox 70. The user can draw an interaction arrow 71 in workbox 70 between the genericRestService 66 and the PhilipsHueSwitch3 68 to create an interaction.

Figure 6D:
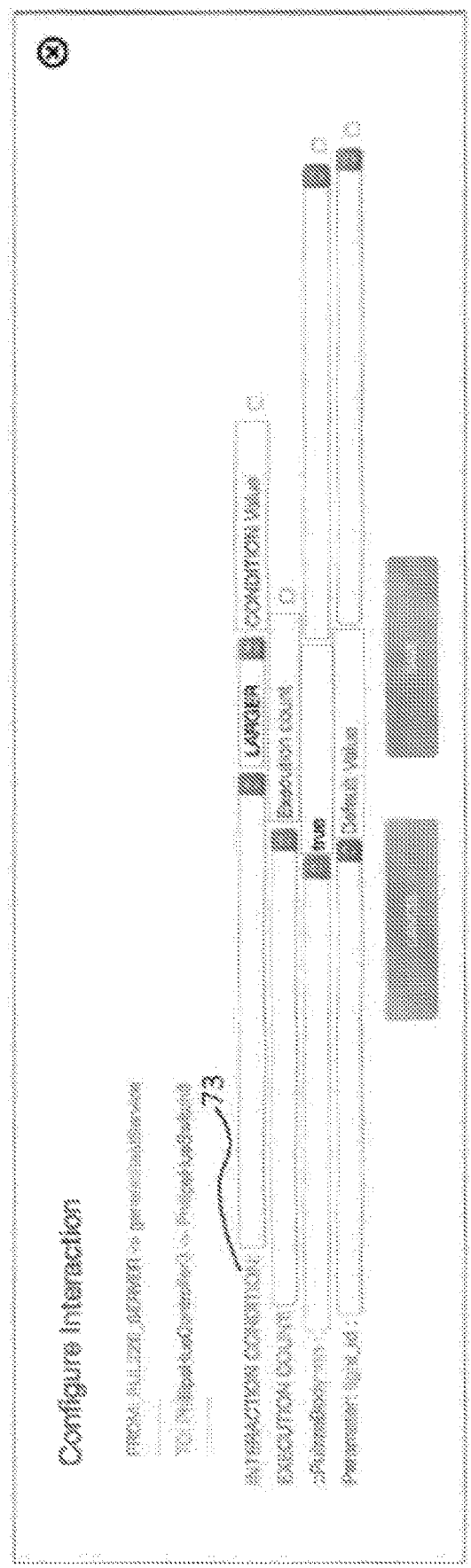
FIG. 6D illustrates a screenshot of the IoT interaction system displaying a set of parameters for an interaction according to the embodiments of the present disclosure.

FIG. 6D illustrates a screenshot of the IoT interaction systems that displays a Configure Interaction that resulted from drawing the arrow 71. A set of parameters for the interaction are in a left column and their set condition include: Interaction Condition (LARGER, CONDITION Value); Execution Count (Execution count); PulzzeBody:: on: (true); and Parameter.light_id (Default Value). The user can set the parameters by mapping the input value from the genericRestService 66 to the output value of the PhilipsHueSwitch3 68. In this case, even if PULZZE_SERVER 65 and PhillipsHueControlller3 67 use different interaction protocols, the user can select available input value or interaction condition by clicking on a drop-down menu. In doing so, instead of coding the interaction layer between the genericRestService 66 and the PhilipsHueSwitch3 68, a user can simply change or adjust the settings with ease. Since the parameters for the input value and the output value can be mapped either by automatic or manual means, the interaction layer no longer needs to be coded up by developers. Not only does this reduce a lot of the developer's efforts and time, but it is also more convenient for the user.

Figure 6E:
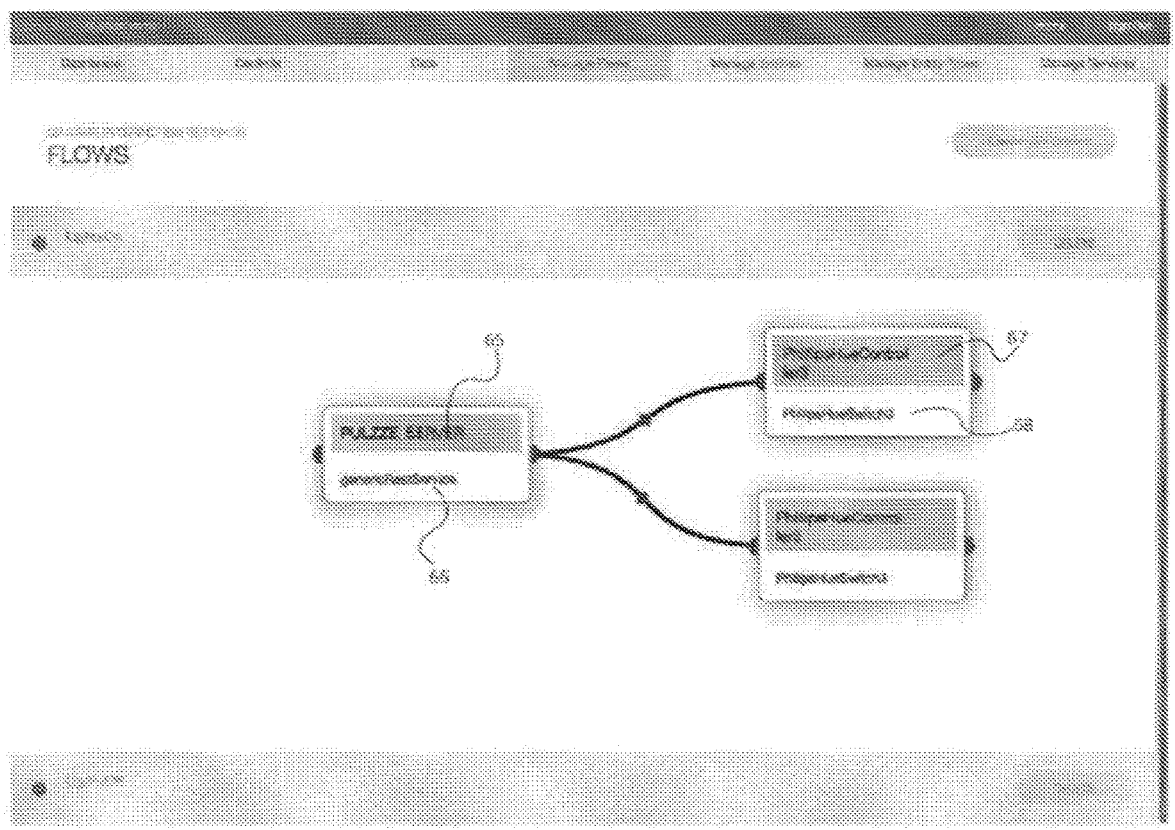
FIG. 6E illustrates a screenshot of the IoT interaction system depicting two identical entities being involved with the same source entity according to the embodiments of the present disclosure.

FIG. 6E illustrates a screenshot of the IoT interaction systems entitled MANAGE INTERACTION SETTINGS, FLOWS. The screenshot depicts two identical entities 30 that are involved with the same source entity. As shown in FIG. 6E, the PULZZE_SERVER 65 has genericRestService 66 that is connected with two (2) PhilipsHueSwitch3s 68 in two corresponding PhillipsHueControlller3. The controllers control a LightsOn condition and a LightsOff condition. A user can add any further registered entity into the interaction as needed.

Figure 6F:
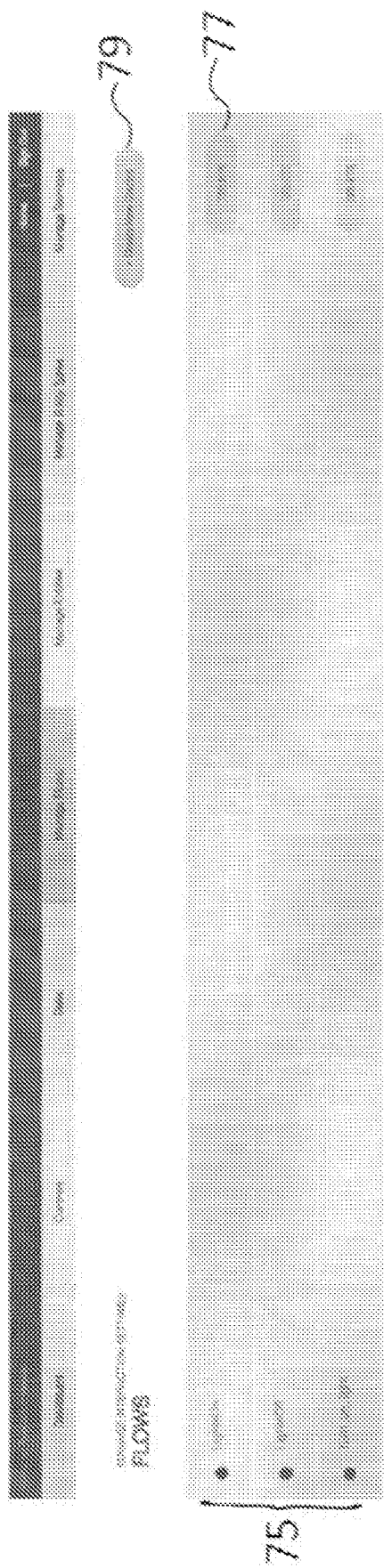
FIG. 6F illustrates a screenshot of the IoT interaction system depicting a list of stored interactions according to the embodiments of the present disclosure.

FIG. 6F illustrates a screen-shot of the IoT interaction systems depicting a list of stored interactions 75, a LightsOn; a LightsOff, and a Turn_on_light. A user can manage the list of stored interactions 75 as needed. For instance, the user can click on a "DELETE" button 77 in order to delete a selected one or more of the stored interactions 75. If the user desires to create a new interaction, the user can click on "Create New Control" button 79 and go back to a screen as displayed in FIG. 6A.

Figure 7:
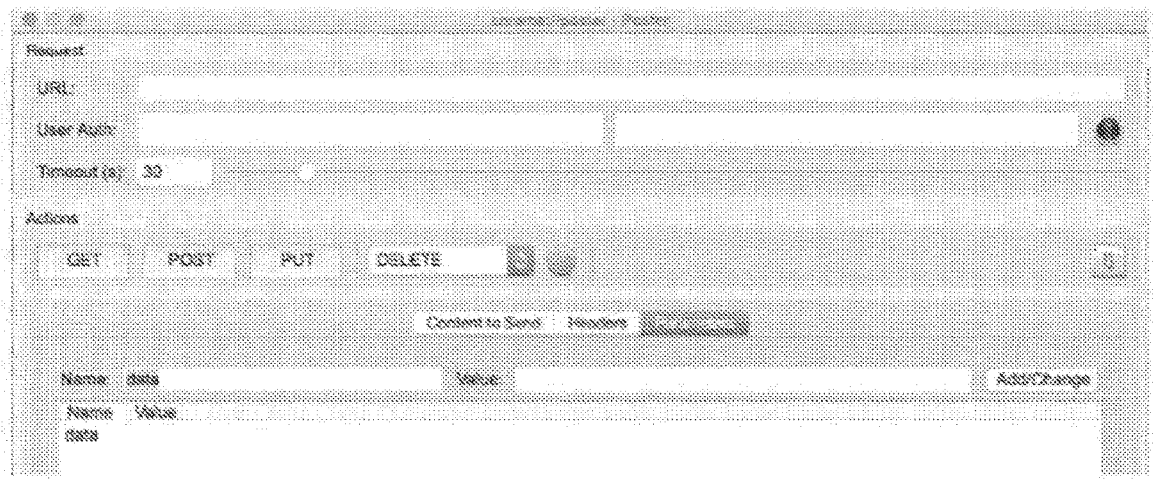
FIG. 7 illustrates a screenshot of an Internet browser for a HTTP Request according to the embodiments of the present disclosure.

FIG. 7 illustrates a screenshot of an Internet browser for a HTTP Request 42. For instance, the HTTP Request 42 can include the following information.
Value: [{"api": "genericRestService", "flowName": "Turn_on_light"}]
Where: API refers to the name of REST Server 40c; and "flowName" refers to the name of a control flow being triggered. In this specific example, since the above HTTP Request 42 includes the flow name "Turn_on_light," the interaction, which is created as shown in FIG. 6C and has the flow name, will be triggered. If no flow name is given in the HTTP Request 42, all control flows associated with the given API name—("genericRestService"—in this particular case) will be triggered. HTTP Request 42 is transmitted to the REST Server 40c.

For instance, PhillipsHueControlller3 67 is configured to call the API provided by the REST Server 40c to trigger the interaction. If PhillipsHueControlller3 does not have an ability to call the API, then a micro-service can be written, which sits either on the IoT interaction systems or externally and will communicate with PhillipsHueControlller3 67 and provide the function of making an API call. Such micro-service can provide the IoT interaction systems with the flexibility to work with wide range of networked devices and applications. It also provides scalability as the services can run independently on a separate processor.

Figure 8A:
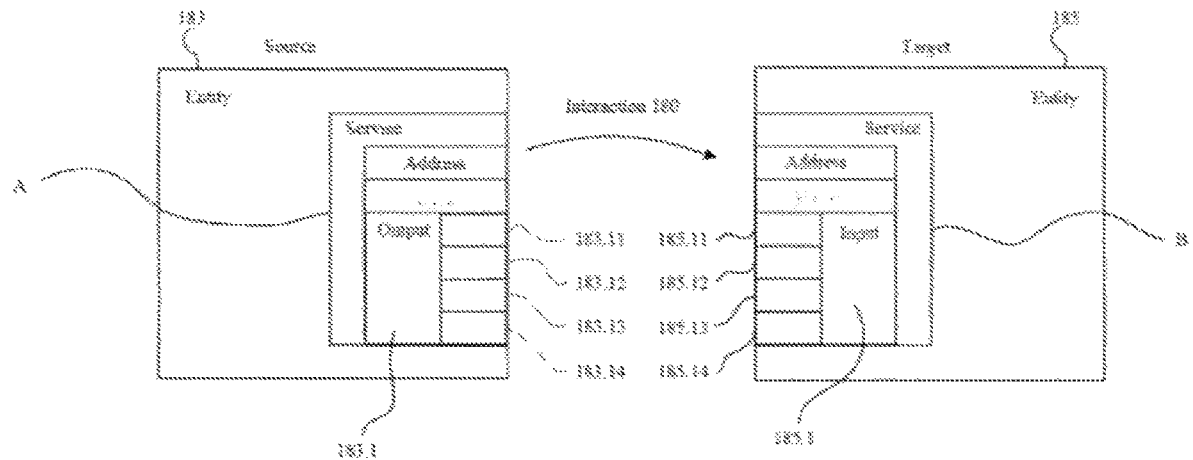
FIG. 8A is a schematic diagram illustrating two entities using different communication protocols according to the embodiments of the present disclosure.

FIG. 8A is a schematic diagram illustrating two entities using different interaction protocols. Referring to FIG. 8A, Service A runs on a first networked entity 183 that produces output elements 183.11, 183.12, 183.13, and 183.14 in a first format 183.1. Service B runs on a second networked device 185 and expects input elements 185.11, 185.12, 185.13, and 185.14 in format 185.1. Service A is a source and Service B is a target. The first networked entity 183 and the second networked entity 185 use different interaction protocols. Thus, the first format 183.1 and the second format 185.1 can have different protocol formats. Each of the first and second formats 183.1 and 185.1 can have either: unstructured; structured; JSON (JavaScript Object Notation); table; or text format. Since the two entities are using different interaction protocols, a further parsing, mapping, or transforming process is required, such as breaking down its components, rearranging the order, or changing the data format or value. According to another embodiment of the present disclosure, IoT interaction systems parses input data, which is received from first networked device 183, for instance, by breaking it down into its component parts and reformatting it in accordance with the interaction protocol of the second networked device 185. Details of the parsing methods is explained further below with examples.

With reference again to FIG. 6D, one of the advantages of the present disclosure is that a user can set the input/output parameter mappings by settings. For instance, available input values/formats can be selected by clicking on a drop-down menu. Since a programmer does not need to code this interaction layer individually, the user can merely select the format from settings. With such reduced work, the process/method is much more cost-effective. An interaction 180 relates to generating and mapping data between objects and services. As software plays larger role in daily lives of many, there is an increasing need for different software pieces to interact with each other. For Internet of Things (IoT), software running on various connected devices need to interact with each other and to IoT interaction systems running in a cloud. In enterprise systems, IoT interaction systems handling a fixed service scope need to interact with each other to create differentiated services. Data centers devices need to interact with each other to create a dynamic and flexible network infrastructure. Interaction between two objects/services becomes a building block to form flows of interactions that create a system of IoT interactions. When an interaction is created between two objects or services, four things come into play: 1) source; 2) output from source; 3) target; and 4) input to target. The present disclosure is not industry specific. It will be applicable to any solution involving interaction between entities. An example of IoT interaction systems is the remote recovery monitoring in healthcare industry where patients will have devices that will collect health information for doctors to monitor.

Another example is service integration in a data center where different facility management systems such as power, cooling, networking, security and various custom services will be able to interact with each other.

Figure 8B:
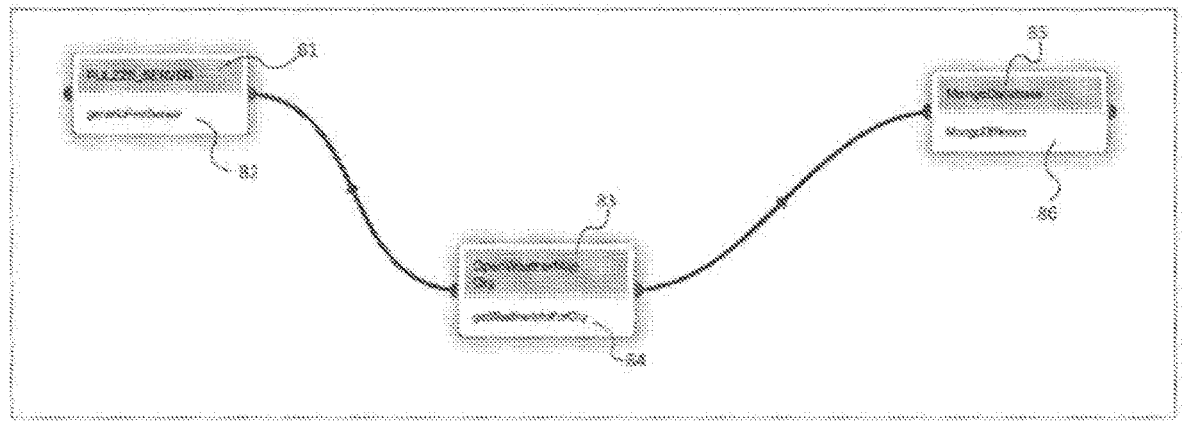
FIG. 8B illustrates a screenshot of the IoT interaction system depicting an interaction among three entities according to the embodiments of the present disclosure.

FIG. 8B illustrates a screenshot of the IoT interaction systems depicting an interaction among three entities: PULZZE_SERVER 81, OpenWeatherMap 83, and MongoDatabase 85. PULZZE SERVER 81 hosts a service: genericRestServer 82. OpenWeatherMap 83 is a web-based application and has a service: getweatherinfoForCity 84. MongoDatabase 85 has a service: MongoDBinsert 86. OpenWeatherMap 83 represents the first networked device 183 in the IoT interaction system 10. MongoDatabase 85 represents the second networked device 185 in the IoT interaction systems.

When an HTTP request is received in the genericRestServer 82, the interaction is triggered. The interaction is then configured to receive weather information from, in this case, London, United Kingdom and the result is stored in MongoDBinsert 86.

Referring back to FIG. 8A, when service A is defined, details of output 183.1, such as output elements 183.11, 183.12, 183.13, and 183.14, and format of output 183.1, are included in the definition. One method of defining output elements 183.11, 183.12, 183.13, and 183.14 is to include a sample output in the format defined, and to have the expected output broken down into its elements. For example, if Service A is a weather service, an example output can be in aJSON (JavaScript Object Notation) format as shown below, {"coord": {"lon":139,"lat":35},
"sys": {"country": "JP","sunrise":1369769524,"sunset": 1369821049},
"weather": [{"id":804,"main":"clouds","description": "overcast clouds","icon":"04n"}],
"main": {"temp":289.5,"humidity":89,"pressure":1013, "temp_min":287.04,"temp_max": 292.04}, "wind": {"speed":7.31,"deg":187.002}, "rain":{"3h":0}, "clouds": {"all":92},
"dt":1369824698,"id":1851632,"name":"Shuzenji", "cod":200}

The JSON format above can be broken down into following output elements.

TABLE 2

| | |
|---|---|
| coord | lon: |
| coord | lat: |
| Sys | country: |
| Sys | sunrise: |
| Sys | sunset: |
| weather | id: |
| weather | main: |
| weather | description: |
| weather | icon: |
| main | temp: |
| main | humidity: |
| main | pressure: |
| main | temp_min: |
| main | temp_max: |
| wind | speed: |
| wind | deg: |
| rain | 3h: |
| clouds | all: |
| dt: | |
| id: | |
| name: | Shuzenji |
| cod: | |

The elements above, which have been broken down from the sample output of source Service A, become a list of output elements that Service A is able to produce. Service B's input would go through the same process of being broken down into its elements based on a defined format. Service B would also need to define its target addressing as its address could be dynamic in nature. Address here refers to all information required to reach the service in question. If Service B is a REST API, the address could include 1) IP Address, 2) Port number, 3) URI, and 4) Protocol. One method of creating dynamicity for address definition is to parameterize addressing. For example, the URI for the following weather API is as follows:
<api.openweathermap.org/data/2.5/weather?lat=35&lon=139>.

Then, the URI could be defined as below to produce following parameters: "lat:" and "lon:"<api.openweathermap.org/data/2.5/weather?[lat][lon]>

Input and output elements can have associated default values, so if the service or interaction does not provide data for a certain element, its default value is used instead. This means virtual input and output elements can be created using the same method, and be used for creating various default input/output parameters or for pre-configuring certain services. The aforementioned qualities are to all services that can be interacted with. Input and output elements can be objects of various forms, such as string, array, function, or custom type, to allow interaction between different types of entity and services. With the services defined above, interactions can be mapped between Service A and Service B in a granular fashion. Rather than limiting the interaction definition at service level, interaction can be defined at the element level where certain output elements from source Service A are mapped to another input element of target Service B. The mapping can be with any element, so an output element from source service A could determine the target address of service B. Such definition of input, output, and addressing into its elements is an example of overall definition of services in its elements. Further examples of service elements could include, but are not limited to, identification, authentication, state, comment, and function.

For source Service A to interact with target Service B, one would address it by 1) source has prior knowledge of a target's address and input format, 2) source and target use a common messaging medium, 3) source and target use common data store, or 4) use a middleware to map between the source and the target. When the source has a prior knowledge of the target's address and input format, the source can be customized to interact directly with the target. This can be done using a form of API, a command line interface, or a pre-defined protocol. The source will need to support the method of connectivity required by the target. Output of the source will need to match the input format of the target as well. All this customization is required for the source. The advantage of this method is that the target does not need to change, but the challenge is for the sources to have prior knowledge of the target and to customize it to interact with the target. When there are many types of targets, the source would need to support all of the target types. Interaction could also go through a common messaging medium such as a pub/sub or message bus. The source and the target would both agree to use a common bus. The source would output information according to the method defined by the agreed upon common messaging medium and address it to a topic that both the source and the target have agreed to. The target would be able to take the output from the source as an input by listening to the agreed upon topic. The advantage of this method is that the delivery of information and the interaction is taken care of by a common messaging medium. The challenge is that both the source and the target need to have a way of knowing how to send and listen to interactions, all while having to make sure that the agreed upon messaging medium is supported by both of the services. This would limit the interactions of the sources and the targets that support the common messaging medium. A common data store could be used to create interactions between two objects or services. The source and the target would agree to use a common data store, and agree on a format that the data will be stored in. The Source would store its output in the data store in the format that was agreed upon. Any change in data would either trigger the target to read the data store for the output from the source, or the target would poll the data store for any changes and read the output from the source when it notices the change. The advantage of this method is the fewer steps it needs to take when the output from the source has to be stored even without the interaction. The challenge is that the source and the target have to agree on the data store and the format it would use beforehand. When there is large number of interactions, this sets limits to the interactions that the source and the target can agree to because of a limited number of data store and formats.

Middleware can also be created to map between the source and the target. Custom software is written to map specific source types output format to some target type input format. This custom development cannot scale because each of the mapping scenarios needs to be custom developed. The advantage of doing this is that the source and the target do not need to know too many details about each other. The Middleware would handle the details of the interaction. Generic applications are also available where flows can be created between services using a user interface, rather than solely relying on custom coding which, in turn, would allow the middleware to handle the details of the interactions without the need to custom develop each interaction. However, such applications lack the ability to map the input and the output at a granular level, and rather risk that the entire output would be dumped to target input. While industry is utilizing various methods to solve their interaction problems, there needs to be a dynamic but simple method of defining interactions at a more granular but scalable way. Dynamic and scaled nature of the four elements of interaction between the two objects 1) source, 2) output, 3) target, and 4) input, all have to be satisfied.

Now, with reference to Tables 3, 4, 5, and 6, parsing unstructured text will be described in greater detail. Below, parsing structured text, mapping data, and transforming data, respectively, is discussed further.

Table 3 shows exemplary methods of configuring and dynamically parsing unstructured text.

TABLE 3

| Example Text | Line1 Word2:Word3 |
| | Line2 Word2 Word3 |
| | Line3 Keyword Word3 |
| | Line4 KeyPhrase KeyPhraseContinued Word4 |
| Example Method 1 | Line Number, Word Position, Delimiter |
| Example Method 2 | Line Number, Word Position, Word Length, Absolute Value |
| Example Method 3 | Keyword, before/after |
| Example Method 4 | Key Phrase, before/after |
| Example Method 5 | Repeating any combination of the methods 1-4. |

For instance, when the IoT interaction system 10 receives data from the first networked device 183 and transmits it to the second networked device 185, the IoT interaction systems needs to parse the received data. According to the example method 1, the particular data can be parsed by determining the line number, word position, and delimiter of the text. Thus, the user can set a parsing process by determining which data set will be extracted according to a predetermined format. If the example method 1 is set to extract data from 1) $1^{st}$ line (line number), 2) second word (word position), and any data located after delimiter (delimiter condition), then "word 3" can be obtained. Once the user sets this parsing format, whenever the IoT interaction system 10 receives data from the first networked device 183, the IoT interaction systems can extract the necessary information and transmit it to the second networked device 185.

According to example method 2, the data can be extracted by line number, word position, word length, and absolute value. According to example method 3, the data can be extracted by a specific keyword and a position whether it is located before or after the specific keyword. According to example method 4, the data can be extracted by a specific key phrase and a position, whether it is located before or after the specific key phrase. According to the example method 5, it can be any combination of the example methods 1-4. For exemplary purposes only, example methods 1-5 are provided, but it is not an exhaustive list of examples and should not be limited thereto. Any equivalent method thereof that would or could be known to an ordinary person skilled in the art could be included.

Table 4 shows exemplary methods of configuring and dynamically parsing structured data.

As shown in FIG. 8A, IoT interaction systems can receive data from the first networked device 183 in a structured format and transmit it to the second networked device 185 in an unstructured format, or vice versa. The IoT interaction system 10 can define a data structure by settings. As shown in Table 4, the IoT interaction system 10 defines three data elements: 1) key, 2) value, and 3) type. For instance, DATA 1 has "key1" for key and "DATA 2" for value. DATA 2 is defined to have "key2" for key and "[DATA3, DATA4]" for value. DATA 3 is defined to have "key3" for key and "[DATA5, DATA6]" for value. DATA4 is defined to have "key 4" for key and "value4" for value. DATA5 is defined to have "Value5" for value. DATA6 is defined to have "Value6" for value. Such structured format can be transformed in any of JSON, table or text format as expected from the second networked device 185. A method of parsing data can include selecting a specified index item from the array data as well.

TABLE 4

| Data Element | | Key - multiple keys |
| | | Value - any type including another data element Type |
| Example Structures | Simple JSON | Single Key, Single Value |
| | Simple Table | Dual Key, Single Value |
| | Simple Text | No Key, Single Value |
| Example Implementation | | DATA1: Key: key1, Value: DATA2 |
| | | DATA2: Key: key2, Value: [DATA3, DATA4] |
| | | DATA3: Key: key3, Value: [DATA5, DATA6] |
| | | DATA4: Key: key4, Value: "Value4" |
| | | DATA5: Value: "Value5" |
| | | DATA6: Value: "Value6" |

Table 5 shows exemplary method for data mapping.

TABLE 5

| Example Text | Line1 Word2:Word3 |
| | Line2 Word2 Word3 |

TABLE 5-continued

|  |  |
| --- | --- |
|  | Line3 Keyword Word3 |
|  | Line4 KeyPhrase |
|  | KeyPhraseContinued Word4 |
| Mapping example method 1 | Change Line 2 Word 3 with "ChangedWord" |
| Mapping example method 2 | Change Line 1 Word 3 with Line 2 Word 2 |

Data mapping is a process of creating data element mapping between two distinct data sources. When the IoT interaction systems receives data from the first networked device 183 and transmits it to the second networked device 185, the IoT interaction systems can change a specific word with another word as instructed. For instance, according to the mapping example method 1, the IoT interaction systems changes the example text line 2 from "Word2 Word 3" to "Word2 ChangedWord." Furthermore, within the mapping example method 2, the IoT interaction systems changes "Word3" of the example text line 1 to "Word2" of line2. As such, the user can change the mapping settings as needed. A method of the mapping data can include mapping specified index item with another value, or mapping specified data with specified index item from the array data as well.

Table 6 shows exemplary method of data transforming.

TABLE 6

| | |
| --- | --- |
| Transform | Data template (text, structured data, etc.) |
| | Variable Data |
| Example Implementation | Line1 Word2:Word3 |
| Template | Line2 Word2 $Variable! |
| | Line3 $Variable2 Word3 |
| | Line4 $Variable3 Word4 |
| Variable Data | $Variable1 = "ChangedWord" |
| | $Variable2 = other service's result: |
| | Line 2 Second |
| Conditional Variable Data | $Variable3: |
| | Value = "Default" |
| | Value = "Condition1" if a = b |
| | Value = "Condition2" if a = a |

Data transforming is a process of changing the data element by using variables. For exemplary purpose only, the implemented template may include $Variable1, $Variable2, and $Variable3. As shown in table 6 above, each of the variables can be separately defined. $Variable1 is defined to replace it with "ChangedWord." $Variable2 is defined to replace it with the second word in line 2 at another service's result. $Variable3 is conditional variable data and is defined to have "Default" as a default value. If a first condition (a=b) is met, $Variable3 has "Condition1," and if a second condition (a=a) is met, $Variable3 has "Condition2." A method of data transforming can include configuring an array of structured data elements. Transforming data is not limited hereto.

The IoT interaction systems can handle array data by "iterate," function from the settings as well. For instance, the input data has "[item 1, item 2, [item 3, item 4]]" format. The "Iterate" function can iterate a service based on a certain array count. The above example will iterate three (3) times if array service being iterated on is [item1, item 2, item 3]. Thus, when the IoT interaction systems receive the data that has array or needs to transmit the array data, a user can use "iterate," "parse," "map," or "transform" functions.

Figure 9:
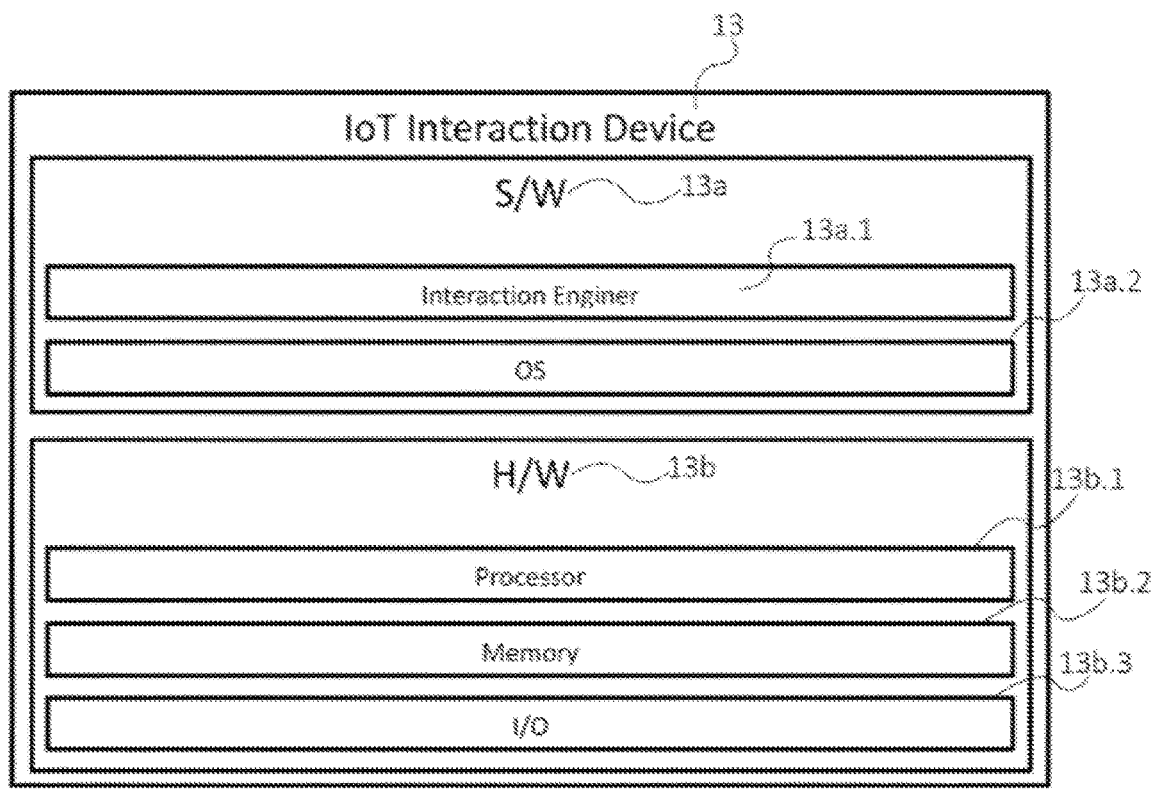
FIG. 9 illustrates a schematic diagram of an IoT interaction device performing any one or more interaction logics according to the embodiments of the present disclosure.

FIG. 9 illustrates a schematic diagram of a fifth IoT interaction system 13 performing any one or more of interaction logics. The fifth IoT interaction system device 13 can be the form of a software executable, software suite, hardware appliance, or a cloud service. The basic requirement for an IoT interaction system is reachability to the entities that it services, and the ability to access the required resources such as memory, CPU, power and network I/O interface. Every interaction is deemed to be between some entities and sets of services they provide. According to one embodiment of the present disclosure, it would not require or minimize hard-coding, as opposed to conventional IoT product which has a hard-coded implementation of interaction layer, thus making the IoT interaction process more cost-efficient.

In the example of FIG. 9, the fifth IoT interaction system 13 includes a software program 13*a* and hardware 13*b*. The software program 13*a* includes an interaction engine 13*a*.1 and OS 13*a*.2. The hardware 13*b* includes a processor 13*b*.1, a memory 13*b*.2, and an I/O device 13*b*.3. Various common components (e.g., cache memory) are omitted for illustrative simplicity. The fifth IoT interaction system 13 can be of any applicable known or convenient type. The components of the IoT interaction device 13 can be coupled together via a bus or through some other known or convenient devices.

This disclosure contemplates the fifth IoT interaction system 13 taking any suitable physical form. As example, but not by way of limitation, the fifth IoT interaction system 13 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the fifth IoT interaction system 13 may include one or more the IoT interaction devices or systems; be unitary or distributed; span multiple locations; span multiple machines; or reside in a cloud, which may include one or more cloud components in one or more networks. Where appropriate, one or more of the fifth IoT interaction systems 13 may perform without substantial spatial or temporal limitations, one or more steps of one or more methods described or illustrated herein. As an example, but not by way of limitation, one or more of the fifth IoT interaction systems 13 may perform in real time or in batch mode one or more steps of one or more methods described or illustrated herein. One or more the fifth IoT interaction systems 13 may perform at different times or at different locations one or more steps of one or more methods described or illustrated herein, where appropriate.

A processor 13*b*.1 may be, for example, a conventional microprocessor such as an Intel Pentium microprocessor or Motorola power PC microprocessor. One skilled in the relevant art will recognize that the terms "machine-readable (storage) medium" or "computer-readable (storage) medium" include any type of device that is accessible by a processor.

A memory 13*b*.2 is coupled to processor 13*b*.1 by, for example, a bus. Memory 13*b*.2 can include, but is not limited to, a random-access memory (RAM), such as dynamic RAM (DRAM) and static RAM (SRAM). Memory 13*b*.2 can be local, remote, or distributed.

The bus also couples the processor 13*b*. 1 to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage that accommodates a large amount of data. Some of this data is often written, by a direct memory access process, into memory during the execution of the software program 13*a* in the fifth IoT interaction system 13. The non-volatile storage can be local, remote, or distributed. The non-volatile memory is optional because systems can be created with all applicable data available in memory 13b.2.

Software program 13a can be stored in the memory 13b.2 and/or the drive unit (not shown). As used herein, the software program 13a is assumed to be stored at any known or convenient location (from non-volatile storage to hardware registers) when the software program 13a is referred to as implemented in a computer-readable medium. The processor 13b.1 is considered to be configured to execute a program when at least one value associated with the program is stored in a register readable by the processor 13b.1.

The bus also couples the processor 13b.1 to I/O device 13b.3. I/O device 13b.3 can include one or more of a modem or network interface. The I/O devices can include, but is not limited to, a touch-pad screen, a display device, a button, a keyboard, a mouse or other pointing device, disk drives, printers, a scanner, and other input and/or output devices. The display device can include, but is not limited to, a cathode ray tube (CRT), liquid crystal display (LCD), or some other applicable known or convenient display device. For simplicity, it is assumed that the controllers of any of the devices that are not depicted in the example of FIG. 9, reside in the interface.

In operation, the fifth IoT interaction system 13 can be controlled by operating system (OS) 13a.2 which includes a file management system, such as a disk operating system. One example of operating system software with associated file management system software is the family of operating systems known as Windows® from Microsoft Corporation of Redmond, Wash., and their associated file management systems. Another example of OS with its associated file management system software is the Linux operating system and its associated file management system. The file management system is typically stored in memory 13b.2 and/or the drive unit and causes the processor to execute the various acts required by the operating system to input and output data and to store data in the memory, including storing files on memory 13b.2 and/or drive unit.

In alternative embodiments, the fifth IoT interaction system 13 operates as a stand-alone device or may be connected (e.g., networked) to other machines. In a networked deployment, the fifth IoT interaction system 13 may operate in the capacity of a server or a client machine in a client-server network environment, or as a peer machine in a peer-to-peer (or distributed) network environment.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store one or more of the sets of instructions. The term "machine-readable medium" and "machine-readable storage medium" shall also be understood to include any medium that is capable of storing, encoding or carrying a set of instructions for execution by the fifth IoT interaction system 13 and that causes the fifth IoT interaction system 13 to perform any one or more of the methodologies or modules of the presently disclosed technique and innovation.

Figure 10A:
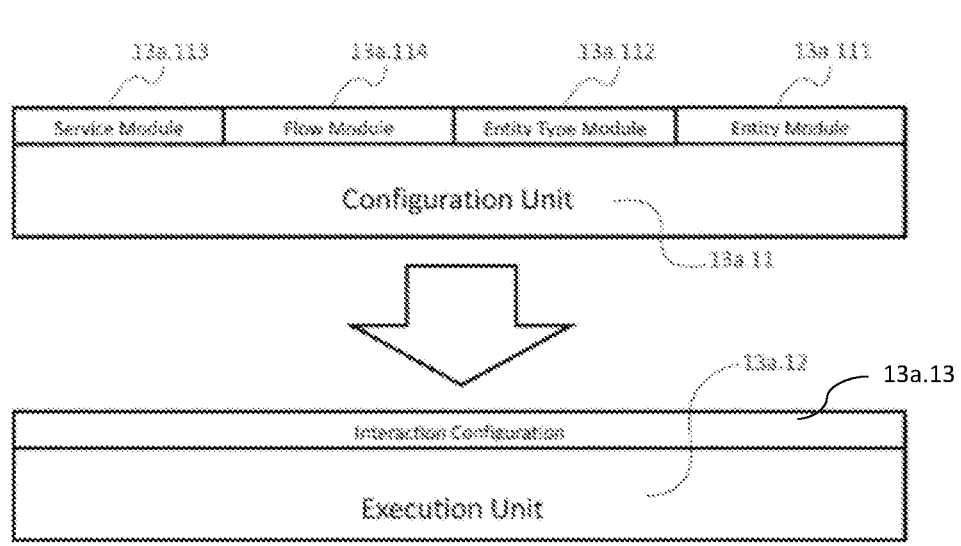
FIG. 10A is a schematic diagram illustrating a software program having a configuration unit and an execution unit according to the embodiments of the present disclosure.

FIG. 10A is a schematic diagram illustrating a software program having a configuration unit 13a.11, interaction configuration 13a.13, and an execution unit 13a.12. Software program 13a includes the interaction engine 13a.1. Now, referring to FIG. 10A, interaction engine 13a.1 will be further described. Interaction engine 13a.1 includes a configuration unit 13a.11 and an execution unit 13a.12.

Configuration unit 13a.11 includes an entity module 13a.111, an entity type module 13a.112, a service module 13a.113, and a flow module 13a.114. Entity module 13a.111 is a computer module that sets entity information as further explained herein with reference to FIGS. 3A-3B. Entity type module 13a.112 is a computer module that sets entity type information as further explained above with reference to FIGS. 4A-4C. Service module 13a.113 is a computer module that sets service information as further explained with reference to FIGS. 5A-5C. Flow module 13a.114 is a computer module to set a control flow as further explained with reference to FIGS. 6A-6F. A user can change or adjust the configuration of entities with the configuration module 13a.11 via the I/O device 13b.3.

Execution unit 13a.12 is electrically coupled with configuration unit 13a.11 and uses information from entity module 13a.111, entity type module 13a.112, service module 13a.113, and flow module 13a.114 to execute an interaction.

The OSI model, with its seven layers, has served the industry well in regard to tackling its goal of defining a unifying standard for the architecture of networking systems. It has allowed the communications industry to flourish with architecture that is based on connectivity. However, as the industry tries to create solutions based on architecture that is firmly grounded on connectivity, limitations are starting to surface up where layers beyond connectivity and communication are not easily handled. These limitations are a direct result of differences in problems that the OSI model, and solutions in general, are solving. The OSI model is focused on providing architecture for different devices to communicate with each other. The model does not address the needs of a solution beyond communications. It provides the language to speak between entities, but it does not provide meaning or context of interactions between entities. This approach is viable when solutions are based on client/server model, hub and spoke, or 1-to-n type of architecture. In such architecture, there is a larger focus on connectivity and communication.

However, when solutions are broken down into their elements, it can all boil down to a problem of interactions between entities. The logic of connectivity can include: 1) connectivity; 2) communication; 3) services; and 4) interaction.

The connectivity layer can be mapped to layers 1 to 3 of the OSI model. There the reachability between entities is handled through various physical, logical, and routed media. These layers ensure reachability through mechanisms such as addressing, connectivity protocols, and signaling.

Communication layer can be mapped to layers 4 to 7 of the OSI model. The transmission control combined with the connectivity layer, session management, data modification for security/speed, and application level protocols all work together to ensure that one application can communicate with another application.

The connectivity and communication layers provide mechanisms for one application to send data to another application in a format that one can consume. However, once the applications are talking to each other, all of the details regarding the services that each application provides and how these services interact with each other still need to be resolved. Today, the above described technologies are generally hard-coded into each application.

The Service layer is the first layer that goes beyond connectivity and communication. It is a layer that addresses the need for identifying and defining each service that is provided by an entity. This layer is built into each application by having all of the understanding of interacting services, such as parameters, and the URI needed for a REST API over HTTP, and CLI commands and arguments over Telnet, hard-coded into the application.

The Interaction layer defines how services interact with each other. It is a layer that is conventionally hard-coded into applications, and often gets dumped into some integration exercise. It is a layer that seems to be the least understood, while often being automatically dismissed as being part of a custom development or integration effort. However, the Interaction layer handles the context switching, mapping, translation, and flow of data between services.

A service is defined to be a unit of interaction that an entity provides to another connected entity. It is characterized by a set of inputs and outputs, along with the actions it takes. It expects a set of inputs that it can use to authenticate, authorize, understand, and act on. An example of such an input would be to a light bulb entity. An Authentication header includes some token, code, or username and password information, key/value entry either in JSON or xml for type of action and value identifying the bulb. The service would take such input and act on the request to either turn on, or turn off, the light bulb. It would then respond to the remote service that requested the service to ensure the action has been carried out correctly, by sending status information on the success of the action requested. Any IoT object that has the capability of interaction provides some service. A sensor provides services that send out its sensor reading, either through an electrical signal or over a serial line. Each CLI is a service on a networking device. REST APIs provided by many enterprise software and cloud services are good examples of services. Discovery, identification, understanding, and accessibility of these services are all part of the servicelayer.

Interactions can be set between services that are provided by those networked devices and applications. Whether it is an interaction between one API to another API, or between an application and a service provided by a device, interaction is possible when services participating in the interaction are well understood. Like the service layer, an interaction layer is conventionally hard-coded into applications. It includes details such as how to understand the data it has received from a service, in what context the data has been sent, in what format the data is being received, what services it needs to interact with the other service, and how the interaction needs to behave.

Industries have benefited from the power of abstraction. The seven (7) layers of the OSI model have proven how powerful abstraction can be. Upper layer developers can rely on the lower layers and focus on the activities relevant to that layer. However, even with all the innovative tools and platforms available today, developing a solution involves coding up interactions with various services provided by many devices and applications.

Abstracting out the service and interaction layers will allow solution creators to focus on their core logic. It enables architecture where the service and interaction layers play a central role by allowing services to be registered either through configuration or discovery. Interaction between the registered services needs to be configured into a system, alleviating much of the work required by solution creators in order to have their entities interacting with each other. Such abstraction has interaction acting as an IPC mechanism for the entire solution with the added benefit of not having to adhere to a certain way of interacting (SDK, platform API, etc.). Rather it provides service creators with the freedom to choose which method they want to interact in, and configuring that mechanism for the service registration into the system. This removes the somewhat prohibitive resource intensive work needed to have all entities interacting with each, and allows for rapid prototyping, rapid deployment, and reduced cost for solution enablement.

Figure 10B:
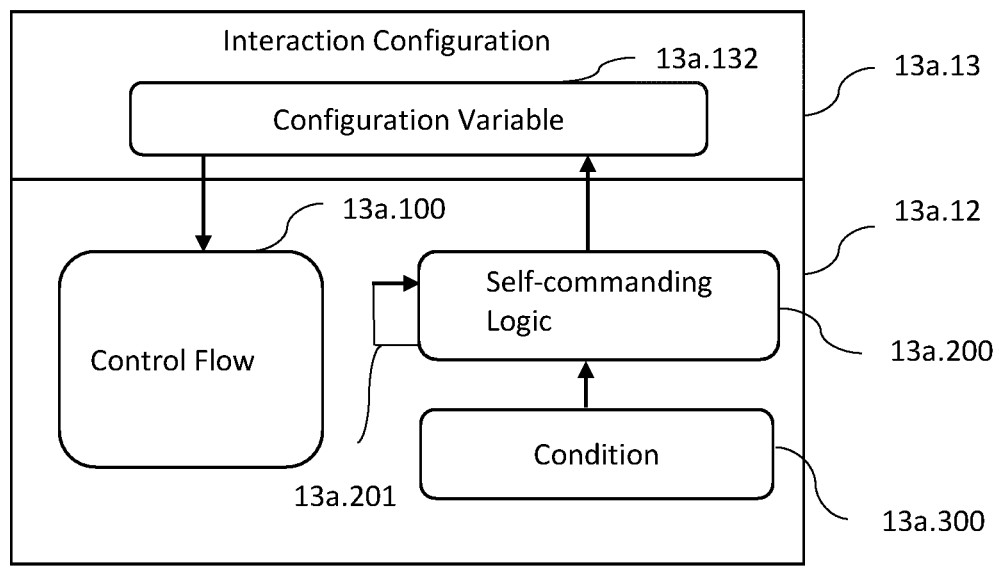
FIG. 10B is a schematic diagram illustrating an execution unit which modifies the interaction configuration based on internal environment conditions according to another embodiment of the present disclosure.

FIG. 10B is a schematic diagram illustrating an execution unit $13a.12$ which modifies the interaction configuration $13a.13$ based on internal environment condition(s) according to another embodiment of the present disclosure. The execution unit $13a.12$ includes a control flow $13a.100$, a self-commanding logic $13a.200$, condition(s) $13a.300$. The interaction configuration $13a.13$ includes at least one configuration variable $13a.132$. The control flow $13a.100$ controls the interaction logic based on the interaction configuration $13a.13$. The self-commanding logic $13a.200$ dynamically issues a command $13a.201$ to the self-commanding logic $13a.200$ during execution to modify the value of the configuration variable $13a.132$ at run time. The self-commanding logic $13a.200$ modifies the configuration variable $13a.132$ based on the condition(s) $13a.300$. The condition(s) $13a.300$ can be internal state related parameters in this embodiment of the present disclosure. The conditions $13a300$ can be checked directly by the execution unit $13a.12$ through the self-commanding logic $13a.200$. The condition(s) $13a.300$ can be time, date, counter value, user pre-scheduled event, and etc. Some other conditions include the available memory size and power supply level can be checked by running corresponding logic (not shown) implemented for these parameters. The conditions above are for exemplary purpose only and should not be limited thereto. Any related parameter thereof that would or could be known to an ordinary person skilled in the art could be included. The method that enables the self-modifying system to reconfigure the system at run time is not limited to the self-commanding logic $13a.200$. Any equivalent method thereof that would or could be known to an ordinary person in the art could be included.

Another exemplary IoT solution system (not shown) includes an air condition (not shown) and one embodiment of the IoT interaction systems (not shown). The embodiment of the IoT interaction systems has the execution unit $13a.12$ and the interaction configuration $13a.13$, as illustrated in FIG. 10B. The exemplary IoT solution system (not shown) is a self-modifying system, which reconfigures the system at run time, based on the condition(s) $13a.300$. There are many ways to achieve the self-modifying system, but for exemplary purposes, the method has been implemented where the self-commanding logic is used in this embodiment of present disclosure. The execution unit $13a.12$ includes the control flow $13a.100$, the self-commanding logic $13a.200$, and the condition(s) $13a.300$. The control flow $13a.100$ modulates the operation of the air condition (not shown). The interaction configuration $13a.13$ includes at least one configuration variable $13a.132$. The configuration variable $13a.132$ stores a target temperature value which is used to control the target temperature of the air condition (not shown). The control flow $13a.100$ uses the target temperature value stored in the configuration variable $13a.132$ to operate the air condition (not shown) accordingly. The condition(s) $13a.300$ is the system time to be checked by the execution unit $13a.12$ through the self-commanding logic $13a.200$. When the system time matches a pre-stored time period, the self-commanding logic $13a.200$ issues a command $13a.201$ to the self-commanding logic $13a.200$ and modifies the configuration variable $13a.132$ which stores the target temperature value in this example. The control flow $13a.100$ controls the air condition using the new target temperature value. The exemplary IoT solution system is self-modifying to reconfigure the target temperature for the air condition (not shown) according to the system time, which is the environment condition of this application example. For exemplary purposes, the condition(s) 13a.300 can be time, date, counter value, user pre-scheduled event, and etc. Some other conditions include the available memory size and power supply level can be checked by running corresponding logic (not shown) implemented for these parameters. The conditions are for exemplary purposes only and are not be limited thereto. Any related parameter thereof that would or could be known to an ordinary person skilled in the art could be included. The method that enables the self-modifying system to reconfigure the system at run time is not limited to the self-commanding logic 13a.200. Any equivalent method thereof that would or could be known to an ordinary person in the art could be included.

Figure 10C:
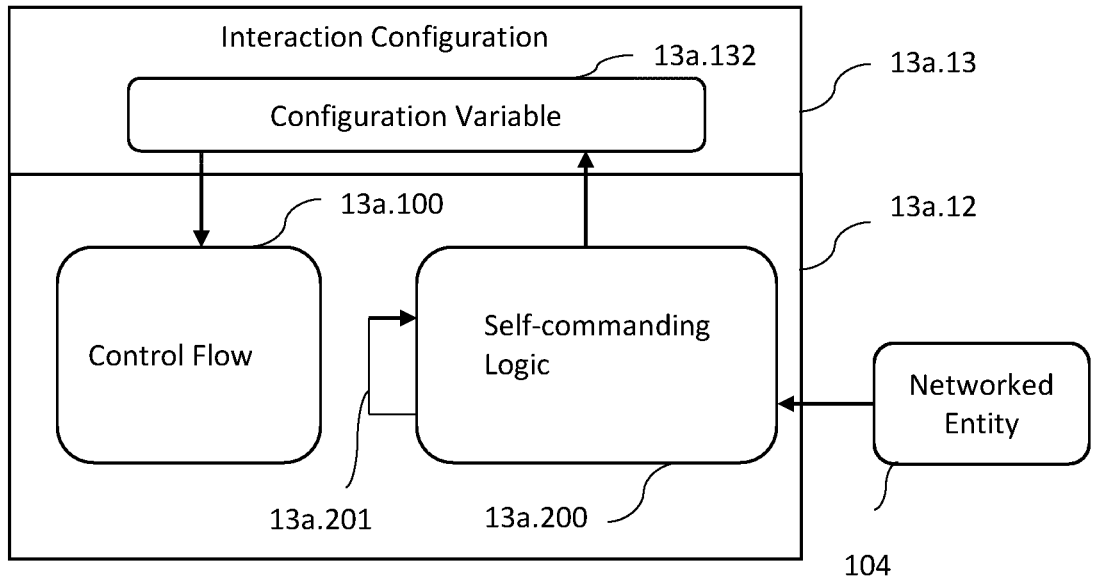
FIG. 10C is a schematic diagram illustrating an execution unit which modifies the interaction configuration based on input from a networked entity according to another embodiment of the present disclosure.

FIG. 10C is a schematic diagram illustrating an execution unit 13a.12 which modifies the interaction configuration 13a.13 based on input from a networked entity 104 according to another embodiment of the present disclosure. The execution unit 13a.12 includes the control flow 13a.100 and the self-commanding logic 13a.200. The interaction configuration 13a.13 includes at least one configuration variable 13a.132. The control flow 13a.100 controls the interaction logic based on the interaction configuration 13a.13. The configuration variable 13a.132 determines how the control flow 13a.100 executes. The self-commanding logic 13a.200 dynamically issues a command 13a.201 to the self-commanding logic 13a.200 during execution to modify the value of the configuration variable 13a.132 at run time. The self-commanding logic 13a.200 modifies the configuration variable 13a.132 based on the input of a networked entity 104. The environment conditions are external input parameters from the networked entity 104 in this embodiment of the present disclosure. The environment conditions can be, but are not limited to, temperature and humidity from a sensor, a user triggered event, user personal identity, analyzing result of a cloud application, analyzing result of machine learning library, and etc. The environmental conditions above are for exemplary purpose only and are not be limited thereto. Any related parameter thereof that would or could be known to an ordinary person skilled in the art could be included. The method that enables the self-modifying system to reconfigure the system at run time is not limited to the self-commanding logic 13a.200. Any equivalent method thereof that would or could be known to an ordinary person in the art could be included.

Another exemplary IoT solution system (not shown) includes an air condition (not shown), a networked entity 104, and one embodiment of the IoT interaction systems (not shown). The embodiment of the IoT interaction systems has the execution unit 13a.12 and the interaction configuration 13a.13, as illustrated in FIG. 1C. The exemplary IoT solution system (not shown) is a self-modifying system, which reconfigures the system at run time, based on the input of the networked entity 104. There are many ways to achieve the self-modifying system, but for exemplary purposes, the method has been implemented where the self-commanding logic 13a.200 is used. The execution unit 13a.12 includes the control flow 13a.100 and the self-commanding logic 13a.200. The control flow 13a.100 is for modulating the air condition (not shown) operation. The interaction configuration 13a.13 includes at least one configuration variable 13a.132. The configuration variable 13a.132 stores a target temperature for the air condition (not shown). The control flow 13a.100 uses the target temperature stored in the configuration variable to control the air condition (now shown) accordingly. The interaction configuration 13a.13 or the execution unit 13a.12 further stores a number of temperature preference for different users. When a user (not shown) checks in through the networked entity 104, the self-commanding logic 13a.200 issues a command 13a.201 to self-commanding logic 13a.200 during execution to modify the value of the configuration variable 13a.132 based on the preference of the user. The control flow 13a.100 controls the air condition to using the new value of the target temperature. The exemplary IoT solution system is self-modifying to reconfigure the target temperature according to the user identification, which is the environment condition of this application example. For exemplary purposes, the environment conditions can be, but are not limited to, temperature and humidity from a sensor, a user triggered event, user personal identity, analyzing result of a cloud application, analyzing result of machine learning library, and etc. The environmental conditions above are for exemplary purpose only and are not be limited thereto. Any related parameter thereof that would or could be known to an ordinary person skilled in the art could be included. The method that enables the self-modifying system to reconfigure the system at run time is not limited to the self-commanding logic 13a.200. Any equivalent method thereof that would or could be known to an ordinary person in the art could be included.

Figure 10D:
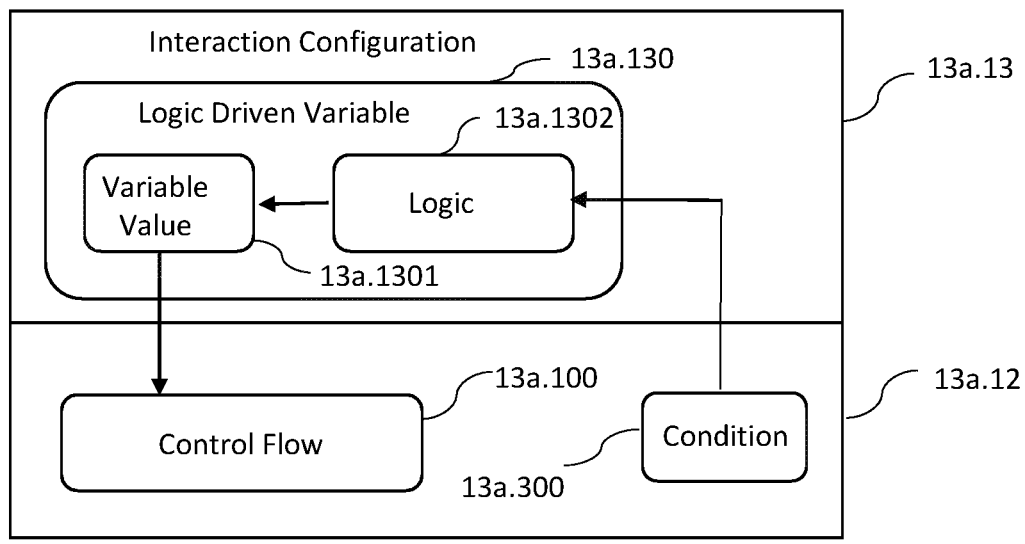
FIG. 10D is a schematic diagram illustrating an execution unit which modifies the interaction configuration through the logic of a logic driven variable based on internal conditions according to another embodiment of the present disclosure.

FIG. 10D is a schematic diagram illustrating an execution unit 13a.12 which modifies the interaction configuration 13a.13 through the logic 13a.1302 of a logic driven variable 13a.130 based on internal conditions (condition(s) 13a.300) according to another embodiment of the present disclosure. The execution unit 13a.12 includes the control flow 13a.100 and the condition(s) 13a.300. The control flow 13a.100 controls the interaction based on the interaction configuration 13a.13. The condition(s) 13a.300 are parameters related to the internal system state. The interaction configuration 13a.13 includes at least one logic driven variable 13a.130. The logic driven variable 13a.130 includes a variable value 13a.1301 and a logic 13a.1302. The logic 13a.1302 is assigned to the logic driven variable 13a.130. The logic driven variable 13a.130 is initialized by the logic 13a.1302 assigned to the logic driven variable 13a.130. The variable value 13a.1301 of the logic driven variable 13a.130 dynamically obtains new variable value 13a.1301 by executing the logic 13a.1302 assigned to the logic driven variable 13a.130. This is different to the ways how interpreted or compiled languages normally achieve dynamic variable value. In interpreted or compiled languages, a variable is initialized with a static value and the variable value is dynamically changed through execution of logic. In contrast, the logic driven variable 13a.130 is initialized by running the logic 13a.1302 and the variability of the variable value 13a.1301 is achieved through execution of the logic 13a.1302 at different times and with different environmental conditions. When the condition(s) 13a.300 change, the logic 13a.1302 assigned to the logic driven variable 13a.130 is triggered to execute based on the new value of the condition(s) 13a.300. The variable value 13a.1301 obtains new value from this logic execution and the new value is used by the control flow 13a.100 to control the interaction logic. The condition(s) 13a.300 are internal state related parameters in this embodiment and can be checked directly by the execution unit 13a.12. The condition(s) 13a.300 can be, but is not limited to, time, date, counter value, user pre-scheduled event, and etc. Some other conditions like the available memory size and power supply level can be checked through running corresponding logic (not shown) implemented for these parameters. The environmental conditions above are for exemplary purpose only and are not be limited thereto. Any related parameter thereof that would or could be known to an ordinary person skilled in the art could be included. The method that enables the self-modifying system to reconfigure the system at run time is not limited to the logic driven variable 13a.130. Any equivalent method thereof that would or could be known to an ordinary person in the art could be included.

Another exemplary IoT solution system (not shown) includes a safety monitoring camera (not shown) and one embodiment of the IoT interaction systems (not shown). The embodiment of the IoT interaction systems include the execution unit 13a.12 and the interaction configuration 13a.13, as illustrated in FIG. 10D. The exemplary IoT solution system (not shown) is a self-modifying system, which reconfigures the system at run time, based on the change of the condition(s) 13a.300. There are many ways to achieve the self-modifying system, but for exemplary purpose, the method has been implemented where the logic driven variable 13a.130 is used. The execution unit 13a.12 includes the control flow 13a.100 and the condition(s) 13a.300. The control flow 13a.100 controls the safety monitoring camera (not shown) to take a number of pictures. The condition(s) 13a.300 are dates in this application example. The interaction configuration 13a.13 includes at least one logic driven variable 13a.130 includes the variable value 13a.1301 and the logic 13a.1302 assigned to the logic driven variable 13a.130. The variable value 13a.1301 of the logic driven variable 13a.130 stores the number of pictures to take and is used by the control flow 13a.100 to control the safety monitoring camera (not shown). The variable value 13a.1301 is initialized by the logic 13a.1302 and obtains new value by executing the logic 13a.1302 under different environmental conditions at different time. Each time the condition(s) 13a.300 (which is the date) change, the logic 13a.1302 assigned to the logic driven variable 13a.130 is executed and the variable value 13a.1301 obtains a new value. The control flow 13a.100 uses this new value as the new target number of how many pictures will be taken on that date and operates the camera (not shown) accordingly. The IoT solution system is self-modifying to reconfigure the target number of pictures according to date which is the environment condition in this application example. The condition(s) 13a.300 can be, but are not limited to, time, date, counter value, user pre-scheduled event, and etc. Some other conditions like the available memory size and power supply level can be checked through running corresponding logic (not shown) implemented for these parameters. The environmental conditions above are for exemplary purpose only and are not be limited thereto. Any related parameter thereof that would or could be known to an ordinary person skilled in the art could be included. The method that enables the self-modifying system to reconfigure the system at run time is not limited to the logic driven variable 13a.130. Any equivalent method thereof that would or could be known to an ordinary person in the art could be included.

Figure 10E:
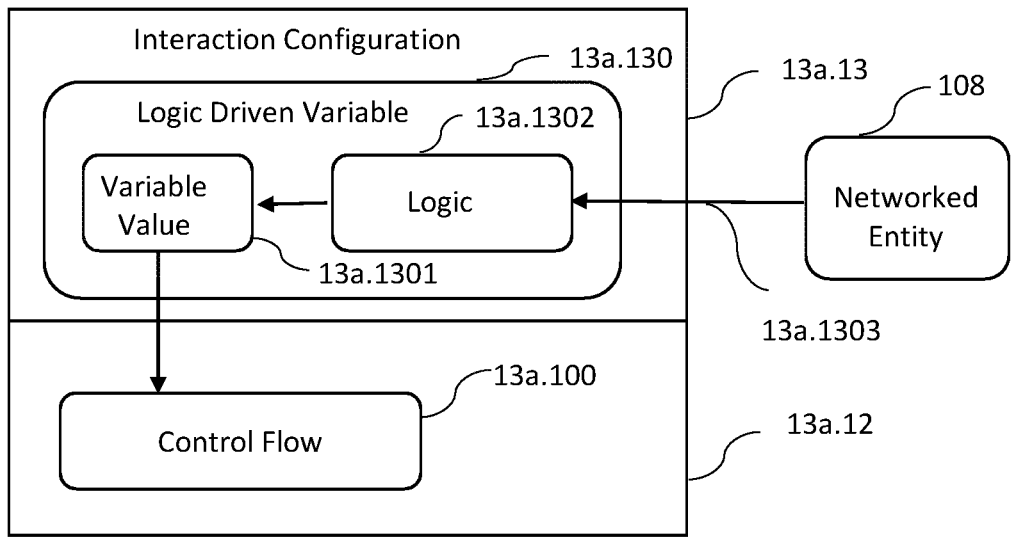
FIG. 10E is a schematic diagram illustrating an execution unit which modifies the interaction configuration through the logic of a logic driven variable based on input from a networked entity according to another embodiment of the present disclosure.

FIG. 10E is a schematic diagram illustrating an execution unit 13a.12 which modifies the interaction configuration 13a.13 through the logic 13a.1302 of a logic driven variable 13a.130 based on input from a networked entity 108 according to another embodiment of the present disclosure. The execution unit 13a.12 includes the control flow 13a.100. The control flow 13a.100 controls the interaction logic. The interaction configuration 13a.130 includes at least one logic driven variable 13a.130. The logic driven variable 13a.130 includes the variable value 13a.1301 and the logic 13a.1302 assigned the logic driven variable 13a.130. The variable value 13a.1301 is initialized by the logic 13a.1302 and obtains new value by executing the logic 13a.1302 under different environmental conditions at different time. The environmental conditions can be the input parameters 13a.1303 from the networked entity 108 in this embodiment. When the input parameters 13a.1303 from the networked entity 108 change, the logic 13a.1302 assigned to the logic driven variable 13a.130 is triggered to execute using the new input parameters 13a.1303 from the networked entity 108. The variable value 13a.1301 obtains a new value from the execution of the logic 13a.1302 based on the input parameters 13a.1303. In this embodiment, the input parameter 13a.1303 from the network entity 108 is the environmental condition which triggers the re-configuration and is used for the reconfiguration. The environment conditions can be, but are not limited to, temperature and humidity from a sensor, a user triggered event, user personal identity, analyzing result of a cloud application, analyzing result of machine learning library, and etc. The environmental conditions above are for exemplary purpose only and are not be limited thereto. Any related parameter thereof that would or could be known to an ordinary person skilled in the art could be included. The method that enables the self-modifying system to reconfigure the system at run time is not limited to the logic driven variable 13a.130. Any equivalent method thereof that would or could be known to an ordinary person in the art could be included.

Another explanatory IoT solution system (not shown) includes a safety monitoring camera (not shown), the networked entity 108, and one embodiment of the IoT interaction systems (not shown). The embodiment of the IoT interaction systems includes the execution unit 13a.12 and the interaction configuration 13a.13, as illustrated in FIG. 10E. The exemplary IoT solution system (not shown) is a self-modifying system and reconfigures the system at run time, based on the input of the networked entity 108. There are many ways to achieve the self-modifying system, but for exemplary purposes, the method has been implemented where the logic driven variable 13a.130 is used. The execution unit 13a.12 includes the control flow 13a.100. The control flow 13a.100 controls the safety monitoring camera (not shown) to take a number of pictures. The interaction configuration 13a.13 includes at least one logic driven variable 13a.130. The logic driven variable 13a.130 includes the variable value 13a.1301 and the logic 13a.1302 assigned to the logic driven variable 13a.130. The variable value 13a.1301 of the logic driven variable 13a.130 stores the number of pictures to take and is used by the control flow 13a.100 to control the safety monitoring camera (not shown). The variable value 13a.1301 is initialized by the logic 13a.1302 and obtains new value by executing the logic 13a.1302 under different environmental conditions at different time. The environmental conditions in this application example can be the input parameters 13a.1303 from the networked entity 108. When a user (not shown) input a new number through the networked entity 108 such as a mobile app connected through internet, the new number is passed to the interaction configuration 13a.13 and the logic 13a.1302 as the input parameter 13a.1303. The logic 13a.1302 in the logic driven variable 13a.130 is triggered to execute based on the number inputted from the networked entity 108. The variable value 13a.1301 obtains new value from the execution of the logic 13a.1302 based on the inputted number. The new value of the variable value 13a.1301 is used as the new target number by the control flow 13a.100 to control the safety monitoring camera (not shown). The exemplary IoT solution system is self-modifying and reconfigures the target number of pictures based on the user input through the networked entity 108 which is the environmental conditions in this application example. The environment conditions can be, but are not limited to, temperature and humidity from a sensor, a user triggered event, user personal identity, analyzing result of a cloud application, analyzing result of machine learning library, and etc. The environmental conditions above are for exemplary purpose only and are not be limited thereto. Any related parameter thereof that would or could be known to an ordinary person skilled in the art could be included. The method that enables the self-modifying system to reconfigure at run time is not limited to the logic driven variable 13a.130. Any equivalent method thereof that would or could be known to an ordinary person in the art could be included.

Figure 10F:
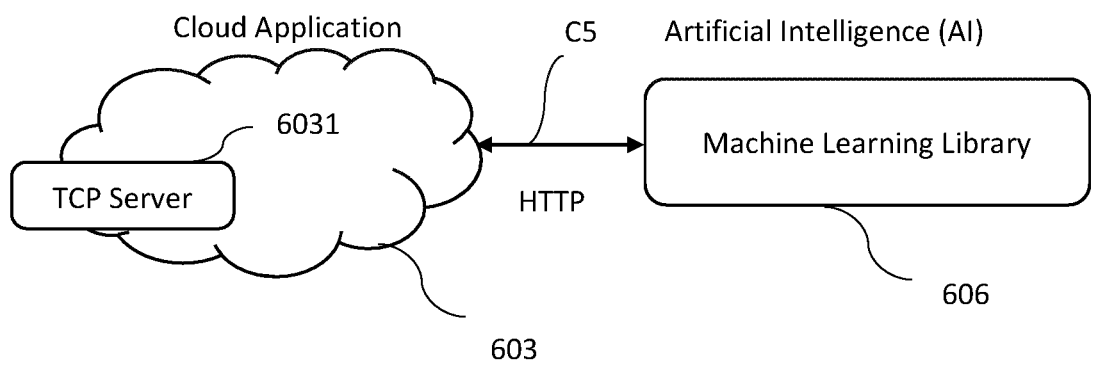
FIG. 10F is a schematic diagram illustrating a cloud application with machine learning library as an example of the networked entity providing input for reconfiguring the system according to another embodiment of the present disclosure.

FIG. 10F is a schematic diagram illustrating a cloud application 603 with a machine learning library 606 as an example of the networked entity providing input for reconfiguring the system according to another embodiment of the present disclosure. The cloud application 603 includes a TCP server 6031. The TCP server 6031 can be the interface component to enable the cloud application 603 to communicate with the IoT interaction systems. The cloud application 603 includes an artificial intelligence (AI) module which can be a machine learning library 606. The machine learning library 606 can be implemented together with the cloud application 603 in one program or can be implemented in separate program running on a different machine at a different location with the cloud application 603. When the machine learning library is implemented on a separate machine at different location with the cloud application, the machine learning library 606 can communicate with the cloud application 603 through the HTTP connection C5 using the HTTP protocol with internet connection. The cloud application 603 and the machine learning library 606 can process data and the processing result can serve as the environmental conditions to the IoT interaction systems to which the cloud application 603 and the machine learning library 606 are connected. The cloud application 603 and the machine learning library 606 can communicate to the IoT interaction systems through the TCP server 6031 and provide the processing result as a feedback parameter. The machine learning library 606 for the artificial intelligence program is for exemplary purpose only and the artificial intelligence program can have many ways of implementation and is not limited thereto. Any related algorithm that would or could be known to an ordinary person in the art could be included.

Figure 10G:
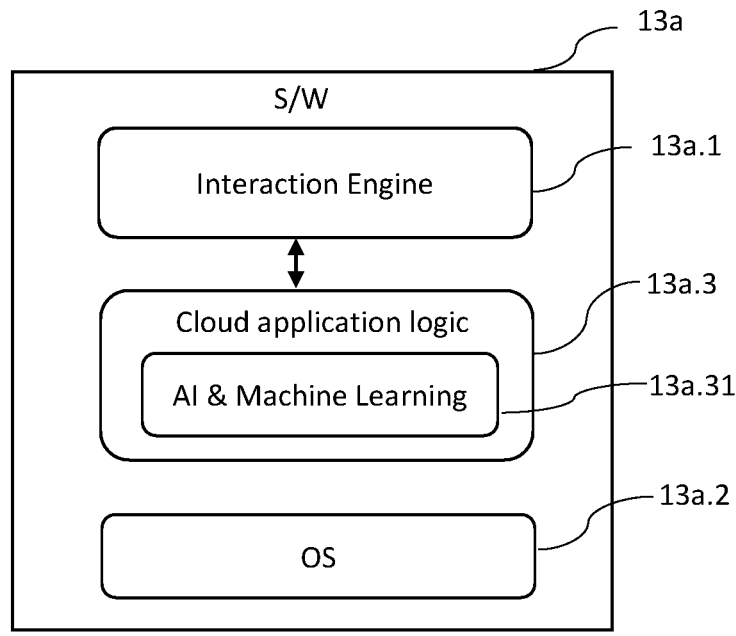
FIG. 10G is a schematic diagram illustrating a software program having the interaction engine and a cloud application logic including a machine learning module according to another embodiment of the present disclosure.

FIG. 10G is a schematic diagram illustrating a software program 13a having the interaction engine 13a.1 and a cloud application logic 13a.3 including a machine learning module 13a.31 according to another embodiment of the present disclosure. The software program 13a includes the interaction engine 13a.1, the OS 13a.2, and the cloud application logic 13a.3. The cloud application 13a.3 includes the machine learning module 13a.31 as the artificial intelligence (AI) solution. The cloud application 13a.3 interacts with the interaction engine 13a.1 for providing the artificial intelligence (AI) analytical functionality. This embodiment of the IoT interaction systems pushes the functionality used to be implemented on the cloud into the IoT interaction systems. An exemplary IoT solution system (not shown) can be developed using this embodiment of the IoT interaction systems. The exemplary IoT solution system can have the artificial intelligence (AI) analytical functionality of cloud application as a standalone system and works even when internet connection goes down rather than relying on internet connection like the traditional systems. It is an important advantage in mission critical applications. The cloud application logic 13a.3 is not limited to the implementation in parallel with the interaction engine 13a.1 within the software program 13a. For example, the cloud application logic 13a.3 can be implemented within the interaction engine 13a.1 and the interaction engine 13a.1 can configure the interaction with the cloud application logic 13a.3 through configuration. The machine learning module 13a.31 for the artificial intelligence solution is for exemplary purpose only and the artificial intelligence solution can have many ways of implementation and is not limited thereto. Any related algorithm that would or could be known to an ordinary person in the art could be included. The artificial intelligence is an example for the functionality of cloud application that can be implemented in the software program 13a and the functionality is not limited thereto. Any possible functionality for cloud application that would or could be known to an ordinary person in the art could be included. The advantage works even the internet connections goes down is for exemplary purpose only and the embodiments of the IoT interaction systems are not limited thereto.

Figure 10H:
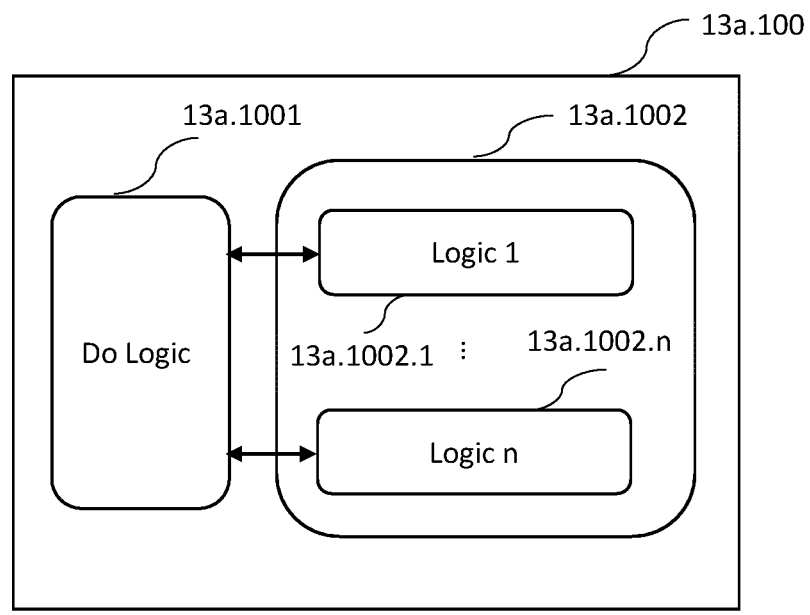
FIG. 10H is schematic diagram illustrating a control flow implemented based on Do Logic according to the embodiments of the present disclosure.

FIG. 10H is schematic diagram illustrating the control flow 13a.100 implemented based on Do Logic 13a.1001 according to the embodiments of the present disclosure. The term "Do Logic' herein is interchangeable with "Do Command" which can associate any number of logic and parameters as arguments and execute the logic accordingly. The Do Logic or Do command is one the many command defined in the syntax for the IoT interaction systems. Do Logic 13a.1001 forms the building block of creating configurable interaction logic. While service, solution, interaction, and interface form the logical abstraction of concepts involved in interacting with various services, Do Logic 13a.1001 allows granular implementation of various logic to build into an overall solution. The control flow 13a.100 comprises at least one Do Logic 13a.1001 and a list of logic 13a.1002. The list of logic 13a.1002 includes at least one logic 13a.1002.1. The list of logic 13a.1002 may include a number of logic from the logic 13a.1002.1 to the logic 13a.1002.n. The list of logic 13a.1002 is passed to the Do Logic 13a.1001 as the input arguments to the Do Logic 13a.1001. The Do Logic 13a.1001 execute each and every logic in the list of logic 13a.1002 which is passed to the Do Logic as arguments. Using the Do Logic 13a.1001, the control flow 13a.100 can control the logic execution to the level of a single logic in the list of logic 13a.1002, and, therefore, implement the various logic in the IoT solution at granular level. The granular level implementation of various logic allows users to develop complex IoT solution system with flexibility of implementation.

The components that are used as building blocks for the interaction logic include, but are not limited to: properties, interfaces, services, events, and logic, as further explained in detail as follows.

Property is a way to create a logic driven variable, referring to 13a.130 in FIGS. 10D-10E for exemplary purpose only. The logic driven variable 13a.130 is assigned with a logic 13a.1302 or a logic block instead of data. The logic driven variable 13a.130 has the variable value 13a.1301 initialized by the logic 13a.1302 or logic block and obtains new value for the variable value 13a.1301 dynamically by executing the logic 13a.1302 or logic block with different environmental conditions at the time of execution. This is different to other languages such as the interpreted languages or the compiled languages, which normally initialize a dynamic variable with a static value and change the value during execution of other logic. With the logic driven variable 13a.130, the initialization is done by the logic driven variable 13a.130 itself by executing the logic 13a.1302 or logic block assigned to the logic driven variable 13a.130. The variability of the variable value 13a.1301 is achieved through execution of the logic 13a.1302 at different times under different environmental conditions. The property creates the logic driven variable using a defined set of logic within the scope in which the property is defined. Properties can reference other properties to create a chain of dynamic variables within the scope. Properties can be referenced by other components within the same scope such as other logic components. The terms "property" and "logic driven variable" are interchangeably used in this specification.

Interface is abstraction of connectivity, communication and communication components. Interface defines and handles the connectivity and communication characteristics, including but not limited to, interface type, protocol used, connection or connection-less, security, address, and port. For example, in FIG. 1D, the fourth IoT interaction system 40 interfaces with the first and second networked entities 44 and 46 using HTTP protocol. The first and second client component 40a and 40b are the interface components having the connectivity and communication characteristics for the communication protocol and all other information needed for the communication and interactions between the fourth IoT interaction system 40 and the first and second networked entities 44 and 46.

Figure 11A:
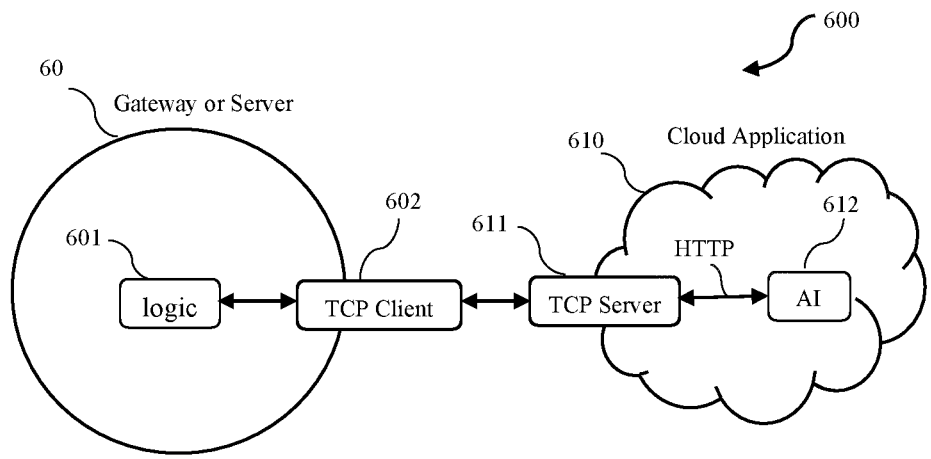
FIG. 11A is a schematic diagram illustrating an exemplary IoT solution system including a sixth IoT interaction system which modifies configuration based on response from cloud application and machine learning library according to another embodiment of the present disclosure.

FIG. 11A is a schematic diagram illustrating an exemplary IoT solution system 600 including a sixth IoT interaction system 60 which modifies configuration based on response from a cloud application 610 and a machine learning library 612 according to another embodiment of the present disclosure. The exemplary IoT solution system 600 includes the sixth IoT interaction system 60 and the cloud application 610. The sixth IoT interaction system 60 may include a networking device, such as a Gateway or a server. The Gateway or the server may work as a standalone device. The sixth IoT interaction system 60 includes the interaction logic 601 and a TCP client component 602. The interaction logic 605 controls the interaction of the sixth IoT interaction system 60 and the cloud application 610. The TCP client component 602 is the interface component for the sixth IoT interaction system to communicate with the cloud application 610. The cloud application 610 includes an artificial intelligence module 612 and a TCP server component 611. The artificial intelligence module 612 may include a machine learning library or other programs providing artificial intelligence functionality. The TCP server component 611 is the interface component for the cloud application 610 to communicate with the sixth IoT interaction system 60. The cloud application 610 and the artificial intelligence (AI) module 612 can be implemented together in one program or separately in different programs running on different machines at different locations. When the cloud application 610 and the artificial intelligence (AI) module 612 are implemented on separated machines at different locations, the cloud application 610 and the artificial intelligence (AI) module 612 can communicate with each other with HTTP connection through Internet. The interaction logic 601 sends data to the cloud application 610 and the artificial intelligence (AI) module 612. The artificial intelligence (AI) module 612 processes the data and passes the processing result back to the cloud application 610 and the cloud application 610 passes the processing result to the interaction logic 601. The interaction logic 601 analyzes the response and reconfigures the sixth IoT interaction system 60. The exemplary IoT solution system is self-modifying based on environmental conditions, which are the processing result from the artificial intelligence (AI) module 612 in this application example. The artificial intelligence (AI) module may have many ways of implementation and is not limited to the machine learning library. Any related algorithm or program that would or could be known to an ordinary person in the art could be included. The networked entity, that the sixth IoT interaction system is connected to and interacts with, is not limited to the cloud application 610. Any networked entity that would or could be known to an ordinary person in the art could be included.

Figure 11B:
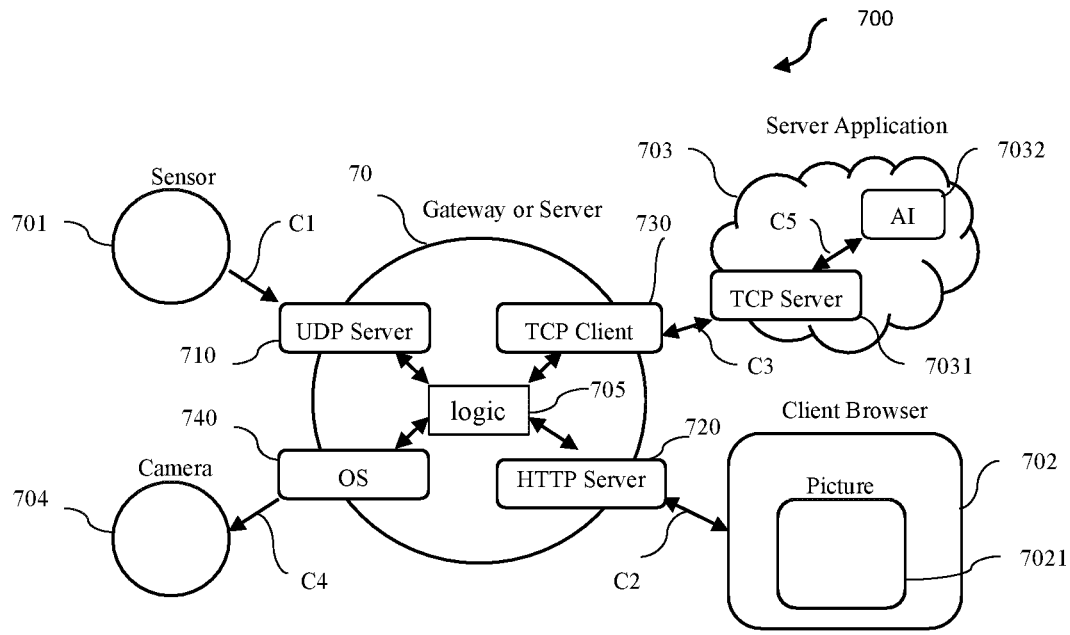
FIG. 11B is a schematic diagram illustrating an exemplary IoT solution system including a seventh IoT interaction system interacts with a plurality of networked entity and modifies system configuration at run time based on response from a cloud application and a machine learning library according to another embodiment of the present disclosure.

FIG. 11B is a schematic diagram illustrating an exemplary IoT solution system 700 including a seventh IoT interaction system 70 interacts with a plurality of networked entities (701, 702, 703, 704) and modifies system configuration at run time based on response from a server application 703 and a machine learning library 7032 according to another embodiment of the present disclosure. The exemplary IoT solution system includes a seventh IoT interaction system 70, a sensor 701, a client browser 702 on a different networked entity (not shown), a server application 703, and a camera 704. The seventh IoT interaction system 70 may include a networking device, such as, a Gateway or a server. The networking device may work as a standalone device. The seventh IoT interaction system 70 includes a UDP server component 710, an HTTP server component 720, a TCP client component 730, an interaction logic 705, and OS 740. The interaction logic 705 interacts with the UDP sever component 710, the HTTP server component 720, the TCP client component 730, and the OS 740. The UDP server component 710 is the interface component connecting to the sensor 701 through a UDP connection C1. The HTTP server component 720 is the interface component connecting to the client browser 702 through a first HTTP connection C2. The TCP client component 730 is the interface component connecting to the server application 703 through a TCP connection C3. The OS 740 interacts with the camera 740 directly through the OS command C4. The server application 703 may be a cloud application implemented on cloud or a server application implemented on server. The server application 703 includes a TCP server component 7031 and a machine learning library 7032 as the artificial intelligence (AI) solution. The TCP server component 7031 is the interface component to the seventh IoT interaction system 70 through the TCP connection C3. The machine learning library 7032 may be implemented in the same program with the server application 703 or may be implemented in a separate program running on a different machine at a different location. When the machine learning library 7032 is implemented in a separate program running on a different machine, the machine learning library 7032 and the server application 703 can communicate with each other through the second HTTP connection C5. The sensor 701 sends data to the seventh IoT interaction system 70 through the UDP connection C1. The seventh IoT interaction system 70 checks the data received from the sensor 701 with a corresponding threshold value stored in the seventh IoT interaction system 70. The threshold value may be stored in a logic driven variable or a configuration variable. The interaction logic 705 performs necessary logic based on the comparison result. If the data received from the sensor 701 meets the stored threshold value, the seventh IoT interaction system 70 will interact with the OS 740 to issue the OS command (OS CMD) C4 to perform a corresponding action on the camera 704, such as taking a picture. If the data received from the sensor 701 does not meet the threshold value, no command will be issued and no action will be taken. Next, the seventh IoT interaction system 70 sends the data to the server application 703 through the TCP connection C3. Once the server application 703 receives the data from the seventh IoT interaction system 70, the server application 703 passes the data to the machine learning library 7032 through the second HTTP connection C5. The machine learning library 7032 comprises various machine learning algorithms. The machine learning library 7032 performs necessary analysis on the data and return the processing result as a response back to the server application 703. Once the server application 703 receives the response from the machine learning library 7032, the server application 703 passes the response to the seventh IoT interaction system 70 through the TCP connection C3. When the seventh IoT interaction system 70 receives the response from the server application 703, the seventh IoT interaction system 70 performs necessary analysis on the response and reconfigures the system by modifying the threshold value. Next time when the seventh IoT interaction system 70 receives a new data from the sensor 701, the seventh IoT interaction system 70 checks the new data against the new threshold value. The exemplary IoT solution system 700 is self-modifying on the threshold hold value based on the processing result of the server application 703 and the machine learning library 7032. The processing result is environmental condition in this application example. The client browser 702 communicates with the seventh IoT interaction system 70 through the first HTTP connection C2 and displays a picture 7021. In this exemplary IoT solution system, the server components, the client components, and the connections are all for exemplary purpose only and should not be limited thereto. For example, the server component can be a Rest server and the client component can be a Rest client. Any related components that would or could be known to an ordinary person skilled in the art could be included. The HTTP connections, the TCP connection, and the UDP connection are for exemplary purpose only and the connections are not limited thereto. The connections can be wired or wireless and the communication protocol can be WIFI, Bluetooth, ZigBee, NFC (near field communication), and etc. Any equivalent method of communication and connection thereof that would or could be known to an ordinary person skilled in the art could be included. The sensor, camera, client browser, and server application are for exemplary purpose only and the networked entities are not limited thereto. Any networked entities that would or could be known to an ordinary person skilled in the art could be included.

Figure 12:
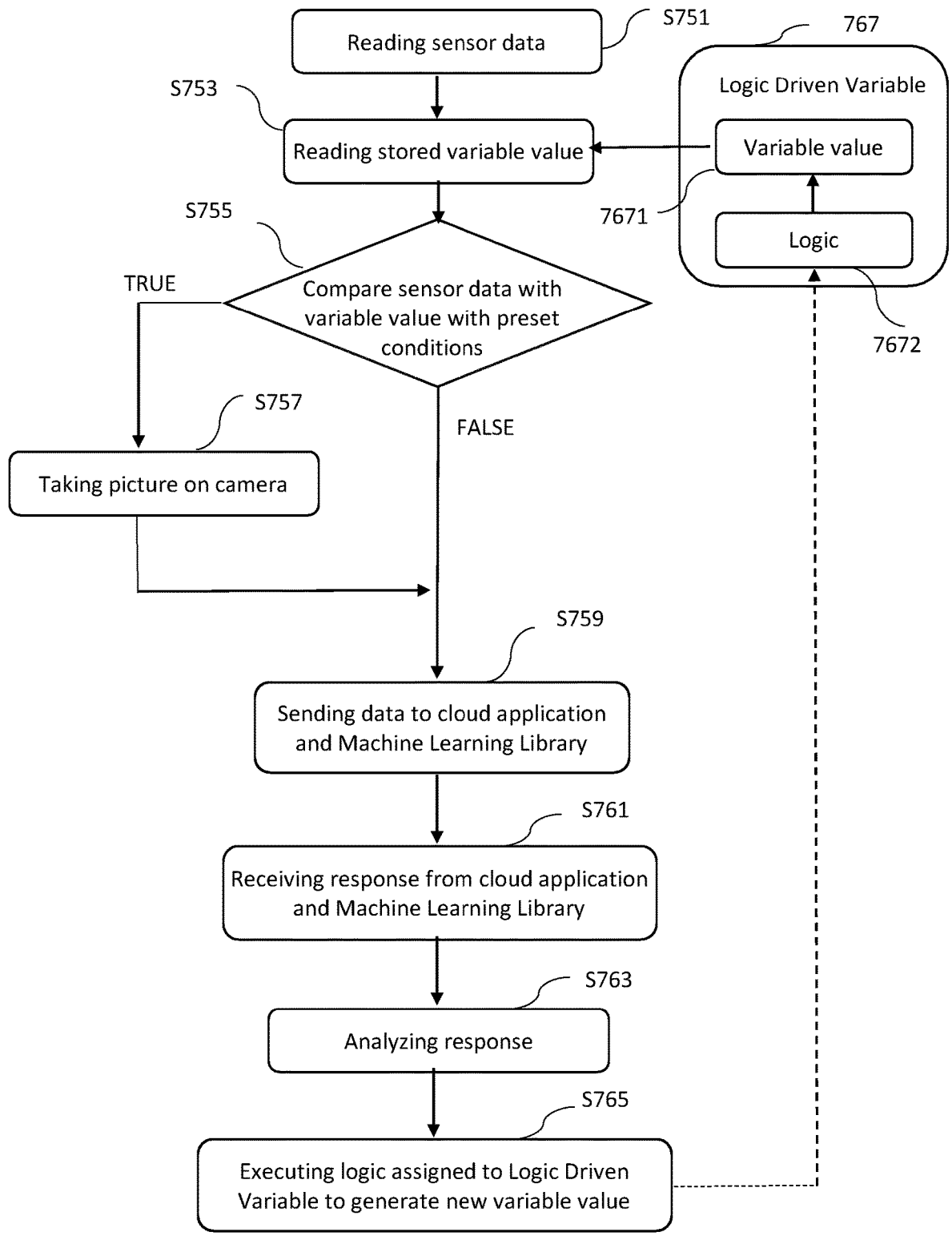
FIG. 12 is a schematic flowchart illustrating a self-configuration process according to another embodiment of the present disclosure.

FIG. 12 is a schematic flowchart illustrating a self-configuration process in another exemplary IoT solution system according to another embodiment of the present disclosure. The exemplary IoT solution system (not shown) has the same configuration with the embodiment of IoT solution systems illustrated in FIG. 11B except that the self-configuration is achieved through a logic driven variable 767. Referring to FIGS. 11B and 12, the exemplary IoT solution system reads data from the sensor 701 in step S751 and reads the variable value 7671 from the logic driven variable 767 as the threshold value in step S753. The exemplary IoT solution system compares the sensor data to the threshold value with preset conditions in step S755. If the sensor data meets the preset conditions, the exemplary IoT solution system sends command to the camera 704 to take a picture in step S757. Step S759 sends data to the server application 703 and the machine learning library 7032. In step S761, a response is received from the server application 703 and the machine learning library 7032. The interaction logic 705 analyzes the response in step S763 and triggers the execution to the logic 7672 assigned to the logic driven variable 767 to generate a new value for the variable value 7671. The new value will be used for future comparison to new sensor data in step S753. The exemplary IoT solution system is self-modifying on the threshold value based on environment condition, which is the analyzing result of machine learning library 7032 in this application example.

Figure 13A:
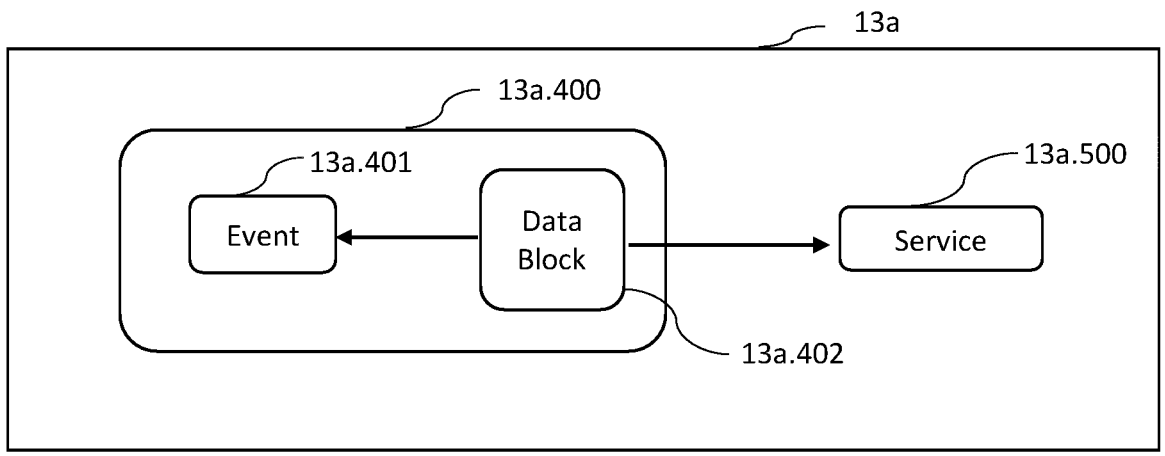
FIG. 13A is a schematic diagram illustrating a software program having an event and a service sharing data according to another embodiment of the present disclosure.

FIG. 13A is a schematic diagram illustrating a software program 13a having an event 13a.401 and a service 13a.500 configured to share the data bock 13a.402 according to another embodiment of the present disclosure. The software program 13a includes an event 13a.401, a data block 13a.402, and a service 13a.500. The event 13a.401 and the service 13a.500 can be blocks of logic that can be executed from multiple entry points. The event 13a.401 and the service 13a.500 are configured to share the data block 13a.402. The data block 13a.402 can include a number of data items. The event 13a.401 and the data block 13a.402 are defined within the same scope 13a.400. The service 13a.500 is defined outside the scope 13a.400. The data block 13a.402 is shared by the service 13a.500 and the event 14a.401 at the time of execution. The event 13a.401 is executed within the scope 13a.400. Any data that exists within the scope 13a.400, including the data block 13a.402, can be shared with the logic block of the event 13a.401. The service 13a.500 is executed outside the scope 13a.400. The data block 13a.402 is shared with the service 13a.500 by passing the data block 13a.402 as a list of argument to the service 13a.500. The service 13a.500 and the event 13a.401 have a last logic (not shown). The return value of the last logic, that is executed in either the event 13a.401 or the service 13a.500, is returned as the final return value of the service 13a.500 and the event 13a.401.

Figure 13B:
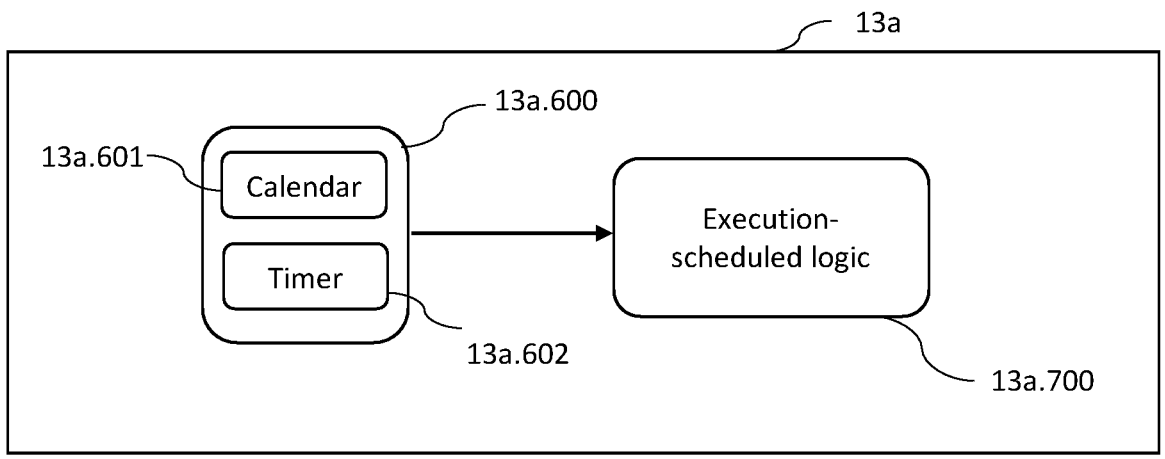
FIG. 13B is a schematic diagram illustrating a software program having an execution-scheduled logic executing on scheduled date and time according to another embodiment of the present disclosure.

FIG. 13B is a schematic diagram illustrating a software program 13a having an execution-scheduled logic 13a.700 executing on scheduled date and time according to another embodiment of the present disclosure. The software program 13a includes a time component 13a.600 and the execution-scheduled logic 13a.700. The time component 13a.600 includes a calendar component 13a.601 and a timer component 13a.602. The execution-scheduled logic 13a.700 is scheduled to be executed on specific date and time. The time component 13a.600 monitors the data using the calendar component 13a.601 and monitors the time using the timer component 13a.602. Once the date and time meets the scheduled data and time of the execution-scheduled logic 13a.700, the execution-scheduled logic 13a.700 is triggered to execute. The scheduling process can be automatically set by the software program 13a or can be manually setup by a user.

Figure 13C:
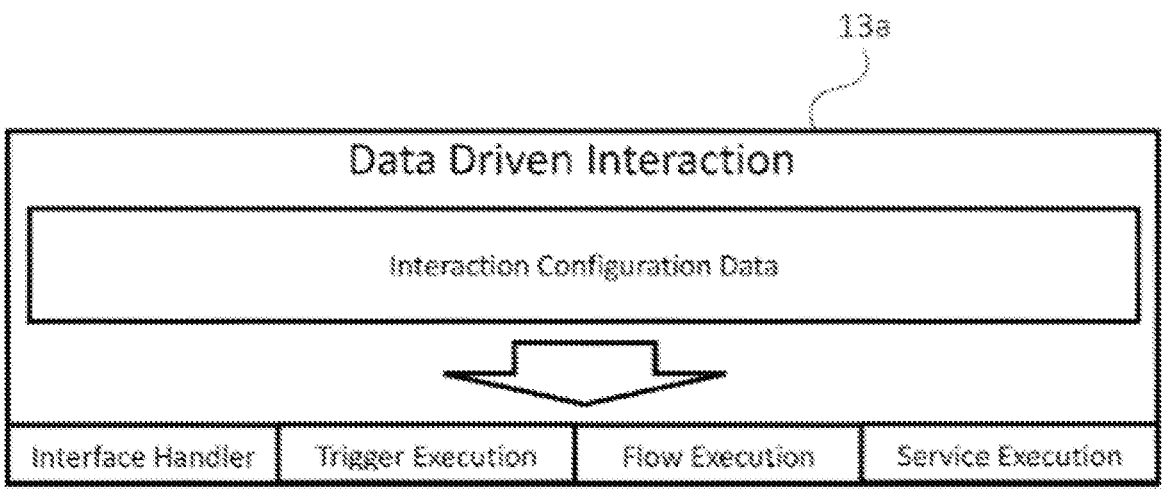
FIG. 13C is a schematic diagram illustrating a software program having data driven interaction according to another embodiment of the present disclosure.

FIG. 13C is a schematic diagram illustrating the software program 13a. According to another embodiment of the present disclosure, the software program 13a provides a data driven interaction. Accordingly, no specific code is required, and even if a number of a plurality of entities increases, it does not surge the memory requirements because it does not require corresponding computer codes. The user can configure how to parse, map, and transform the input data by maneuvering the setting menu of the software program 13a. Thus, either adding or deleting the IoT entities to the IoT interaction device 13 would not require any further computer program coding. One more advantage to having the data driven interaction is that it enables the ability to reflect configuration changes at run time. Conventionally, if the configuration is changed, it requires a re-load because a client component is objectified. However, according to the present disclosure, such objectification is not required because the software program 13a is data-driven. If the user changes the interaction configuration, the software program 13a can reflect such changes at run time as it does not require computer program to reload and restart it. Thus, the execution of unit 13a.12 can continuously execute the changed configuration at run time.

Figure 14:
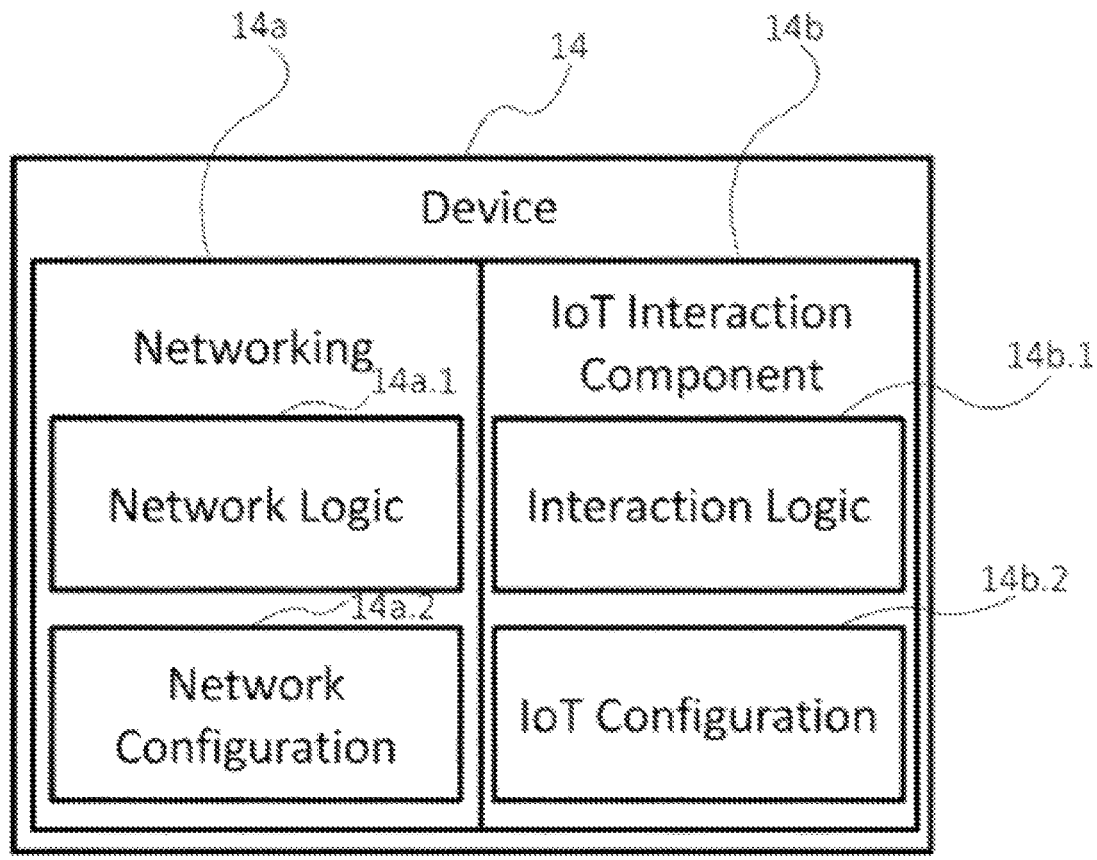
FIG. 14 is a schematic diagram illustrating an IoT interaction device having a networking device and IoT interaction component according to another embodiment of the present disclosure.

FIG. 14 is a schematic diagram illustrating an IoT interaction device 14 having a networking device 14a and IoT interaction component 14b. The IoT interaction device 14 can be a stand-alone device providing an IoT interaction logic and at the same time fully functioning as a router.

The networking device 14a can be a conventional router or a switch. The networking device 14a includes a network logic 14a.1, and network configuration 14a.2. The network logic 14a.1 and network configuration 14a.2 can be implemented in the software and stored within the memory. The network logic, which is outside the ISO/OSI layers, may be implemented in the hardware, software, or a combination thereof. Note that the components of the networking device 14a, when implemented in software, can be stored and transported on any computer-readable medium for use by, or in connection with, an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but is not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The exemplary embodiment of the networking device 14a, although not described in FIG. 12, can have at least one conventional processing element, such as a digital signal processor (DSP) or a central processing unit (CPU) that communicates with and drives the other elements within the networking device 14a via a local interface, which can include at least one bus. Each of the components of the networking device 14a is preferably housed within a single housing unit, although such a feature is not necessary for implementing the present Disclosure.

IoT interaction component 14b includes and performs any functions and features that IoT interaction system 10 or device 13 can do as described in this specification. IoT interaction component 14b includes an interaction logic 14b.1, and IoT configuration 14b.2. Each of the interaction logic 14b.1, and the IoT configuration 14b.2 can correspond to the network logic 14a.1, and the network configuration 14a.2, respectively.

IoT interaction component 14b includes a computing device that has a processor, a memory, and an I/O device. Any computer application can run on the IoT interaction component 14b. A user can set a network configuration 14a.2 and IoT configuration by maneuvering the IoT interaction device 14.

Figure 15A:
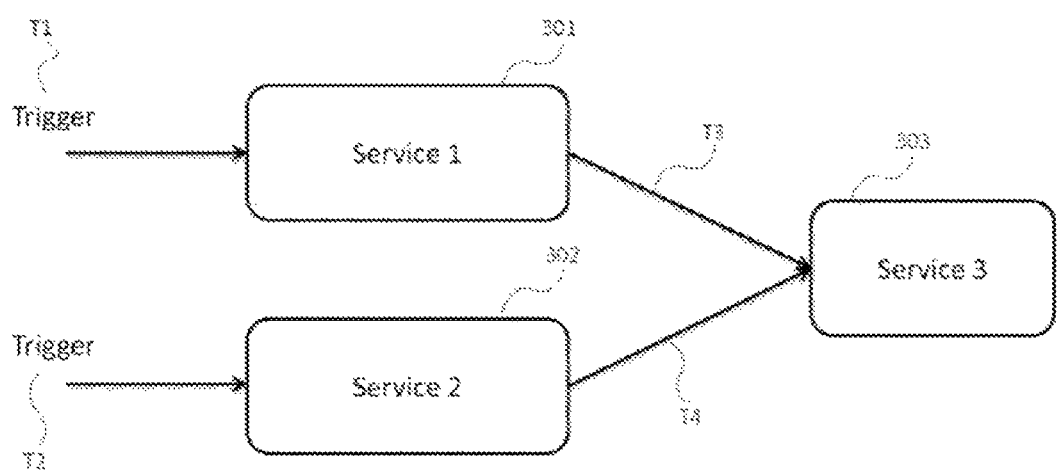
FIG. 15A illustrates a schematic diagram depicting interactions and services handling a plurality of triggers according to another embodiment of the present disclosure.

FIG. 15A illustrates a schematic diagram depicting interactions and services handling a plurality of triggers according to another embodiment of the present disclosure. Referring to FIG. 15A, the IoT interaction system 10 includes a first service 301, a second service 302, and a third service 303. The third service 303 is configured to handle a plurality of triggers. For instance, referring to FIG. 15A, the first service 301 receives a first trigger T1. The second service 302 receives a second trigger T2. Third service 303 receives a third trigger T3 from first service 301 and a fourth trigger T4 from second service 302. Both third trigger T3 and fourth trigger T4 can be, for instance, time, temperature, or any other kind of information. The third service 303 can compare, combine, process or use the third and fourth triggers T3 and T4 in a predetermined manner.

Figure 15B:
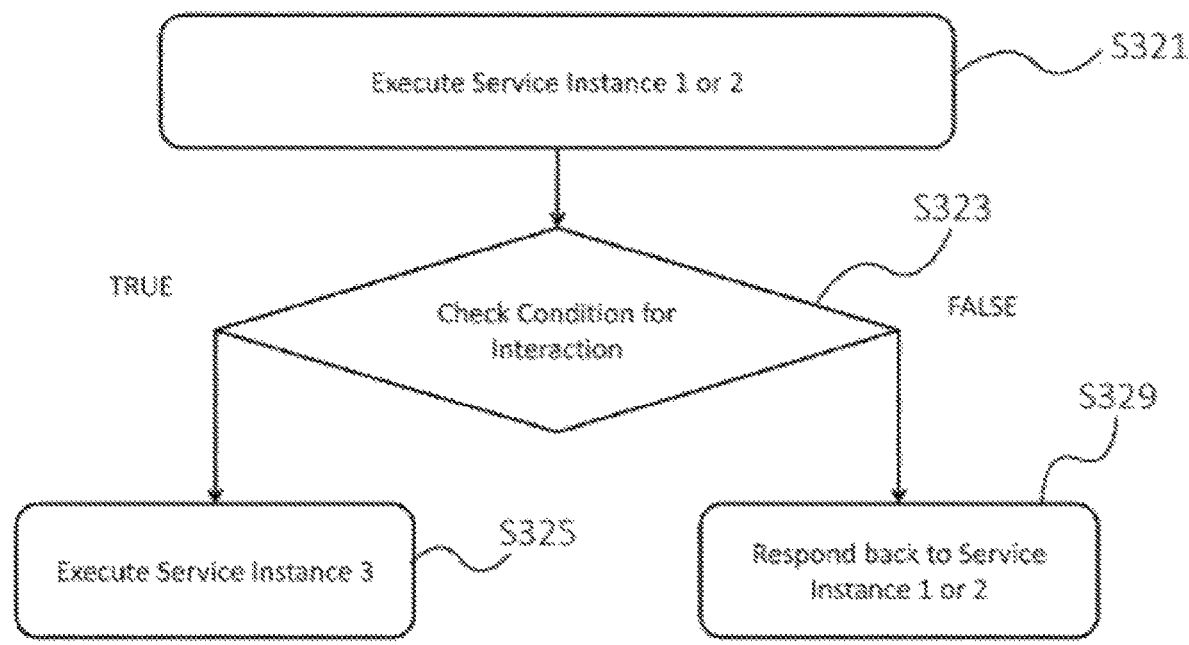
FIG. 15B is a schematic flowchart for checking a condition for interaction according to another embodiment of the present disclosure.

FIG. 15B is a schematic flowchart for checking the condition for interaction according to another embodiment of the present disclosure. When a service receives a plurality of triggers, the service can be configured to check a predetermined condition for an interaction. For instance, referring to FIG. 15A, third service 303 receives third trigger T3 and fourth trigger T4 as a result of execution of the first service 301 and the second service 302 (S321). The third service 303 checks a predetermined condition for an interaction (S323). The predetermined condition can have various forms. For example, when third service 303 receives only one of third and fourth triggers T3 and T4, third service 303 is able to wait to receive another trigger in order to meet the predetermined condition. When the predetermined condition requires that the two (2) values between third trigger T3 and fourth trigger T4 be compared, such comparison can be performed with a processor and memory. In accordance with the predetermined condition, both third trigger T3 and fourth trigger T4 can be compared with a predefined value. After checking the predetermined condition, if it is true, IoT interaction system 10 can execute third service 303 (S325). If it is false, the IoT interaction system 10 responds back to either first service 301 or second service 302.

Figure 15C:
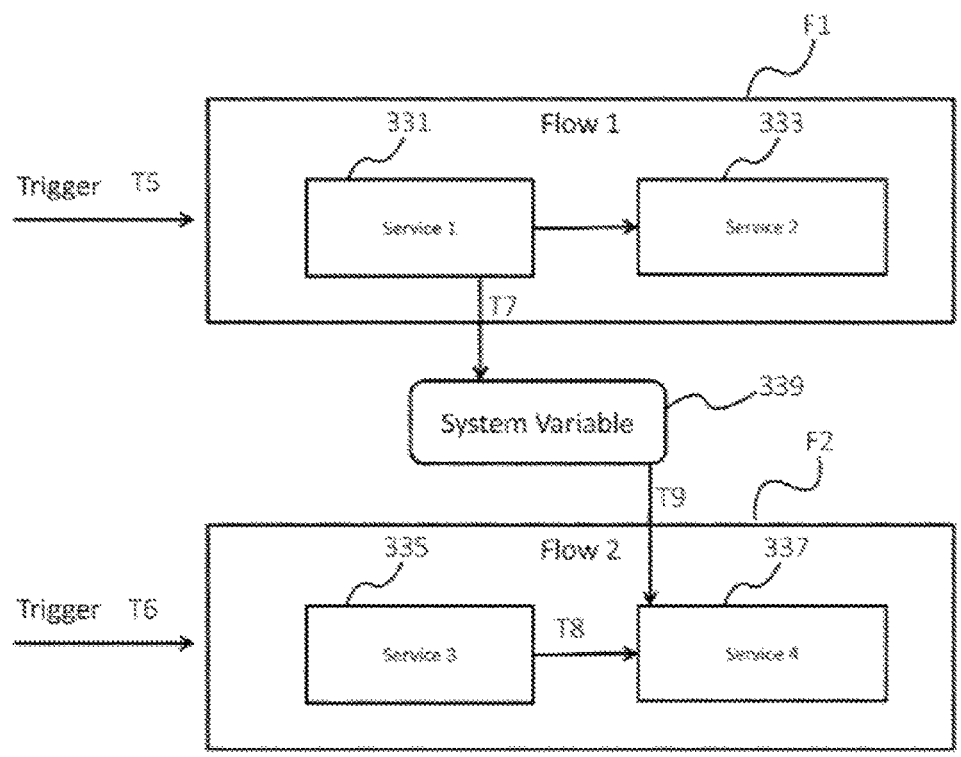
FIG. 15C is a schematic diagram depicting a plurality of flow controls according to another embodiment of the present disclosure.

FIG. 15C illustrates a schematic diagram depicting a plurality of flow controls according to another embodiment of the present disclosure. The IoT interaction system 10 includes a first control flow F1 and a second control flow F2. The first control flow F1 includes a first service 331 and a second service 333. The second control flow F2 includes a third service 335 and a fourth service 337. First service 331 receives a first trigger T5, and third service 335 receives a second trigger T6. First service 331 can generate a third trigger T7 and transmit the third trigger T7 to a system variable 339. System variable 339 can transmit a fourth trigger T9 to a fourth service 337. In doing so, a plurality of control flows can interact with one another.

As an example, suppose first flow F1 is related to a sensing temperature. Upon receipt of first trigger T5, first service 331 can generate a certain temperature value and transmit the data to the system variable 339 as third trigger T7 and system variable 339 stores third trigger T7 therein. In the example second flow F2 is related to recognize a person's identity and control the temperature of an air conditioner. Upon receipt of second trigger T6, third service 335 can produce a person's identity and provide the information to fourth service 337 as a fourth trigger T8. Fourth service 337 can also receive a fifth trigger T9 from system variable 339. Fourth service 337 can match the person's identity (the fourth trigger T8) with a predefined favorite temperature information for the person. Then, fourth service 337 can compare the matched favorite temperature information for the person with the current temperature (the fifth trigger T9) and control the temperature of the air conditioner.

Figure 15D:
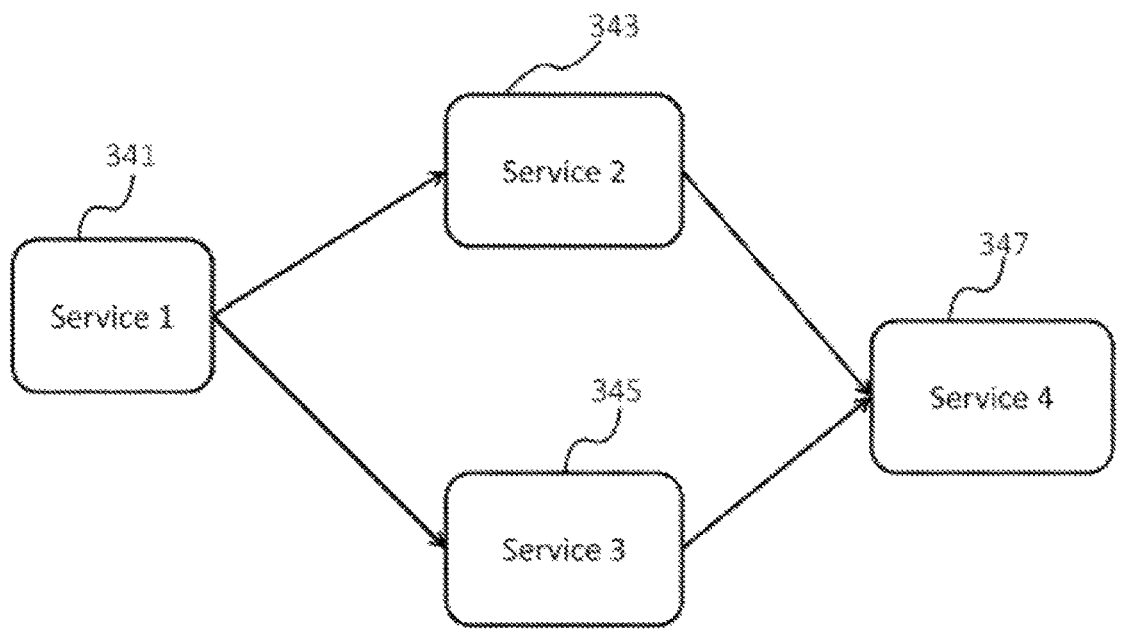
FIG. 15D is a schematic diagram depicting interactions and services handling a plurality of triggers according to another embodiment of the present disclosure.

FIG. 15D illustrates a schematic diagram depicting interactions and services handling a plurality of triggers according to another embodiment of the present disclosure. The IoT interaction system 10 includes a first service 341, a second service 343, a third service 345, and a fourth service 347. The second and third services 343 and 345 receive triggers from the first service 341, respectively. Both second and third services 343 and 345 transmit a trigger to fourth service 347. Fourth service 347 can merge, compare, compute, combine, or process the triggers from second service 343 and third service 345 in accordance with a predetermined condition. Fourth service 347 can, for instance, merge, compare, compute, combine, or process a plurality of incoming triggers, one single incoming trigger only, or each of incoming triggers separately.

Figure 15E:
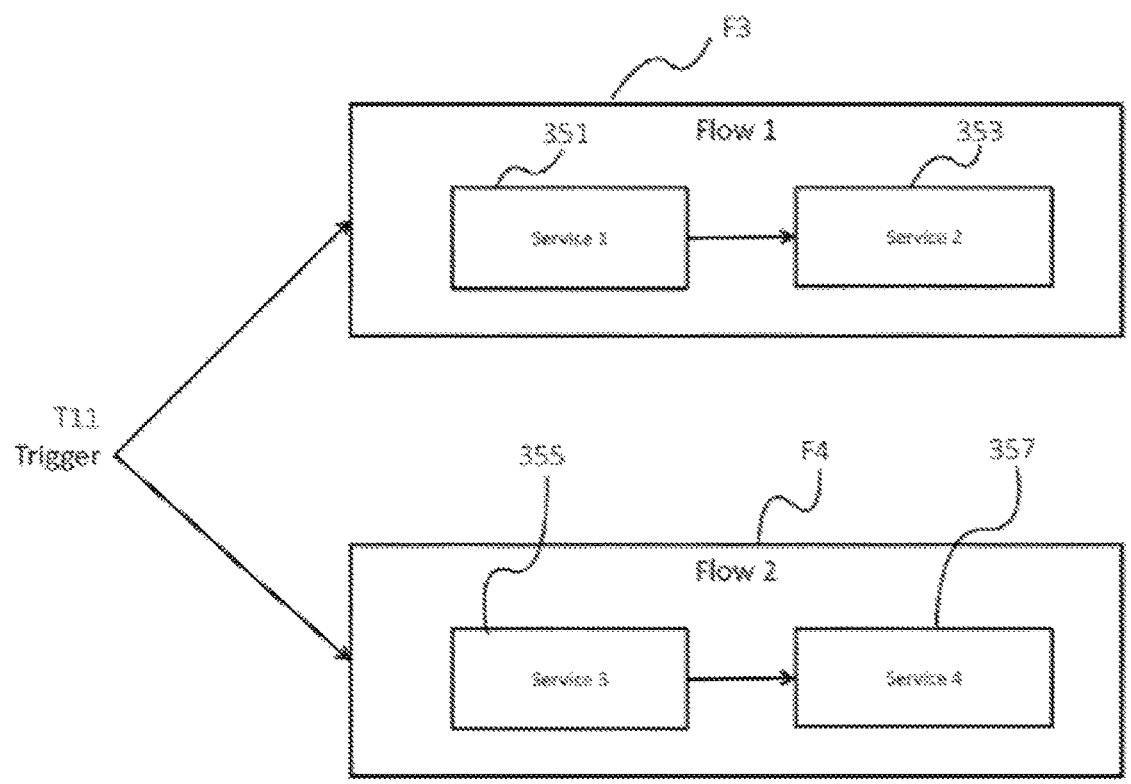
FIG. 15E is a schematic diagram depicting a plurality of control flows according to another embodiment of the present disclosure.

FIG. 15E illustrates a schematic diagram depicting a plurality of control flows according to another embodiment of the present disclosure. One single trigger T11 can be transmitted to a plurality of control flows. The IoT interaction system 10 includes a first control flow F3 and a second control flow F4. First control flow F3 includes a first service 351 and a second service 353. Second control flow F4 includes a third service 355 and a fourth service 357. First and third services 351 and 355 receive trigger T11. Upon receipt of trigger T11, each of first and third services 351 and 355 can generate a trigger to second service 353 and fourth service 357, respectively. Accordingly, one single trigger T11 is transmitted to first and second control flows F3 and F4. For the exemplary purpose, although it is described that the single trigger T11 is transmitted to only two (2) services, the number of servers is not limited thereto.

Figure 16:
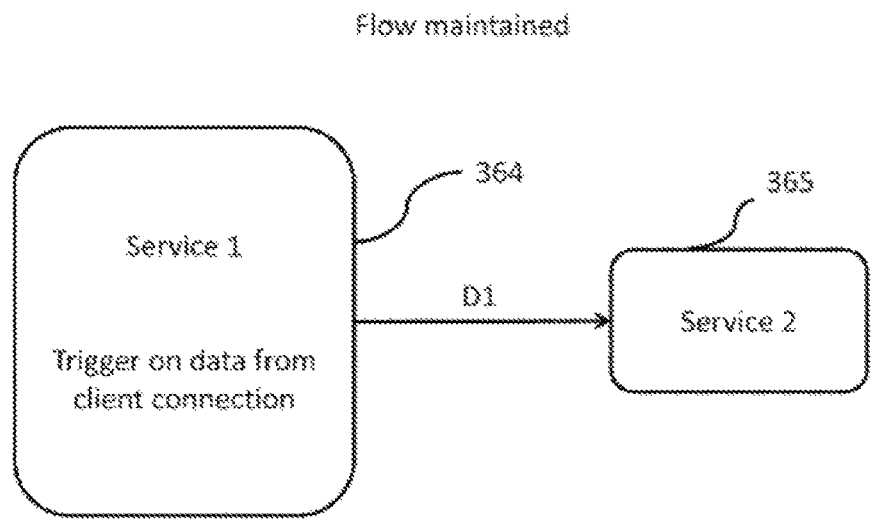
FIG. 16 is a schematic diagram depicting a control flow between two services.

FIG. 16 illustrates a schematic diagram depicting a control flow between two services, Service 1, labeled 364, and Service 2, labeled 365. Conventionally, the client component or services receives a trigger generated from a system service. According to another embodiment of the present disclosure, IoT interaction system 10 has the ability to consider data from a service as a trigger. For instance, IoT interaction system 10 includes a first service 364 and a second service 365. First service 364 transmits data D1 to second service 365. First service 364 is a client component in IoT interaction system 10, as opposed to a system service. The second service 365 considers the data D1 as a trigger. For instance, first service 364 occasionally transmits a certain type of data. If a user would like to have a service in order to receive the data from the first service 364, it might need to establish a new system service. However, IoT interaction system 10 solves these issues because both first and second services 364 and 365 can be registered in IoT interaction system 10, and have set an interaction therebetween.

Figure 17:
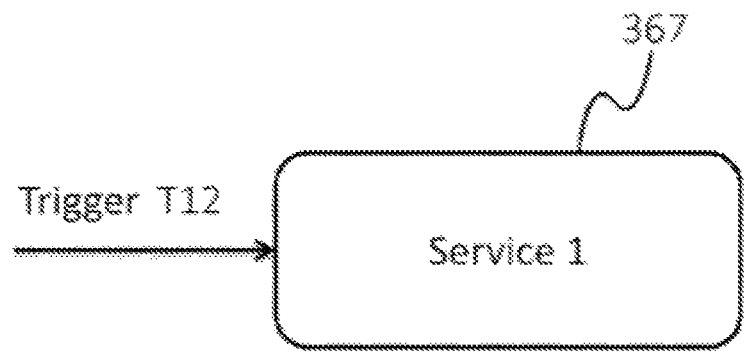
FIG. 17 is a schematic diagram depicting a control flow with a single service in response to a trigger.

FIG. 17 illustrates a schematic diagram depicting a control flow with a single service in response to a trigger T12. The IoT interaction system 10 includes a first service 367. First service 367 receives a trigger T12. Even if the first service 367 does not have an interaction with another service, a user can set a response to the receipt of trigger T12. For instance, if trigger T12 is a syslog type trigger, then it would not require a response. In the case that trigger T12 requires a response, IoT interaction system 10 can make first service 367 reply back to trigger T12 by using a parsing, mapping, or a transforming function, which are explained above with reference to Table 3/Table 4, Table 5, and Table 6, respectively. Thus, IoT interaction system 10 can provide a dynamic response as opposed to a static response by using such functions. Further, if first service 367 is coupled to another service (not shown), IoT interaction system 10 can use data from another service (not shown) for the response.

Figure 18:
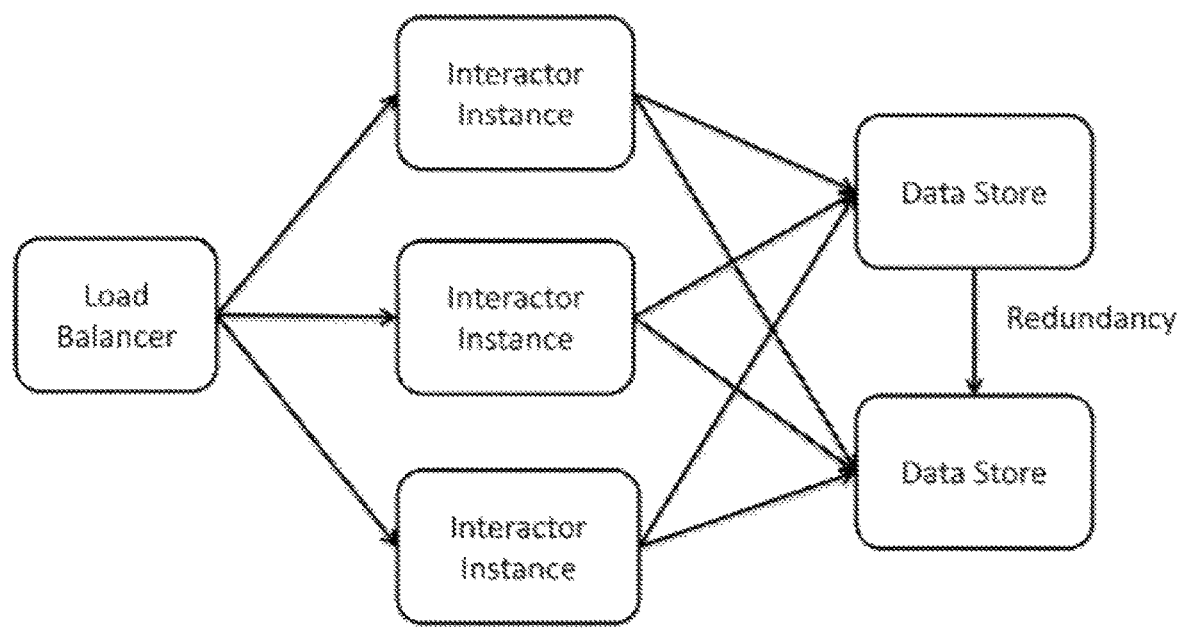
FIG. 18 is a schematic diagram depicting a plurality of IoT interaction systems on a cloud.

FIG. 18 illustrates a schematic diagram depicting a plurality of IoT interaction system 10 using a cloud. Referring to FIG. 16, a plurality of IoT interaction systems can be performed on a cloud along with a plurality of data stores and a load balancer.

Figure 19:
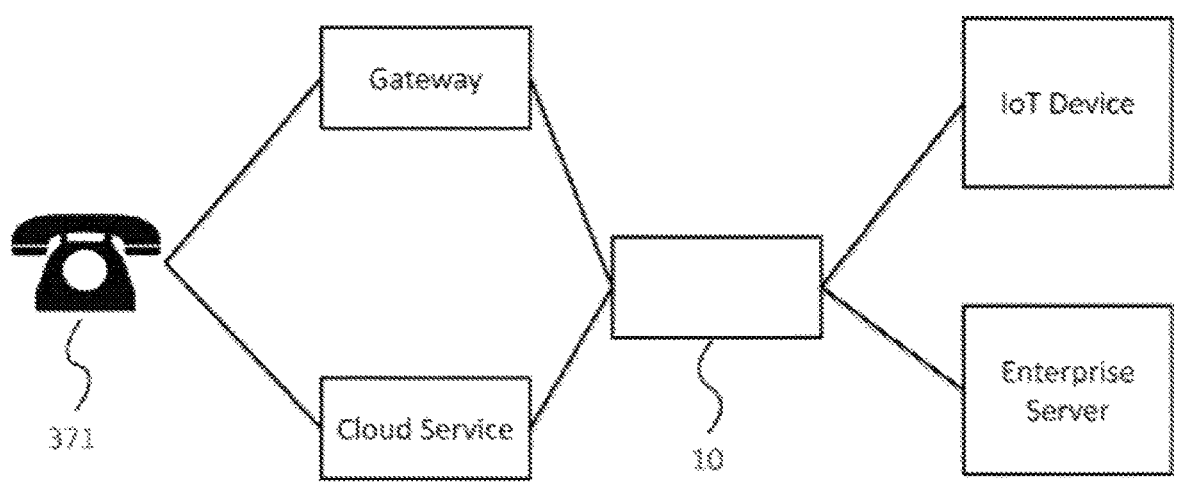
FIG. 19 is a schematic diagram depicting that the PSTN (public switched telephone network) interacts with the IoT interaction system.

FIG. 19 is a schematic diagram depicting a conventional PSTN (public switched telephone network) telephone 371 interacting with IoT interaction system 10. A user can communicate/interact with IoT interaction system 10 via a telephone using either a PSTN or a cloud service. Thus, the user can control IoT interaction system 10 via either a telephone or a cloud service. IoT interaction system 10 communicates with a PSTN gateway, a cloud service, a networked device, or an enterprise server. Although telephone 371 is depicted as a conventional wired home telephone, any similar communication device such as a cell phone, can be used.

In a conventional web server implementation, a plurality of clients can be connected with a plurality of cloud services via a webserver. Since the IoT interaction system 10 is connected with the plurality of clients and the plurality of cloud services, the IoT interaction system 10 can perform the webserver's function.

Figure 20A:
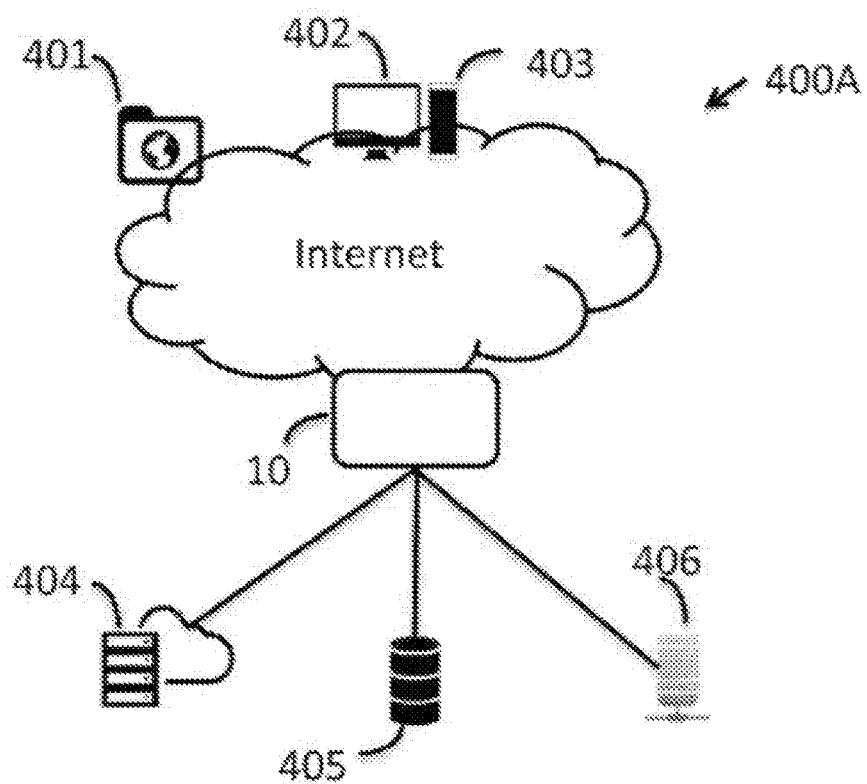
FIG. 20A illustrates a schematic architecture of an IoT solution including the IoT interaction system in accordance with another embodiment of the present disclosure.

FIG. 20A illustrates a schematic architecture of an IoT solution 400A which includes IoT interaction system 10 in accordance with another embodiment of the present disclosure. IoT solution 400A includes the IoT interaction system 10, client devices 401, 402, and 403, a cloud service 404, a data store 405, and an enterprise service 406. IoT interaction system 10 is configured with interaction logic to provide web services to client devices 401, 402, and 403 using the services in a cloud service 404, a data store 405, and an enterprise service 406. Client devices 401, 402, and 403 send requests to IoT interaction system 10, and IoT interaction system 10 executes a pre-stored interaction logic to interact with a cloud service 404, a data store 405, and an enterprise service 406. IoT interaction system10 responds back to client's request based on the pre-stored interaction logic therein. IoT interaction system 10 receives requests from the client devices 401, 402, and 403, and parses, maps, or transforms the received request. Based on the configuration, IoT interaction system 10 proceeds to interact with cloud service 404, data store 405, and enterprise service 406 with a request created and based on information received from client devices 401, 402, and 403. Cloud service 404, data store 405, and enterprise service 406 may be interacted with in parallel or in series. Connectivity and communication methods between IoT interaction system 10 and client devices 401, 402, and 403, as well as cloud service 404, data store 405, the enterprise service 406, can be pre-stored into IoT interaction system 10.

Figure 20B:
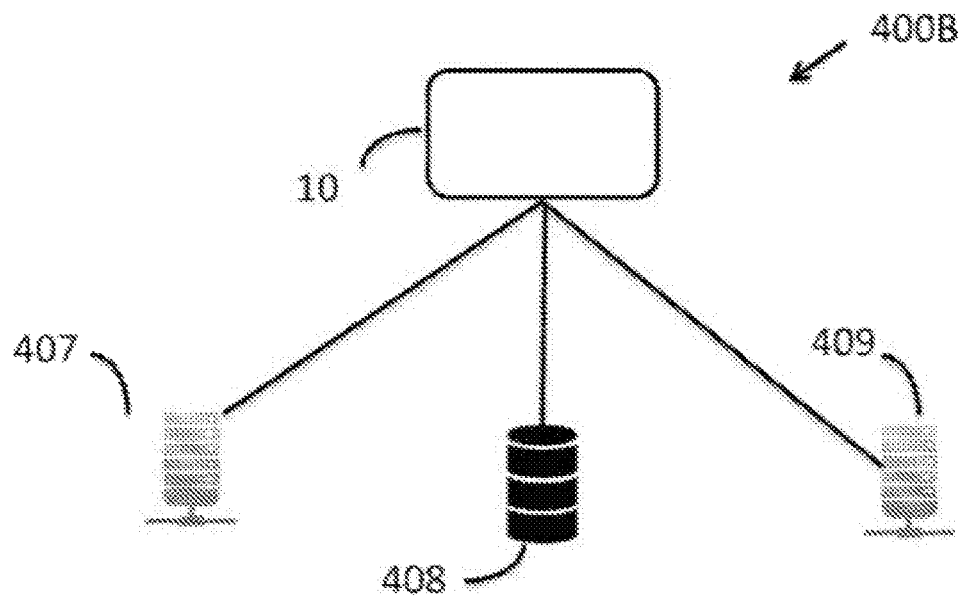
FIG. 20B illustrates a schematic architecture of an IoT solution including the IoT interaction system in accordance with another embodiment of the present disclosure.

FIG. 20B illustrates a schematic architecture of an IoT solution 400B that includes IoT interaction system 10 in accordance with another embodiment of the present disclosure. IoT solution 400B includes a first device 407 producing a syslog data, a second device 408 consuming the syslog data for further processing, and a third device 409 storing the syslog data. IoT interaction system 10 is configured to receive syslog data from first device 407, check a predetermined condition, and forward the syslog to second device 408, if predetermined condition or conditions are met. All received syslog data can be forwarded and stored in third device 409. A Syslog data or message can be transformed at IoT interaction system 10 before being forwarded to second device 408 or third device 409. The predetermined condition or conditions may be used to filter syslog messages toward second device 408. In doing so, the IoT interaction system 10 can reduce or adjust the volume of a syslog message from first device 407 to either second device 408 or third device 409. Further, the IoT interaction system 10 can transform the syslog message into a proper format as required for either second device 408 or third device 409. Although FIG. 19B illustrates one single first device 407, the number of the first device 407 is not limited thereto. For instance, the first device 407 can include a plurality of devices producing syslog data. In such case, IoT interaction system 10 can process, combine, compare, filter, and/or transform the syslog data received from the plurality of devices and transmit a result thereof to a predetermined destination.

Figure 20C:
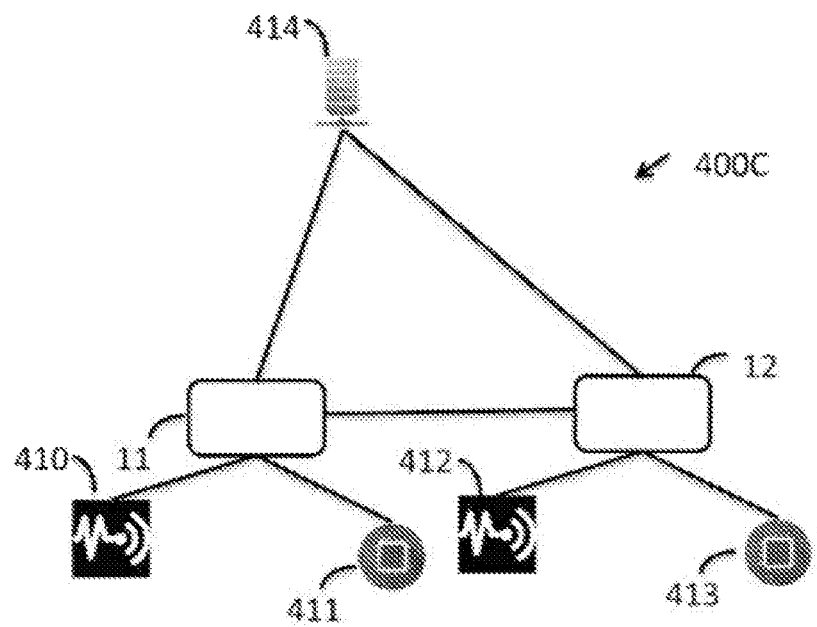
FIG. 20C illustrates a schematic architecture of an IoT solution having the IoT interaction system in accordance with another embodiment of the present disclosure.

FIG. 20C illustrates a schematic architecture of an IoT solution 400C having the IoT interaction system 10 in accordance with another embodiment of the present disclosure. The IoT solution 400C includes a first IoT interaction system 11, a second IoT interaction system12, a first sensor 410, a first device 411, a second sensor 412, a second device 413, and services on server 414. IoT solution 400C is an edge compute solution where interactions are configured on first and second IoT interaction systems 11 and 12. Sensor data are handled at the end of the network instead of being handled at server 414. In other words, first and second sensors 410 and 412 may produce a high volume of data and IoT interaction systems 11 and 12 can filter the data out. As a result, it reduces the volume of data that the server is handling. IoT interaction systems 11 and 12 can store a predetermined set of instructions so that upon receipt of data from first and second sensors 410 and 412, in which the data meets a predetermined condition. IoT interaction systems 11 and 12 can perform data parsing, data mapping, or data transforming and transforming the data to first and second devices 411 and 413, respectively without communicating with server 414. First and second IoT interaction systems 11 and 12 may be configured to interact with server 414, and/or first and second devices 411 and 413 in accordance with the sensor data received from either first sensor 410 or second sensor 412. Further, an interaction between IoT interaction system 11 and 12 can be pre-stored. The server 414 can manage and control a plurality of IoT interaction systems as well.

Figure 20D:
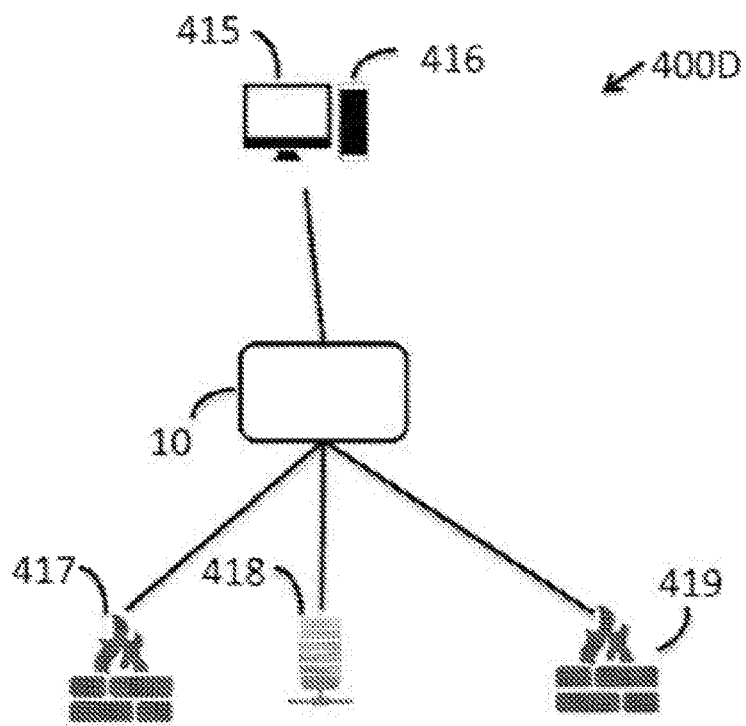
FIG. 20D illustrates a schematic architecture of an IoT solution including the IoT interaction system in accordance with another embodiment of the present disclosure.

FIG. 20D illustrates a schematic architecture of an IoT solution 400D including IoT interaction system 10 in accordance with another embodiment of the present disclosure. IoT solution 400D includes IoT interaction system 10, a first client device 415 and a second client device 416, services on server 418, a first firewall 417, and a second firewall 419. First firewall 417 is a different model from a different vendor using different interaction methods from second firewall 419. The IoT interaction system 10 is configured such that first and second client devices 415 and 416 interact with the first and second firewalls 417 and 419 as well as services on server 418. For example, interaction may be configured on IoT interaction system 10 so that first and second client devices 415 and 416 can send a single request, for example, to block a particular IP address. IoT interaction system 10 executes interaction with first and second firewalls 417 and 419, as well as services on server 418 using different interaction methods to perform the same act of blocking a specified IP address.

Figure 20E:
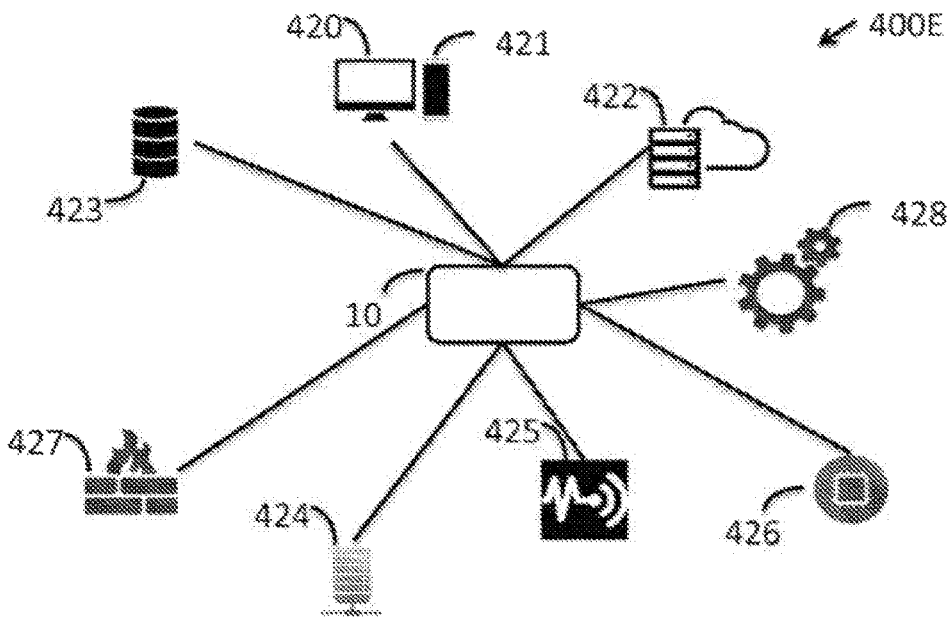
FIG. 20E illustrates a schematic architecture of an IoT solution including the IoT interaction system in accordance with another embodiment of the present disclosure.

FIG. 20E illustrates a schematic architecture of an IoT solution 400E including IoT interaction system 10 in accordance with another embodiment of the present disclosure. IoT solution 400E includes a plurality of entities, which include IoT interaction system 10, a first client device 420, a second client device 421, a cloud service 422, a data store 423, services on server 424, a sensor 425, a device 426, a firewall 427, and a machine 428. A conventional solution for handling a plurality of entities, a computer programmer would need to develop a computer application that provides interaction logics for the plurality of entities. However, according to the present embodiment, a user can adjust settings for each of the plurality of entities and its interaction at a user interface of IoT interaction system 10 without conventional coding efforts for such computer application. According to the present embodiment, any of the plurality of entities may interact with any of the other entities. Such interaction would be conditional, and data may be transformed to meet the predetermined format that each of the plurality of entities requires. Data from sensor 425 may trigger a flow of interactions where the sensor data is checked for a condition before starting a service on machine 428. The results from the service on machine 428 can be transformed, along with the sensor data, to be stored on data store 423. The Interaction will continue to interact with cloud service 422 before interacting with device 426.

Figure 21:
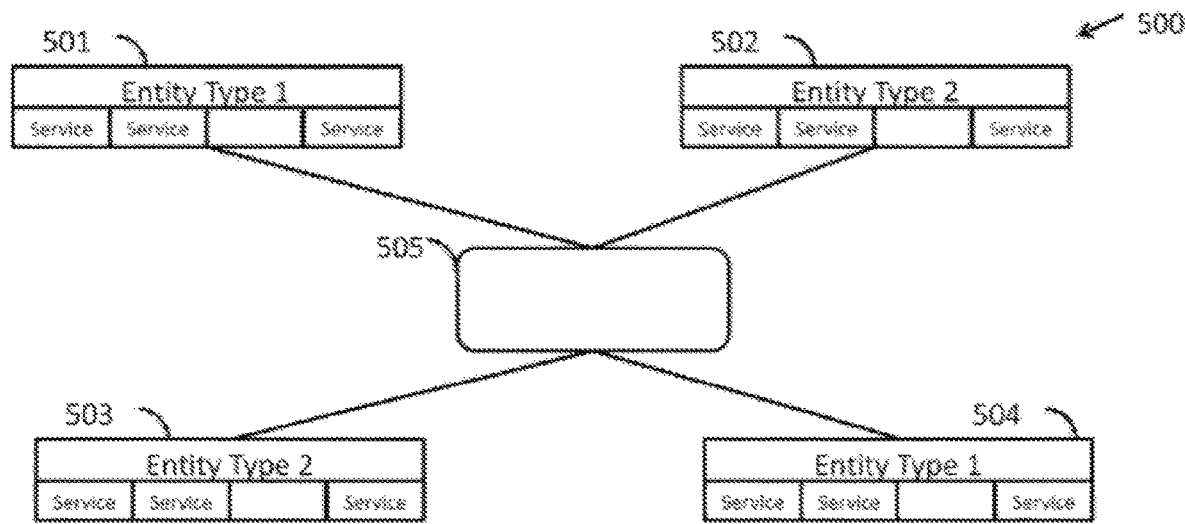
FIG. 21 illustrates a schematic architecture of an IoT solution in accordance with another embodiment of the present disclosure.

FIG. 21 is a schematic architecture of an IoT solution 500 in accordance with another embodiment of the present disclosure. IoT solution 500 includes a plurality of entities participating in the IoT solution 500. The plurality of entities includes a first entity 501, a second entity 502, a third entity 503, and a fourth entity 504. The plurality of entities are from different vendors. The first entity 501 and the fourth entity 504 are of same entity type 1, whereas the second entity 502 and the third entity 503 are of entity type 2. Any type of interaction logic can be configured into IoT interaction system 500. The Interaction logic would include, but not be limited to, entity definition, connectivity to entities, definition of services provided by entities, grouping of services by entity types, virtual entities and services, communication with the services, understanding data communicated with services, parsing for interested data, transforming data, handling arrays, mapping data, interacting between services, conditional interactions, conditional transformations, flow of interactions either in series or in parallel, merging of interactions, responding back with transformation, interaction between entities through multiple nodes of IoT interaction system 500, and triggers of various forms. Every interaction is deemed to be between some entities and sets of services they provide. Entities include virtual entities where IoT interaction system 500 itself is an entity. Entities and services are registered to IoT interaction system 500 either through discovery or some other on-boarding process. Registration would result in a set of information which includes, but is not limited to, the following entity type: entity identifier; services; connectivity; and relationship.

Figure 22:
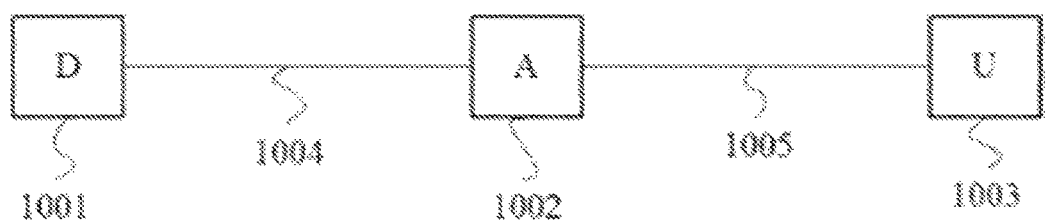
FIG. 22 is a schematic diagram illustrating a configuration in which a networked device is connected to a user via an application.

FIG. 22 is a schematic diagram illustrating a configuration in which a networked device 1001 is connected to a user 1003 via an IoT interaction system 1002. The terms "connection," "interaction," and "protocol" are interchangeably used herein. The user 1003 interacts with the networked device 1001 through IoT interaction system 1002 using an interface 1005. The intended interaction is between the networked device 1001 and the user 1003. There are two (2) integrations which are 1) a first communication between networked device 1001 and IoT interaction system 1002 using the connection 1004, and 2) a second communication between IoT interaction system 1002 and the user 1003 using interface 1005. The details of the interaction between networked device 1001 and the user 1003 are defined by IoT interaction system 1002.

When IoT interaction system 1002 does not have a direct connection to networked device 1001, a gateway (not shown) or hub (not shown) can be inserted between networked device 1001 and IoT interaction system 1002.

Figure 23:
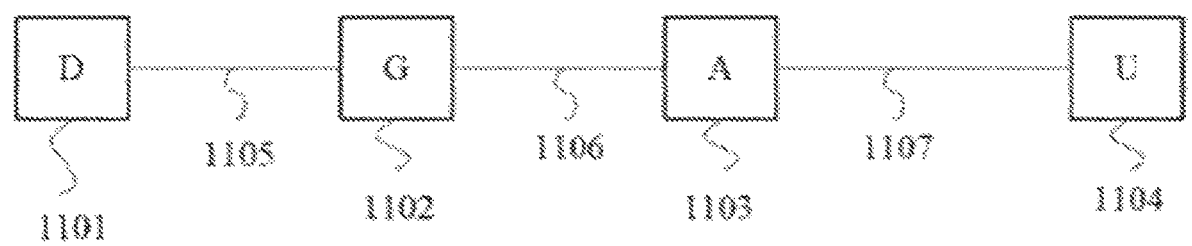
FIG. 23 is a schematic diagram illustrating a configuration in which a networked device is connected to a user via a gateway and an application.

FIG. 23 is a schematic diagram illustrating a configuration in which a networked device 1101 is connected to a user 1104 via a gateway 1102 and an IoT interaction system 1103. Networked device 1101 is connected to gateway 1102 using a connection 1105. Gateway 1102 is also connected to the IoT interaction system 1103 using a connection 1106 and is coupled to device 1101 and IoT interaction system 1103. The gateway 1102 may cache information from networked device 1101 and perform predetermined functions. IoT interaction system 1103 is connected to the user 1104 using an interface 1107. Intended interaction is a communication between networked device 1101 and the user 1104. There are four (4) integrations, which are: 1) between the networked device 1101 and gateway 1102 using the connection 1105; 2) between gateway 1102 and IoT interaction system 1103 using connection 1106, 3) between networked device 1101 and IoT interaction system 1103, and 4) between IoT interaction system 1103 and the user 1104 using the interface 1107. The interaction is defined by IoT interaction system 1103.

Figure 24:
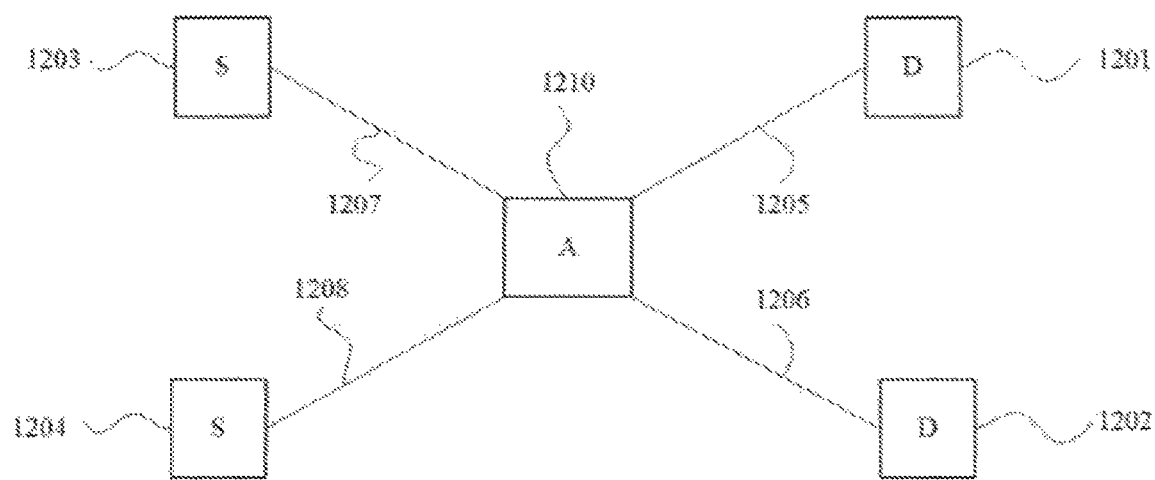
FIG. 24 is a schematic diagram illustrating a configuration in which networked devices and services are connected to an application.

In reality, IoT interaction systems do not interact with devices directly. IoT interaction systems interact with services running on the devices but some services provide device specific information. When there are multiple services connected to an IoT interaction system, the IoT interaction system needs to be able to integrate with them separately in order to enable interaction between devices/services FIG. 24 is a schematic diagram illustrating a configuration in which the networked devices 1201 and 1202, and the services 1203 and 1204 are connected to a IoT interaction system1210.

First networked device 1201 is connected to IoT interaction system 1210 using a first connection 1205. Second device 1202 is connected to IoT interaction system 1210 using a second connection 1206. IoT interaction system 1210 is also connected to first and a second services 1203 and 1204 using a third connection 1207 and a fourth connection 1208, respectively. As the number of networked devices and services, along with their variations, increases, the number of integrations required for IoT interaction system 1210 increases. The increase in the integration requirements would follow the number of variations. The same service from ten (10) different devices refers to ten (10) different integration activities. When there are a plurality of IoT interaction systems, each of the plurality of IoT interaction systems needs to integrate with the various device/services.

Figure 25:
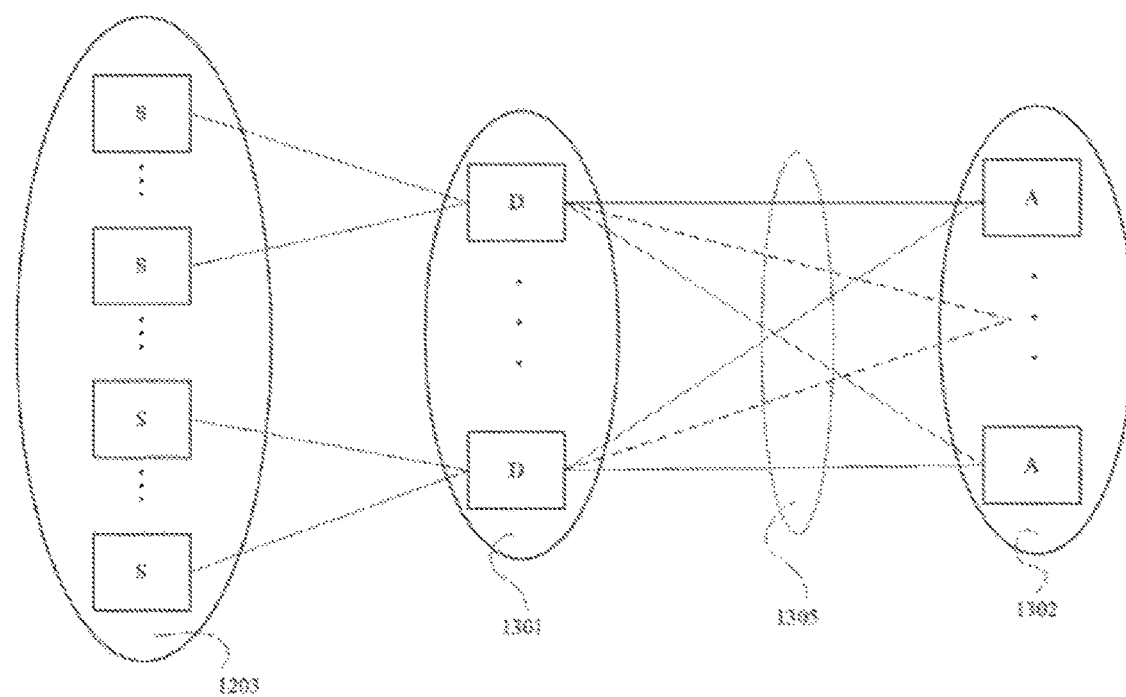
FIG. 25 is a schematic diagram illustrating a configuration in which a plurality of networked devices and a plurality of services are connected to a plurality of applications through a plurality of connections.

FIG. 25 is a schematic diagram illustrating a configuration in which a plurality of networked devices 1301 and a plurality of services 1303 are connected to a plurality of IoT interaction systems 1302 through a plurality of connections 1305. Parts of the plurality of services 1303 are running on a part of the plurality of networked devices 1301. For X number of IoT interaction systems 1302 to interact with Y number of the plurality of services 1303, there will need to be X*Y integrations performed.

To reduce the number of integrations required, some platforms exist where IoT interaction system programmable interfaces (API) are provided for the devices/services and the IoT interaction systems in order to interact with one another. These platforms are generally cloud based and offer connectivity aggregation towards devices.

Figure 26:
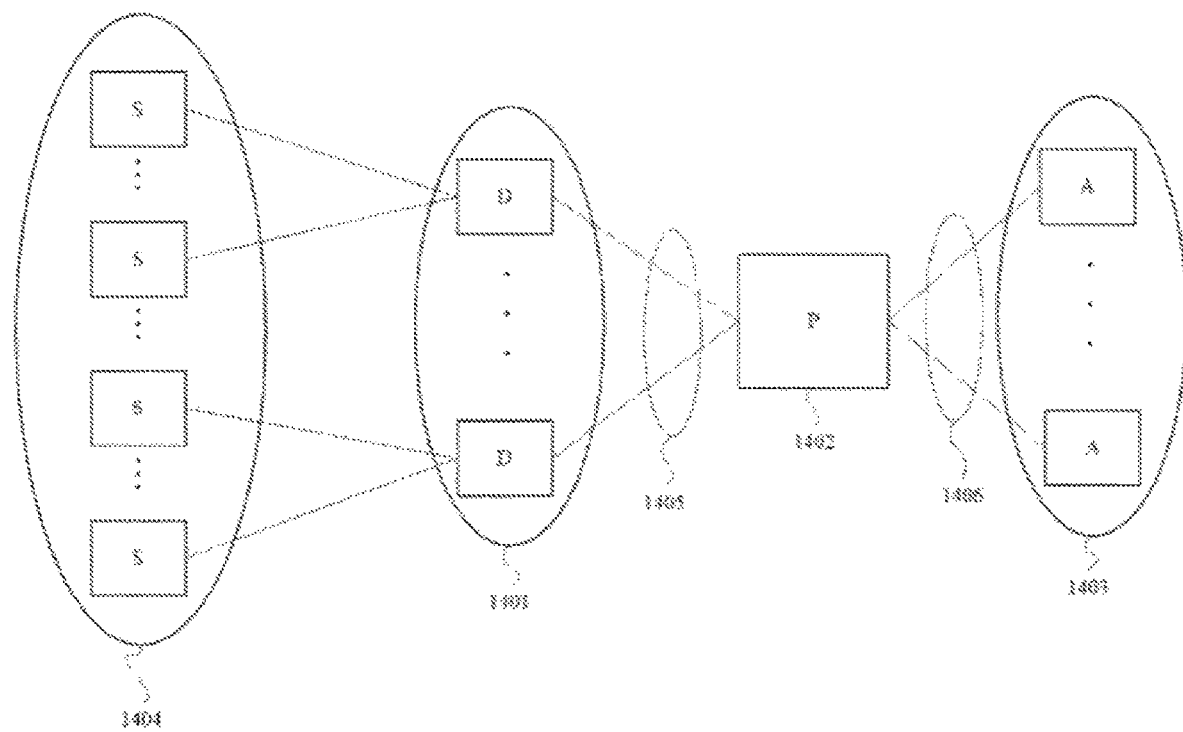
FIG. 26 is a schematic diagram illustrating a configuration in which a plurality of networked devices and a plurality of services are connected to a platform, which is connected to a plurality of applications through a plurality of connections.

FIG. 26 is a schematic diagram illustrating a configuration in which a plurality of networked devices 1401 and a plurality of services 1404 are connected to a platform 1402 through networked devices 1401. Platform 1402 is connected to a plurality of IoT interaction systems 1403 through a plurality of connections 1406. The plurality of IoT interaction systems 1403 are connected to the plurality of networked devices 1401 through the platform 1402 using a plurality of connections 1406 provided as a set of APIs. The plurality of IoT interaction systems 1403 still need to integrate with services 1404. Any change in services or the IoT interaction systems will result in a large number of modifications.

When a plurality of networked devices are connected to different pluralities of IoT interaction systems or platforms, each interaction thereof requires custom development, which results in a higher cost of implementation and maintenance, along with inefficiency. When a particular networked device needs to be scoped to different IoT interaction systems that do not have any predetermined configurations for the particular networked device, it could be a problem to obtain a desired result.

If there are multiple variations of the devices, services, platforms, along with different IoT interaction systems to interact with, the IoT interaction applications as shown in FIGS. 22-26 require a prohibitive number of integrations. This results in a higher cost of implementation and maintenance, and a limited separation of interaction and IoT interaction system logic.

Figure 27:
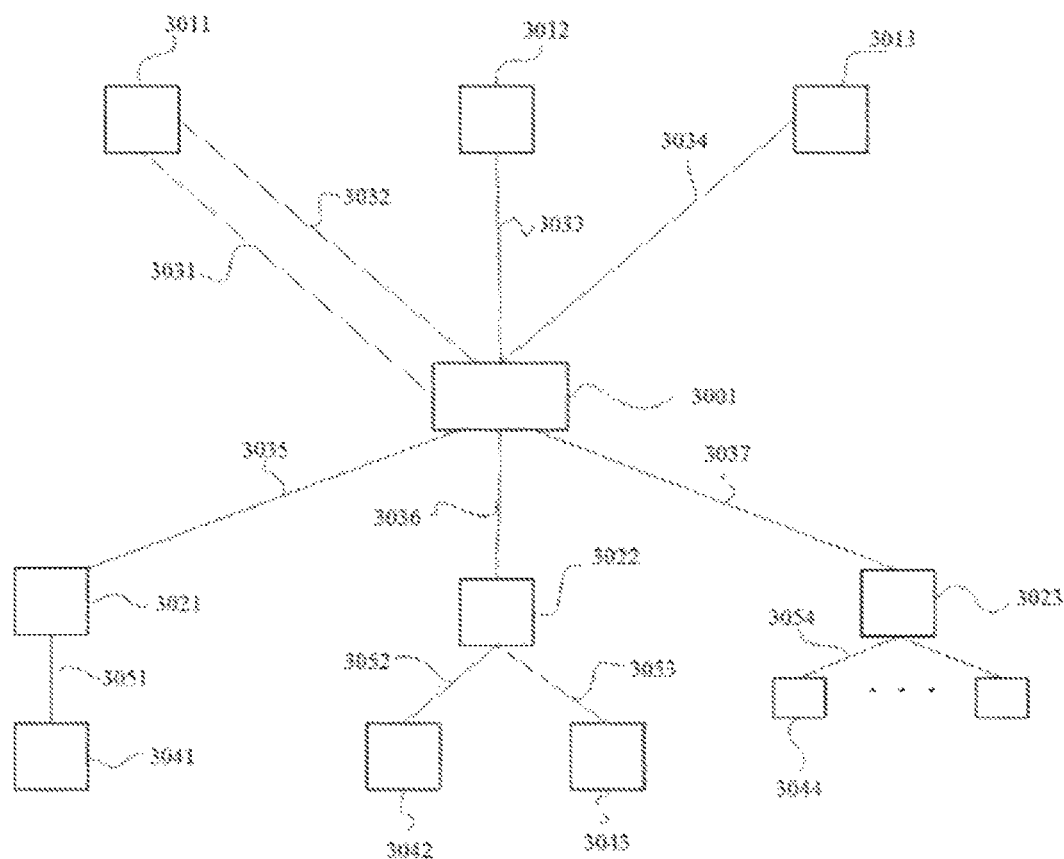
FIG. 27 is a schematic diagram illustrating a configuration in which a plurality of networked devices are either directly or indirectly connected to an IoT interaction system according to another embodiment of the present disclosure.

FIG. 27 is a schematic diagram illustrating a configuration in which a plurality of networked devices are either directly or indirectly connected to an IoT interaction system 3001 according to another embodiment of the present disclosure.

IoT interaction system 3001 may be a stand-alone device or one of networked entities, such as a mobile device, computing device, a cloud server, a software, a router, or a virtual machine. The IoT interaction system 3001 may be a physical device that is capable of managing or integrating the networked devices. According to the present disclosure the software IoT interaction system that runs on a physical device or in a cloud can perform the same or a similar function of IoT interaction system 3001. IoT interaction system 3001 may include a plurality of electronic components including a memory, a processor, and an I/O interface. The components can have a wired and/or a wireless communication interface as described above. IoT interaction system 3001 may be specially constructed for the required purposes, or it may include a general-purpose computer selectively activated or reconfigured by a computer program stored in the computer. Such a software IoT interaction system 3001 may be stored in a non-transitory computer readable storage medium, including but not limited to, any type of disk including floppy disks, optical disks, CD-ROMs, and magnetic disks, read-only memories (ROMs), random access memories (RAMs) EPROMs, EEPROMs, magnetic or optical cards, flash memories including USB keys with nonvolatile memory or any type of media suitable for storing electronic instructions. The storing media are coupled to a computer system bus (not shown).

A first networked device 3011, a second networked device 3012, and a third networked device 3013 are directly connected to IoT interaction system 3001 via a network. Each of first networked device 3011, second networked device 3012, and third networked device 3031 can have the same or a different type of connections, either wired or wireless.

First networked device 3011 is connected to the IoT interaction system 3001 using a first connection 3031 and a second connection 3032. First connection 3031 and second connection 3032 can be different. First connection 3031 and second connection 3032 can be, for example, two of the following: Bluetooth®, Wi-Fi, Wi-Fi direct, Long-Term Evolution (LTE) Direct, NFC (Near Field Communication), radio frequency (RF), RFID, Infrared (IR) or any other suitable communication.

Second networked device 3012 and third networked device 3013 are connected to IoT interaction system 3001 using a third connection 3033 and a fourth connection 3034. Third connection 3031 and fourth connection 3032 can be the same or a different type of connection, and can be one of the connection types mentioned above with respect to connections 3031 and 3032.

A fourth networked device 3021, a fifth networked device 3022, and a sixth networked device 3023 have a first level connection to IoT interaction system 3001 using a fifth connection 3035, a sixth connection 3036, and a seventh connection 3037, respectively. Herein, "the first level connection" refers to a direct connection to IoT interaction system 3001 via a network. Fifth connection 3035, sixth connection 3036, and seventh connection 3037 can be the same or different type of connections, and can be one of the connection types mentioned above with respect to connections 3031 and 3032.

Fourth networked device 3021, fifth networked device 3022, and sixth networked device 3023 have the ability to have a different number of networked devices interacting with them individually, and can have second level connections via a network.

Herein, the term "second level" refers to an indirect connection to the IoT interaction system 3001 via a networked device having the first level connection to the IoT interaction system 3001. For instance, a seventh networked device 3041 is indirectly connected to IoT interaction system 3001 via fourth networked device 3021 using eighth connection 3051. Thus, seventh networked device 3041 has the second level connection to the IoT interaction system 3001. Similarly, an eighth, ninth, and tenth networked devices 3042, 3043, and 3044, etc., respectively, are indirectly connected to IoT interaction system 3001 via networked devices 3022 and 3023, respectively, using connections 3052, 3053, 3054 etc., respectively.

In a similar manner, a third level connection, or higher level connection, can be defined. For example, when an additional networked device (not shown) is connected to IoT interaction system 3001 via a networked device having a second level connection, the additional networked device (not shown) has a third level connection.

FIG. 27, for the purpose of simplicity, illustrates only the specifics of the first and the second level connections. It would be apparent, however, to one skilled in the art, that the higher level connections to the IoT interaction system 3001 can be practiced without explicitly depicting these specific details.

Fourth networked device 3021 is connected with one (1) second level device, seventh networked device 3041 to IoT interaction system 3001. Fifth networked device 3022 has two (2) second level devices: eighth networked device 3042 and ninth networked device 3043 using ninth connection 3052 and tenth connection 3053, respectively. Ninth connection 3052 and tenth connection 3053 can have the same or a different type of connection. Sixth networked device 3023 has a plurality of second level devices, depicted as a tenth networked device 3044.

TABLE 7

| Networked Device/Entity | Connection | Entity type | Scope | Unique ID | Local ID | Integration permission | Device Permission | Interaction |
|---|---|---|---|---|---|---|---|---|
| 3001 | | | | | | 3701 | 3801 | 3501: (Source: A, target: B) |
| 3011 | 3031 3032 | 3601 | A3901 | 1 | a1 | | | |
| 3012 | 3033 | 3602 | 3901 | 2 | a2 | | | |
| 3013 | 3034 | 3607 | 3901 | 3 | a3 | | | |
| 3021 | 3035 | 3605 | 3901 | 4 | a4 | | | |
| 3022 | 3036 | 3604 | 3901 | 5 | a5 | | | |
| 3023 | 3037 | 3606 | 3901 | 6 | a6 | | | |
| 3041 | 3051 | 3603 | B 3902 | 7 | b1 | | | |
| 3042 | 3052 | 3603 | 3902 | 8 | b2 | | | |
| 3043 | 3053 | 3604 | 3902 | 9 | b3 | | | |
| 3044 | 3054 | 3607 | 3902 | 10 | b4 | | | |

IoT interaction system 3001 has a processor and a memory which check an integration permission 3701 at the IoT interaction system 3001 and determines whether certain integrations are permitted. The Integrations include protocol integrations such as Bluetooth®, and IP, as well as platform service integrations. IoT interaction system 3001 discovers integrations based on the connections 3031, 3032, 3033, 3035, and 3036. The connections 3031, 3032, 3033, 3035, and 3036 are all registered for integration.

The IoT interaction system 3001 goes through the discovered integrations and discovers the networked devices 3011, 3012, 3021, and 3022 in order to interact with them. The discovery of networked devices is performed either by 1) automatically using predefined discovery methods per integration, or by 2) manually using configuration. IoT interaction system 3001 assigns a unique ID to each of the networked devices.

When doing its discovery, IoT interaction system 3001 registers discovered networked devices 3011, 3012, 3021, and 3022. For illustrative purposes only, an example will be briefly described in order to showcase how first networked device 3011 is registered by IoT interaction system 3001.

As shown in Table 7 above, IoT interaction system 3001 registers two connections to first networked device 3011 through connections 3031 and 3032. IoT interaction system 3001 uses both of connections 3031 and 3032 to interact with first networked device 3011 by using a selected method, which can include but is not limited to: 1) dynamic priority; 2) metric; and 3) round robin.

First networked device 3011 is a first entity type 3601. IoT interaction system 3001 recognizes first entity type 3601, which has a predetermined service and memory (not shown) of IoT interaction system 3001, which has detailed information about first entity type 3601.

First networked device 3011 has a Service A. Any services associated with first networked device 3011 can be validated and pre-registered with an interface (not shown) of IoT interaction system 3001, either automatically or manually.

First scope 3901 is enabled for the networked devices, which are directly connected to IoT interaction system 3001 via a network. Second scope 3902 is enabled for the networked devices, which are indirectly connected to IoT interaction system 3001 via a network. Here, for exemplary purpose only, first scope 3901 and second scope 3902 are defined depending on whether they are directly or indirectly connected to the IoT interaction system 3001. However, first scope 3901 and second scope 3902 can be defined as the user desires, regardless of the levels.

First networked device 3011 is directly connected to the IoT interaction system 3001. Thus, IoT interaction system 3001 recognizes that first networked device 3011 falls in a first scope 3901. IoT interaction system 3001 assigns a unique ID "1" to the first discovered, first networked device 3011. The unique ID is assigned to any networked devices in the first scope 3901. IoT interaction system 3001 also assigns a locally scoped unique identification (local ID) "a1" to first networked device 3011. The local ID is distinguished from the unique ID because the local ID is assigned according to the scope that the particular networked device falls in.

IoT interaction system 3001 can check a device permission 3801 of first networked device 3011. The device permission 3801 allows IoT interaction system 3001 to see all device types and all devices connected to the first networked device 3011. If the device permission 3801 is not assigned to first networked device 3011, IoT interaction system 3001 does not have access to check any device or device types connected thereto.

IoT interaction system 3001 finds that first networked device 3011 provides a service A to interact with other networked devices. Integration permission 3701 indicates that the first networked device is permitted for all integrations. Thus, service A is provided by first networked device 3011 and can be integrated with the other services.

Second networked device 3012 is of a second entity type 3602. Regarding a situation in which the IoT interaction system 3001 does not recognize the second entity type 3602, there are no services registered under the unique ID "5" of the second networked device 3012. New configuration can be added to define the second entity type 3602, and service can be defined for the second entity type 3602.

In a similar manner, for example, third and fourth networked devices 3021 and 3022 can be registered and be assigned 1) unique ID and 2) a local ID by IoT interaction system 3001. Details of third and fourth networked devices 3021 and 3022 can be registered along with the unique ID and stored in the memory (not shown) of the IoT interaction system 3001.

IoT interaction system 3001 uses services provided by fourth networked device 3021 to discover the seventh networked device 3041. Device permission 3801 indicates that all the networked devices are permitted to register. Seventh networked device 3041 is not directly integrated into the IoT interaction system 3001 and falls within a second scope 3902. Seventh networked device 3041 is registered, for instance, with a local ID "b1" and a unique ID "7." Third entity type 3603 is a recognized entity type through configuration. Predefined services for third entity type 3603 are validated and registered in association with the local ID "b1" and the unique ID "7."

In a similar manner, fifth networked device 3022 can be registered within IoT interaction system 3001. Fifth networked device 3022 has a unique ID "5" and a local ID "a5." IoT interaction system 3001 finds that fifth networked device 3022 provides services to interact with other networked devices. Integration permission 3701 at IoT interaction system 3001 indicates that all integration is permitted. Thus, services provided by fifth networked device 3022 can be integrated with other services. IoT interaction system 3001 can detect that eighth networked device 3042 and ninth networked device 3043 are connected to fifth networked device 3022. The device permission 3801 indicates that all the networked devices are permitted to register. Eighth networked device 3042 and ninth networked device 3043 are not directly integrated to IoT interaction system 3001. The eighth networked device 3042 and the ninth networked device 3043 can be registered within the IoT interaction system 3001 by assigning local IDs and/or unique IDs to each of them. In the case where the third entity type 3603 and a fourth entity type 3604 correspond to the eighth networked device 3042 and the ninth networked device 3043, respectively, they are recognized entity types at the IoT interaction system 3001. Pre-defined services for third entity type 3603 and fourth entity type 3604 are validated and registered under respective local IDs and/or unique IDs.

Third entity 3013 can be added to IoT interaction system 3001 at a later time. Third entity 3013 is of a seventh entity type 3607, which provides a specific set of services that does not include enabling the interaction with other entities. Seventh entity type 3607 is a predefined type. Thus, a unique ID "3" is assigned to third entity 3013 and the entity details and services thereof are registered in association with third entity 3013.

Sixth networked device 3023 is of a sixth entity type 3606, which is a predefined entity type and provides a predefined set of services. Services defined by the sixth entity type 3606, include services that enable interaction with the tenth networked devices 3044 that are connected to sixth networked device 3023.

Tenth networked device 3044 can be added to the sixth networked device 3023 using connections 3054. When, fourth entity type 3604 supports tenth networked device 3044, it is predefined. A local ID "b4" is assigned to tenth networked device 3023, and services are registered in association with the local ID "b4."

Interaction 3501 is configured within IoT interaction system 3001. Interaction 3501 defines the interactions between Service A, of the first networked entity 3011, and service B, of the seventh networked entity 3041. Service A of first networked entity 3011 triggers service B of seventh networked entity 3041. Here, Service A acts as a source and service B acts as a target FIG. 28 is a schematic diagram illustrating the virtual interactions through a configuration where a plurality of networked devices are directly connected to an IoT interaction system 4001 via a network according to one embodiment of the present disclosure.

Figure 28:
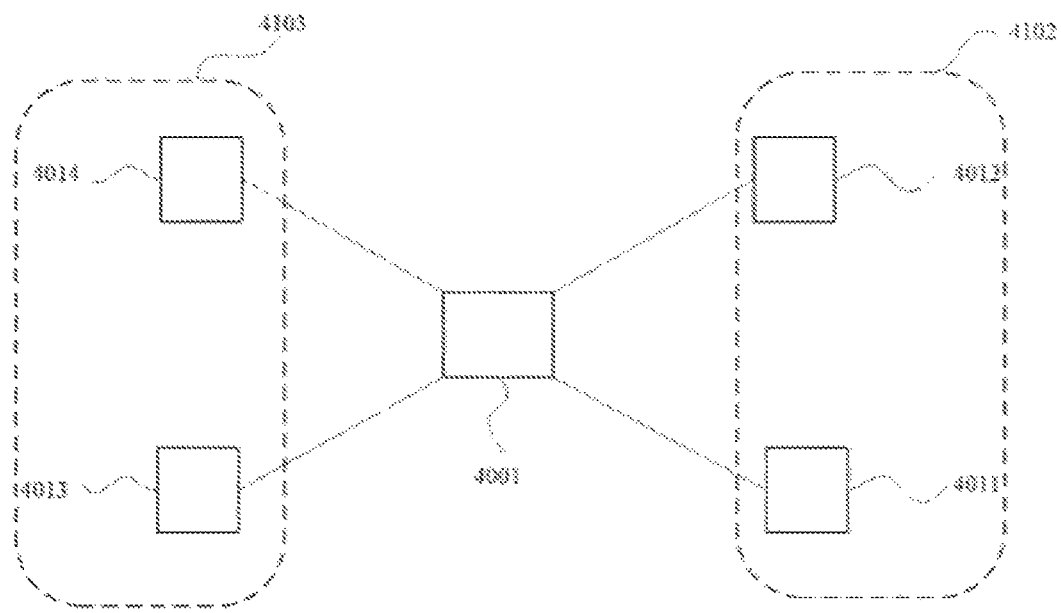
FIG. 28 is a schematic diagram illustrating virtual interactions through a configuration where a plurality of networked devices are directly connected to an IoT interaction system via a network according to one embodiment of the present disclosure.

As depicted in FIG. 28, IoT interaction system 4001 is connected to a plurality of networked devices 4011, 4012, 4013, and 4014. Table 8 below explains the detailed configurations of an IoT interaction system 4001, a first networked device 4011, a second networked device 4012, a third networked device 4013, a fourth networked device 4014, a first virtual networked device 4102, and a second virtual networked device 4103.

TABLE 8

| Networked Device/Entity | Entity Type | | Service | | Local ID | Interaction |
|---|---|---|---|---|---|---|
| 4001 | | | | | | 4301(Source: service 4216, Target: service 4215 |
| 4011 | light | 4021 | Light from vendor A | 4211 | turn light on | 1a |
| 4012 | light | 4022 | Light from vendor B | 4212 | turn light on | 1b |
| 4013 | Motion | 4023 | Motion sensor from vendor A | 4213 | detected | 1e |
| 4014 | Motion | 4024 | motion sensor from vendor B | 4214 | detected | 1d |
| 4102 | light | 4302 | | 4215 | turn light on | 1e |
| 4103 | motion | 4303 | | 4216 | detected | 1f |

First networked device 4011, second networked device 4012, third networked device 4013, and fourth networked device 4014 are all connected to IoT interaction system 4001 via a network.

First networked device 4011 and second networked device 4012 are networked device 4012 are provided by different vendors. Third networked device 4013 and fourth networked device 4014 are both connected to motion sensors (not shown). Third networked device 4013 and fourth networked device 4014 are provided by different vendors. The plurality of networked devices 4011, 4012, 4013, and 4014 can be registered within the IoT interaction system 4001 in a similar manner as described above with respect to FIG. 26, and are already prepared for interaction with one another. As shown in Table 8, the plurality of the networked devices 4011, 4012, 4013, and 4014 have entity types 4021, 4022, 4023, and 4024, respectively. The plurality of networked devices 4011, 4012, 4013, and 4014 have services 4211, 4212, 4213, and 4214, respectively.

With continued reference to FIG. 28 and Table 8, first virtual entity 4102 is generated by a configuration and has an entity type 4302 and service 4215. Service 4215 is defined for the purpose entity type 4302, where service 4211 is used for the first entity type 4021, and service 4212 is used for the second entity type 4022. The first virtual entity 4102 is added through configuration with the first networked device 4011 and the second networked device 4012. The first virtual entity 4102 lists the first networked device 4011 and the second networked device 4012 as members therefrom. For instance, one (1) local ID, e.g. "1e" can be assigned to the first virtual entity 4102. Unique IDs have not been described herewith. There is no added scope defined.

Second virtual entity 4103 is generated by a configuration and has an entity type 4303 and service 4216. Service 4216 is defined for the entity type 4303, where service 4213 is used for third entity type 4023, and service 4214 is used for fourth entity type 4024. Second virtual entity 4103 is added through configuration with third networked device 4013 and fourth networked device 4014. Second virtual entity 4103 lists third networked device 4013 and fourth networked device 4014 as members therefrom. For instance, one (1) local ID, e.g. "1f" can be assigned to second virtual entity 4103.

Interaction 4301 is configured on IoT interaction system 4001. Service 4216 of second virtual entity 4103 can interact with service 4215 of first virtual entity 4102. Service 4216 of second virtual entity 4103 can act as a source. Service 4215 of the first virtual entity 4102 can act as a target.

Figure 29:
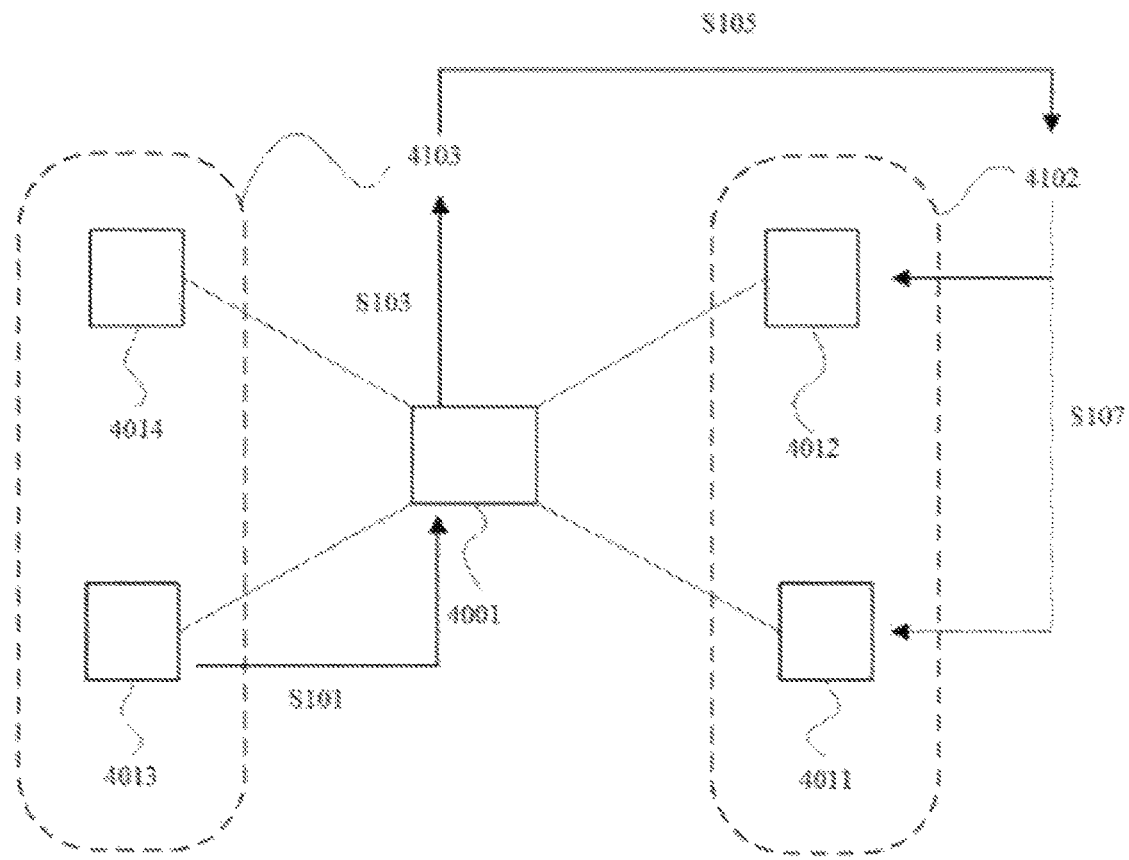
FIG. 29 is a schematic diagram illustrating virtual interactions with arrows where a plurality of networked devices are connected to an IoT interaction system via a network according to one embodiment of the present disclosure.

FIG. 29 is a schematic diagram illustrating virtual interactions with arrows where a plurality of networked devices are connected to IoT interaction system 4001 via a network according to one embodiment of the present disclosure. The interactions are shown in Table 8.

IoT interaction system 4001 recognizes that service 4213 of third networked entity 4013 produces an output indicating that, for example, there was movement detected (S101). IoT interaction system 4001 recognizes that service 4213 of third networked entity 4013 is associated with service 4216 of the second virtual entity 4103. The IoT interaction system 4001 recognizes that service 4216 of third networked entity 4103 is associated with interaction 4301 (S103). IoT interaction system 4001 uses service 4216 of second virtual entity 4103 to create an output. Thus, it initiates service 4215 of first virtual entity 4102 (S105). Service 4215 of virtual entity 4102 initiates service 4211 of first networked entity 4011 and services 4212 of second networked entity 4012 (S107), as configured.

Thus, when one of the motion sensors (the third networked device 4013 and the fourth networked device 4014) detects motion, two lights (the first networked device 4011 and the second networked device 4012) are turned on through virtual interactions between the first virtual entity 4102 and the second virtual entity 4103.

Additional networked devices (not shown) that are manufactured from different vendors can be added to the virtual entity as a member. Once an interaction between the virtual entities is defined at the IoT interaction system 4001, the additional networked device (not shown) can function as a source or a target through the virtual interactions.

Figure 30:
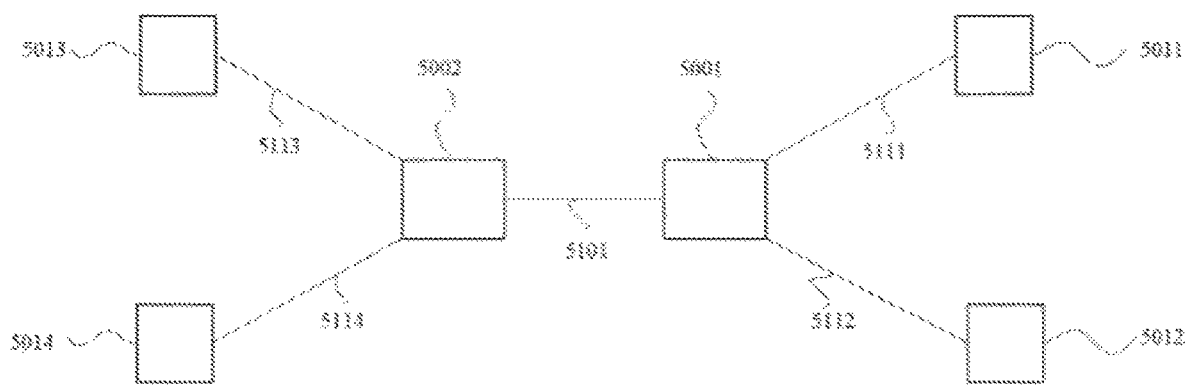
FIG. 30 is a schematic diagram illustrating multi-node interactions through a configuration where each of a plurality of IoT interaction systems is connected to a plurality of entities.

FIG. 30 is a schematic diagram illustrating multi-node interactions through a configuration where each of a plurality of IoT interaction systems is connected to a plurality of entities.

TABLE 9

| Networked Device/Entity | Connection | Entity Type | Scope | | Unique ID by 5001 | Unique ID by 5002 | Service | Interaction |
|---|---|---|---|---|---|---|---|---|
| 5001 | | | | | | | | |
| 5011 | 5111 | | 5201 | 5204 | b1 | b3 | 5302 5304 | |
| 5012 | 5112 | | 5202 | | a1 | | | |
| 5002 | | | | | | | | 5401 Source: 5301, Target 5302 on Scope 5201) 5402 (Source: 5304, Target 5303 on Scope 5201) |
| 5013 | 5113 | | 5202 | 5203 | a2 | a3 | | |
| 5014 | 5114 | | 5201 | | | b2 | 5301 5303 | |

With reference to FIG. 30 and above Table 9, a first networked entity 5011 and a second networked entity 5012 are connected to a first IoT interaction system 5001. A third networked entity 5013 and a fourth networked entity 5014 are connected to a second IoT interaction system 5002. First IoT interaction system 5001 and second IoT interaction system 5002 are connected to one another using connection 5101. First networked entity 5011 and second networked entity 5012 can be registered to the first IoT interaction system 5001, and local IDs/unique IDs can be generated and assigned to first networked entity 5011 and second networked entity 5012 by first IoT interaction system 5001, respectively.

As shown in Table 9, on first IoT interaction system 5001, a first scope 5201 is configured for any entity on connection 5111 with an identification server of second IoT interaction system 5002. First IoT interaction system 5001 transmits information regarding first networked entity 5011 along with the first scope 5201 to second IoT interaction system 5002. Second IoT interaction system 5002 generates a unique ID, e.g. "a1" for first networked entity 5011 within first scope 5201 and registers first networked entity 5011 along with its entity details.

Second IoT interaction system 5002 shares registration information within its system, including first IoT interaction system 5001. Second IoT interaction system 5002 transmits the unique ID "a1" of first networked entity 5011 within first scope 5201 to first IoT interaction system 5001. First IoT interaction system 5001 uses the unique ID, e.g. "a1" for any interaction with first networked entity 5011 within first scope 5201. Both first IoT interaction system 5001 and second IoT interaction system 5002 have accesses to information on first networked entity 5011 and the services provided by first networked entity 5011.

On the second IoT interaction system 5002, first scope 5201 is configured for any entity on connection 5114 with identification server configured for second IoT interaction system 5002. Second IoT interaction system 5002 creates a unique ID, e.g. "b2" for fourth networked entity 5014 within first scope 5201 and registers fourth networked entity 5014 along with its entity details. Second IoT interaction system 5002 shares registration information within its system including first IoT interaction system 5001. Second IoT interaction system 5002 transmits the unique ID, e.g. "b2" for fourth networked entity 5014 within first scope 5201 to first IoT interaction system 5001. First IoT interaction system 5001 uses the unique ID "b2" for any interaction with fourth networked entity 5014 within first scope 5201. Both first IoT interaction system 5001 and second IoT interaction system 5002 share information and services of fourth networked entity 5014.

In Table 9, interaction 5401 is configured on second IoT interaction system 5002. Interaction 5401 is defined between service 5301 of fourth networked entity 5014 and service 5302 of first networked entity 5011. Interaction 5401 is scoped for first scope 5201. Interaction 5401 has a first interaction and a second interaction. The first interaction is configured between two instances of defined services 5301 and 5302, where service 5301 of fourth networked entity 5014 acts as a source and service 5302 of first networked entity 5011 acts as a target within first scope 5201. The second interaction is also configured between two instances of defined services 5304 and 5303, where service 5304 of first networked entity 5011 acts as a source and service 5303 of fourth networked entity 5014, which acts as a target.

In terms of data flow, interaction is defined as being between a producer and consumer of the data. Data flow across interaction plays a key part in providing the power of interaction based IoT architecture. A set of one or more interactions defines the data flow. The data flow can have a single path, or multiple paths with many branches of interactions.

The first interaction and the second interaction are registered under first scope 5201 as a set of interactions. The information of interaction 5401 is shared with first IoT interaction system 5001 because first IoT interaction system 5001 has the first scope 5201 as well.

Output from service 5301 of fourth networked entity 5014 is chained to service 5302 of first networked entity 5011 within second IoT interaction system 5002 by recognizing service 5302 of first networked entity 5011 is connected to IoT interaction system 5002. Output of service 5301 of fourth networked entity 5014 is shared with first IoT interaction system 5001 along with entity and service information. First IoT interaction system 5001 receives the output and, with the same interaction 5401 that has been received from second IoT interaction system 5002, chains the output to service 5302 of first networked entity 5011.

IoT interaction system 3001, 4001, 5001, and 5002 can receive entity, service, scope, and interaction information that are relevant to the particular IoT interaction system 3001, 4001, 5001, and 5002. Any IoT interaction system generating and maintaining a unique ID for a particular scope, or a separate ID server for the scope will have access to all the information required to manage a desired interaction across IoT interaction system.

The present disclosure is not industry specific. It will be applicable to any solution involving interaction between connected entities. Example of using an IoT interaction system could be creating a remote recovery monitoring system within the healthcare industry where patients would have devices that would collect health information and pass it to doctors in order to make the monitoring process more efficient. Another possibility could be service integration in a datacenter where different facility management systems such as power, cooling, networking, security and various other custom services would be able to interact with each other.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

What is claimed is:

1. A system comprising:
    a processor, a memory, and an I/O device;
    an interaction engine unit stored in the memory and comprising a plurality of reusable software components; and
    a networking device storing the interaction engine unit, wherein:
    the plurality of the reusable software components is configured by a user, through a configuration process, to create at least one control flow and at least one service component representing at least one service,
    the configuration process is performed without a hard-coded implementation at an interaction layer,
    the at least one control flow executes a configured logic upon receipt of at least one event,
    the at least one control flow controls interactions among the at least one service or the at least one service to the at least one event,
    the interaction engine unit dynamically reconfigures the system configuration at run time based on at least one environmental condition,
    the networking device sends a data to a cloud application comprising a machine learning library, and wherein the interaction engine unit reconfigures the system upon receipt of a processing result from the machine learning library in the cloud application.

2. The system of claim 1, wherein the interaction engine unit comprises a configuration unit and an execution unit, wherein the configuration unit stores a configuration information from the user and the execution unit executes the at least one control flow.

3. The system of claim 2, wherein the configuration unit comprises:
    an entity module storing at least one entity component representing at least one networked entity,
    an entity type module storing an entity type of the at least one entity component,
    a service module storing the at least one service component representing the at least one service provided by the at least one networked entity, and
    a flow module storing the at least one control flow.

4. The system of claim 2, wherein the execution unit comprises a self-commanding logic which dynamically issues a command to the self-commanding logic itself during execution and reconfigures the system at run time.

5. The system of claim 4, wherein the interaction engine unit further comprises at least one configuration variable and the self-commanding logic reconfigures the system by modifying the at least one configuration variable at run time.

6. The system of claim 1, wherein the at least one service comprises at least one source service and at least one target service using different interaction protocols, wherein the execution unit breaks down output data from the at least one source service, and parses, maps, or transforms the output data readable to the at least one target service in accordance with a predetermined setting.

7. The system of claim 1, wherein the interaction engine unit further comprises at least one logic driven variable comprising a logic, wherein the logic driven variable is initialized with the logic and dynamically obtains a new value when the logic executes under different environmental conditions to reconfigure the system at run time.

8. The system of claim 1, wherein the at least one environmental condition comprises at least one parameter related to an internal state of the system.

9. The system of claim 1, wherein the at least one environmental condition comprises at least one parameter inputted from an external networked entity.

10. The system of claim 1, further comprising a cloud application logic and a machine learning module as an artificial intelligence (AI) solution within the system, wherein the cloud application logic and the machine learning module are used to be implemented on a cloud or a server.

11. The system of claim 1, wherein the at least one control flow comprises at least one Do Logic, wherein the at least one control flow is implemented granularly based on the at least one Do Logic.

12. The system of claim 1, wherein the networking device further stores an operating system and a configuration variable of the system,
    wherein the at least one service component comprises a first server component corresponding to a first networked entity, a second server component corresponding to a second networked entity, and a first client component corresponding to the cloud application comprising the machine learning library,
    wherein the networking device communicates with the first networked entity through the first server component and communicates with the second networked entity through the second server component,
    wherein the networking device communicates with the cloud application and the machine learning library through the first client component,
    wherein the operating system directly communicates with a fourth networked entity,
    wherein the networking device receives the data from the first networked entity through the first server component and compares the data with the configuration variable of the system and performs a corresponding action on the fourth networked entity through the operating system if the data meets a predetermined condition,
    wherein the networking device sends the data to the cloud application and the machine learning library through the first client component,
    wherein the machine learning library processes the data and returns the response to the cloud application and the networking device,
    wherein the networking device, upon receipt of the response, analyses the response and modifies the configuration variable of the system,
    wherein the configuration variable of the system obtains a new value, and wherein the new value is used by the networking device for comparing with a new data received from the first networked entity through the first sever component.

13. The system of claim 1, wherein the at least one event and the at least one service are configured to share a data block during execution.

14. The system of claim 13, wherein the at least one event is executed within a scope and the data block that exists within the scope is shared with the at least one event.

15. The system of claim 13, wherein the at least one service is executed outside a scope and the data block within the scope to be shared with the at least one service is passed as a list of arguments to the at least one service.

16. The system of claim 13, wherein the at least one event and the at least one service have a last logic, wherein the last logic has a return value, and wherein the return value is returned as a final return value of the at least one event and the at least one service.

17. The system of claim 1, wherein the at least one control flow further comprises an execution-scheduled logic, wherein the execution-scheduled logic is scheduled on a specific date and time and executes on the specific date and time as scheduled.

18. A non-transitory computer readable medium storing a computer readable program for executing a method for an interaction engine unit via a system comprising a networking device, the method comprising:
- receiving a configuration information at the interaction engine unit from a user through a configuration process performed without a hard-coded implementation at an interaction layer;
- creating at least one control flow and at least one service component representing at least one service based on a plurality of reusable software components of the interaction engine unit and the configuration information;
- upon receipt of at least one event, executing a configured logic of the least one control flow controlling interactions among the at least one service or the at least one service to the at least one event;
- dynamically reconfiguring a system configuration at run time based on at least one environmental condition;
- storing the interaction engine unit at the networking device;
- sending a data from the networking device to a cloud application comprising a machine learning library; and
- reconfiguring the system upon receipt of a processing result from the machine learning library in the cloud application.

* * * * *